US012030299B2

(12) United States Patent
Deppisch et al.

(10) Patent No.: US 12,030,299 B2
(45) Date of Patent: *Jul. 9, 2024

(54) PROCESSING MACHINE AND METHOD FOR ADJUSTING A PROCESSING LENGTH OF A SHAPING UNIT OF A PROCESSING MACHINE

(71) Applicant: KOENIG & BAUER AG, Würzburg (DE)

(72) Inventors: Bastian Deppisch, Karlstadt (DE); Torsten Müller, Güntersleben (DE); Thomas Schneider, Zell am Main (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/285,721

(22) PCT Filed: Apr. 8, 2022

(86) PCT No.: PCT/EP2022/059441

§ 371 (c)(1),
(2) Date: Oct. 5, 2023

(87) PCT Pub. No.: WO2023/285007

PCT Pub. Date: Jan. 19, 2023

(65) Prior Publication Data

US 2024/0083162 A1 Mar. 14, 2024

(30) Foreign Application Priority Data

Jul. 13, 2021 (DE) ..................... 10 2021 118 031.7

(51) Int. Cl.
*B41F 19/00* (2006.01)
*B26F 1/44* (2006.01)
(Continued)

(52) U.S. Cl.
CPC .............. *B41F 19/008* (2013.01); *B26F 1/44* (2013.01); *B41F 13/56* (2013.01); *B41F 33/0036* (2013.01)

(58) Field of Classification Search
CPC .... B41F 19/008; B41F 13/56; B41F 33/0036; B26F 1/44
See application file for complete search history.

(56) References Cited

U.S. PATENT DOCUMENTS 4,617,850 A 10/1986 Bishop et al.
4,785,734 A * 11/1988 Kawana .................. B41F 13/02 101/220
(Continued)

FOREIGN PATENT DOCUMENTS

CH 577887 A5 7/1976
DE 9211522 U1 10/1992
(Continued)

OTHER PUBLICATIONS

Ziegenbalg et al. Machine Translation (Year: 2015).*
International Search Report of PCT/EP2022/059441 dated Jul. 15, 2022.

*Primary Examiner* — David H Banh
(74) *Attorney, Agent, or Firm* — MATTINGLY & MALUR, PC

(57) ABSTRACT

In some examples, a processing machine for processing a substrate includes at least one shaping unit. The at least one shaping unit includes at least one forme cylinder and at least one impression cylinder. A processing point for processing a substrate is arranged between the at least one forme cylinder and the at least one impression cylinder. The processing machine includes a control unit for correcting a processing length of the substrate, and which controls a speed of at least one of the at least one forme cylinder or the at least one impression cylinder. The at least one forme
(Continued)

cylinder and the at least one impression cylinder have a speed ratio with respect to one another that is changeable at the processing point as a function of the processing length of the substrate, and the speed ratio differs at least once within a full cylinder revolution.

15 Claims, 25 Drawing Sheets

(51) Int. Cl.

| | |
|---|---|
| ***B41F 13/56*** | (2006.01) |
| ***B41F 33/00*** | (2006.01) |

(56) References Cited

U.S. PATENT DOCUMENTS

| | | | | |
|---|---|---|---|---|
| 5,017,257 | A | 5/1991 | Murphy | |
| 6,059,705 | A | 5/2000 | Ruthenberg et al. | |
| 2009/0266250 | A1 * | 10/2009 | Blaney | B41F 7/10 101/178 |
| 2012/0152134 | A1 * | 6/2012 | Leib | B41F 19/00 101/23 |

FOREIGN PATENT DOCUMENTS

| | | | |
|---|---|---|---|
| DE | 102015215540 | A1 | 3/2016 |
| DE | 102019119372 | A1 | 1/2021 |
| EP | 0615941 | A1 | 9/1994 |

* cited by examiner

PROCESSING MACHINE AND METHOD FOR ADJUSTING A PROCESSING LENGTH OF A SHAPING UNIT OF A PROCESSING MACHINE

CROSS-REFERENCES TO RELATED APPLICATIONS

This application is the US national phase, under 35 USC § 371, of PCT/EP2022/059441, filed on Apr. 8, 2022, published as WO 2023/285007 A1 on Jan. 19, 2023, and claiming priority to DE 10 2021 118 031.7, filed Jul. 13, 2021, and all of which are expressly incorporated by reference herein in their entireties.

TECHNICAL FIELD

Some examples relate to a processing machine and to a method for adjusting a processing length of a substrate by means of a shaping unit of the processing machine. For instance, the processing machine includes at least one shaping unit, the at least one shaping unit comprising at least one forme cylinder and at least one impression cylinder. A processing point for processing a substrate is located between the at least one forme cylinder and the at least one impression cylinder. The processing machine includes at least one control unit for correcting a processing length and which controls in an open loop and/or a closed loop a speed of the at least one forme cylinder and/or of the at least one impression cylinder. The speed of the at least one forme cylinder and the speed of the at least one impression cylinder have a speed ratio with respect to one another that is changeable and/or changed at the processing point by means of the control unit as a function of the processing length of the substrate.

Additionally, the method for adjusting a processing length of a substrate by means of a shaping unit of a processing machine includes that the at least one shaping unit includes at least one forme cylinder. The at least one forme cylinder, during processing, has a speed when a processing point is passed through, a substrate being moved at a transport speed in the processing point, the speed of the at least one forme cylinder having a ratio with respect to the transport speed of the substrate. The processing length of the substrate is adjusted by means of a control unit by changing the speed ratio between the forme cylinder and the substrate at the processing point.

BACKGROUND

Various processing units are used in processing machines for sheets, in particular corrugated cardboard sheets. Printing fluid is applied to the sheets by means of at least one application unit and, additionally or alternatively, the mass and/or shape and/or contour of the sheets are modified by way of at least one shaping device. Flexographic printing is one possible application method. Flexographic printing is characterized by a forme cylinder including a flexible printing forme. A die cutter, in particular a rotary die cutter, is usually a possible shaping device.

In processing machines, changes in length may result during operation due to a wide variety of influences, such as temperature changes or mechanical stresses that act on a print image. To achieve a favorable printing outcome, these changes in the printing length must be compensated for or corrected.

Such a processing machine including printing length correction is disclosed in DE 10 2019 119 372 A1. For this purpose, defects in the printing length are compensated for by speed adjustments of the forme cylinders. For this purpose, the processing machine includes application mechanisms including dedicated drives and sheet arrival sensors upstream from the application mechanisms. In an advantageous embodiment, the at least one sheet sensor is configured to control the position and/or rotational speed of the respective forme cylinder in a closed loop and/or an open loop. The detection of the sheet by means of the sheet sensor allows a deviation of the actual arrival time of the sheet at the position of the sheet sensor from a reference to be determined. The closed-loop control and/or open-loop control of the forme cylinder based on the deviation ascertained by the sheet sensors advantageously results in a sheet whose print image and/or whose processing conform to a target state of the sheet. The patent specification furthermore discloses an inspection device, which controls the correction of the printing length. The shaping units, such as the die-cutting units, for example, are also disclosed to have dedicated drives. During the correction of the printing length, the forme cylinder is controlled in a closed loop or in an open loop. The disadvantage is that the forme cylinder has to be synchronized with the sheet arrival time. As a result, the forme cylinder has to be repeatedly returned to its original position prior to the arrival of the next sheet. This results in an increased adjustment effort.

In addition to changes in printing length, it is also possible for defects to arise in processing machines due to changes in shaping units, such as die-cutting units, perforating units, or creasing units. These changes in the processing lengths must be compensated for.

CH 577 887 A5 discloses a rotary die cutter (rotatable die-cutting machine). A ratio of the rotational speeds ensures that deviations due to wear are reduced. Preferably, the rotational speed of the die cylinder is changed. These deviations are, for example, cuts of differing lengths in a paperboard sheet.

U.S. Pat. No. 5,017,257 A discloses a label die cutter (rotary die cutter) in which labels of differing lengths can be adapted by adapting the speed of the tools.

U.S. Pat. No. 4,617,850 A discloses a die cutter (die-cutting machine) for processing a substrate web and for processing individual sheets. The patent specification also discloses a method and a device for varying the speed of the involved cylinders.

U.S. Pat. No. 6,059,705 A discloses a method and a device for maintaining the proper registration between succeeding stations of a processing machine comprising a die cutter and a printing unit.

DE 92 11 522 U1 discloses a device for cutting or die cutting moving web-format material. By means of marking elements and a read device, the speeds of the material and of the tool can be controlled to the same speed.

DE 10 2005 215 540 A1 discloses a method for adapting a print image to a print substrate change (printing length correction). A correction of the print substrate change is carried out by adapting the speed ratio of the printing forme cylinder to the impression cylinder.

EP 0 615 941 A1 discloses a production process of sheets by way of printing units and die-cutting units. The register accuracy can be monitored and restored between the stations. Conveyor belts between the stations can be activated by way of servo motors so as to place the sheets in correct positional registration again or transport them to the next processing station.

SUMMARY

It is an object of some examples herein to create a processing machine and a method for adjusting a processing length of a substrate by means of a shaping unit of a processing machine.

The object is achieved according to some examples by a processing machine in which a speed ratio between at least one forme cylinder and at least one impression cylinder is changeable at a processing point by means of the control unit as a function of a processing length of a substrate, and the speed ratio for correcting the processing length differs at least once within a full cylinder revolution.

Further, in some examples, the method includes adjusting the processing length of the substrate by means of a control unit by changing the speed ratio between the forme cylinder and the substrate at the processing point. The speed ratio between the at least one forme cylinder and the substrate is changed at least once within a full cylinder revolution when a working surface passes through the processing point.

An advantage to be achieved with the invention is, in particular, that a processing length or die-cutting length of a shaping unit can be adapted. This contributes to an increased degree of automation of the processing machine, in particular in synergy with a correction of a printing length. The synergy effects are especially evident in particular in combination machines comprising processing units and printing units. The two systems in particular complement one another due to synergy effects. For example, one system can compensate for minor defects of the other. The processing machine thus offers additional adjustment options so as to increase the flexibility and improve the processing outcome. Particularly advantageously, the processing length is corrected by adapting the speed ratios between the sheet and the shaping mechanism, in particular the forme cylinder. Particularly advantageously, the cylinders of the shaping unit are controlled in an open loop and/or a closed loop. As an alternative, a speed adaption can also be implemented via the transport devices of the processing machine. In an advantageous embodiment, the impression cylinder, in particular its position, is controlled in a closed loop or an open loop. This has the advantage that the impression cylinder does not have to be returned to match the arrival time of the succeeding sheet. The reason is that the impression cylinder does not have a forme and, in general, also no cylinder channel. In contrast to the printing length correction in the printing unit, the impression cylinder is an obvious choice for adapting the speed ratios in order to adapt the processing length in the shaping unit. This is due to the nature of the outer cylindrical surface. An impression cylinder in the printing unit is generally smooth, while an impression cylinder in the shaping unit has a rough surface, for example rubber. Due to the enhanced adhesion to the rough surface, the speed of a sheet can be influenced better. Furthermore, the same inspection devices can be used for correcting the printing length and the processing lengths. This results in savings in terms of the complexity of the system. The settings of a processing job can be saved and easily be retrieved again. Likewise, the printing length and/or the processing length in such a processing machine can be adapted either over the entire sheet and/or in sections. For this purpose, the speed ratio differs at least once within a full cylinder revolution in the region of the application surface of an application forme and/or in the region of the working surface of a shaping tool. In the case of a sectional correction, it is also possible to correct multiple-up copies of the substrate that are arranged one behind the other. For this purpose, the two units preferably have at least partially identical structures and/or contours on the application forme and/or on the shaping tool.

The actual state is preferably monitored fully automatically via an inspection device, which inspects the processing length of the forme cylinder and subsequently forwards this actual state to a control unit.

Another advantage to be achieved with the invention is that the processing length of the shaping unit, in particular of the forme cylinder, can be adapted in sections. Such a section can be defined, for example, by multiple-ups arranged one behind the other. The shaping tools then preferably have several at least partially recurring or identical structures for processing the substrate or the sections or individual multiple-ups. In particular, the speeds of the cylinders are adapted during a cylinder revolution in such a way that at least partially different speeds prevail when the sections pass through the processing point. The processing lengths of the individual multiple-ups or of the entire sheet can thus be lengthened or shortened. It is then possible for the processing length of each multiple-up to be corrected. This takes place in sections by controlling, in a closed loop and/or in an open loop, the speed ratios between the sheet and the shaping mechanism. The division can, for example, be set prior to a print job at a control console. Particularly advantageously, the division in sections is carried out automatically by an inspection device, which carries out the division and transmits the data to a control unit. For the adaptation of the processing length, the speed ratio of the forme cylinder to the impression cylinder differs at least once, preferably multiple times, within a cylinder revolution. The advantage of an adaptation of the processing length in sections is that the machine can be adjusted more flexibly to the materials to be processed. Preferably, a sequence is stored in the machine controller, so that an operator only has to specify correction values for each section. Based on the stored sequence, the machine adapts the processing lengths, in particular the speed ratios. A speed ratio is automatically adapted from a correction value, for example by way of a look-up table.

Another advantage achieved with the invention is that the printing length can likewise be corrected in sections. In particular, the printing length for individual multiple-ups can be determined or inspected by analyzing the print image and/or processing outcome. In particular, the printing cylinder can then be operated at different angular speeds or surface speeds in different sections. Again, the printing lengths can thus be lengthened or shortened in sections, for example for each individual multiple-up or the entire sheet. For this purpose, the application forme preferably has at least partially recurring structures. By increasing the speed, the print image can be shortened, and by lowering the speed, the print image can be lengthened. This shortening or lengthening of the print image is carried out in the respective sections.

In particular, a processing machine having increased flexibility and adjustment options can be created by the sectional correction of the processing length and the sectional correction of the printing length.

BRIEF DESCRIPTION OF THE DRAWINGS

An exemplary embodiment of the invention is illustrated in the drawings and will be described in greater detail below. The drawings show:

FIG. 21 a representation of the processing mechanism after a sheet has passed through;

DETAILED DESCRIPTION

Figure 1:
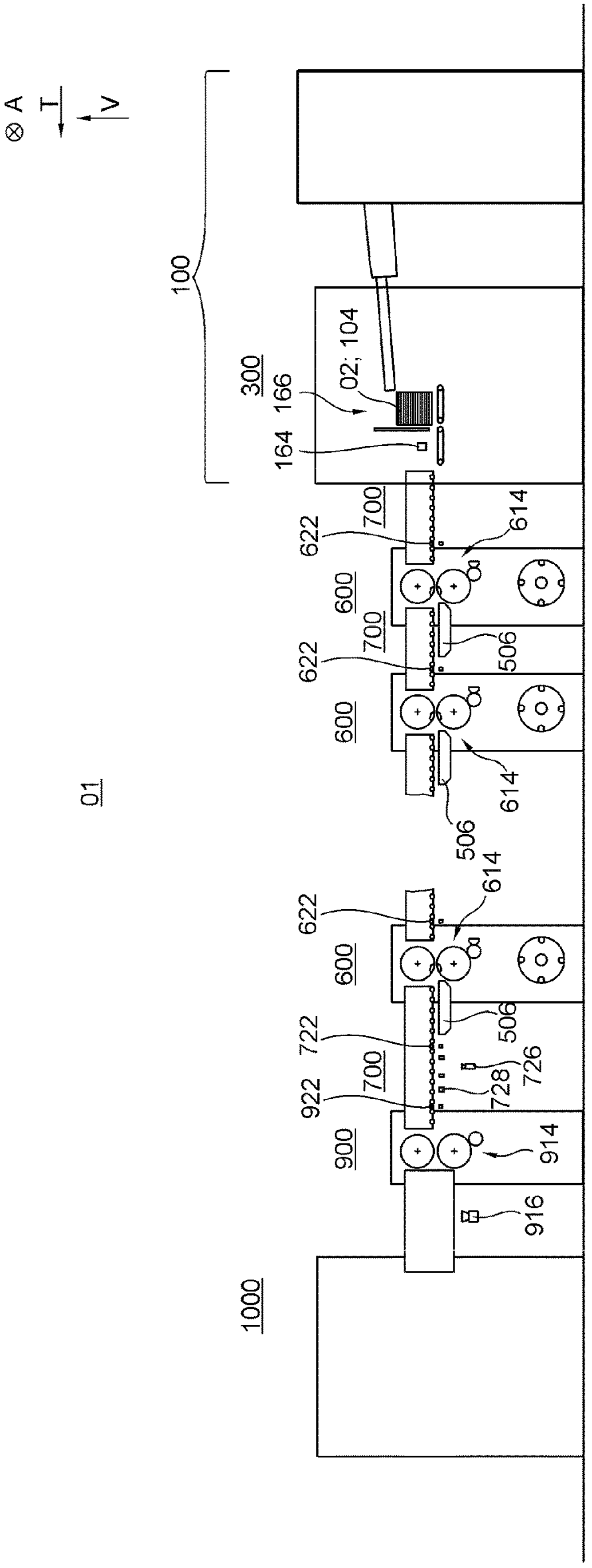
FIG. 1 a schematic representation of a sheet processing machine.
Figure 2:
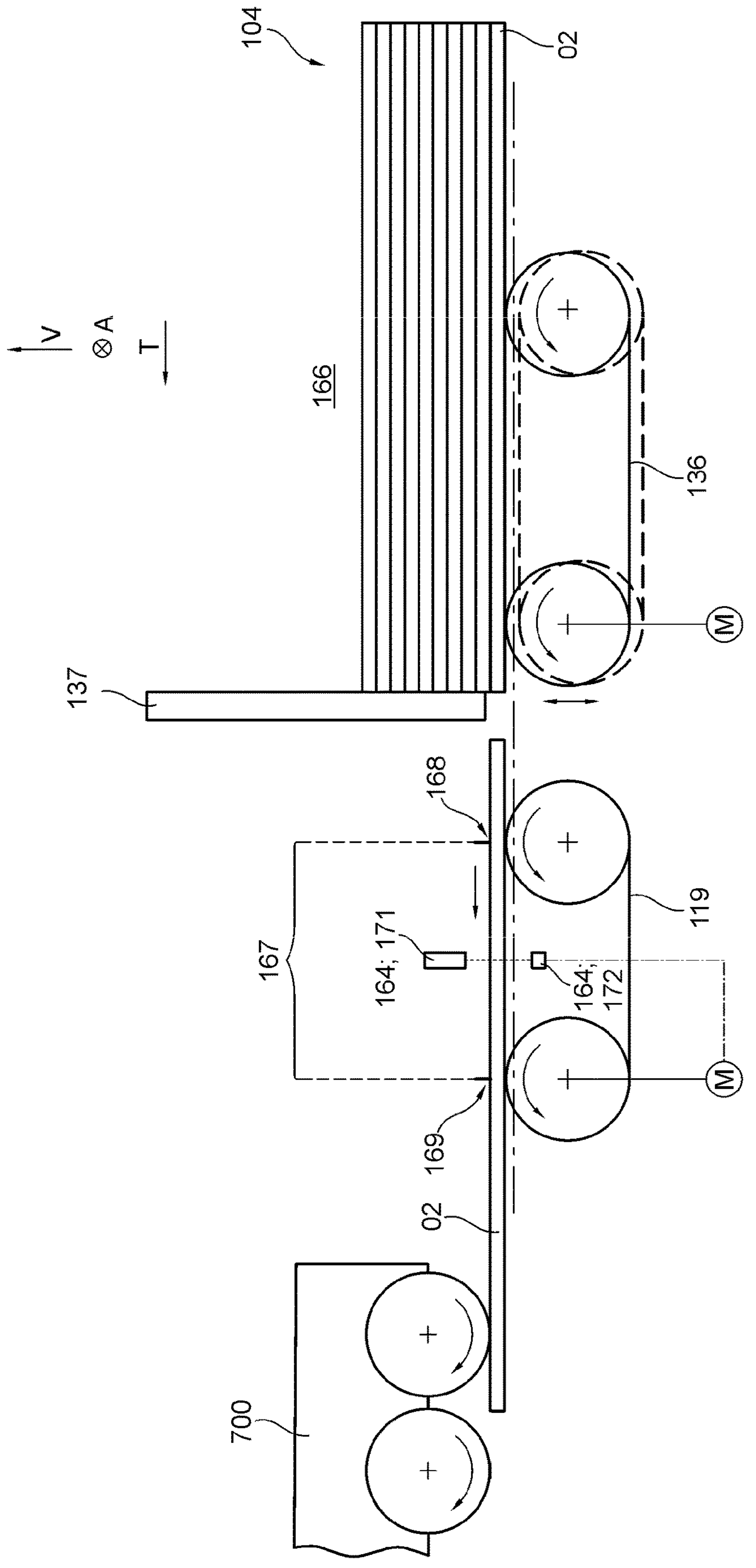
FIG. 2 a schematic representation of a substrate feed device comprising at least one sheet sensor.
Figure 3:
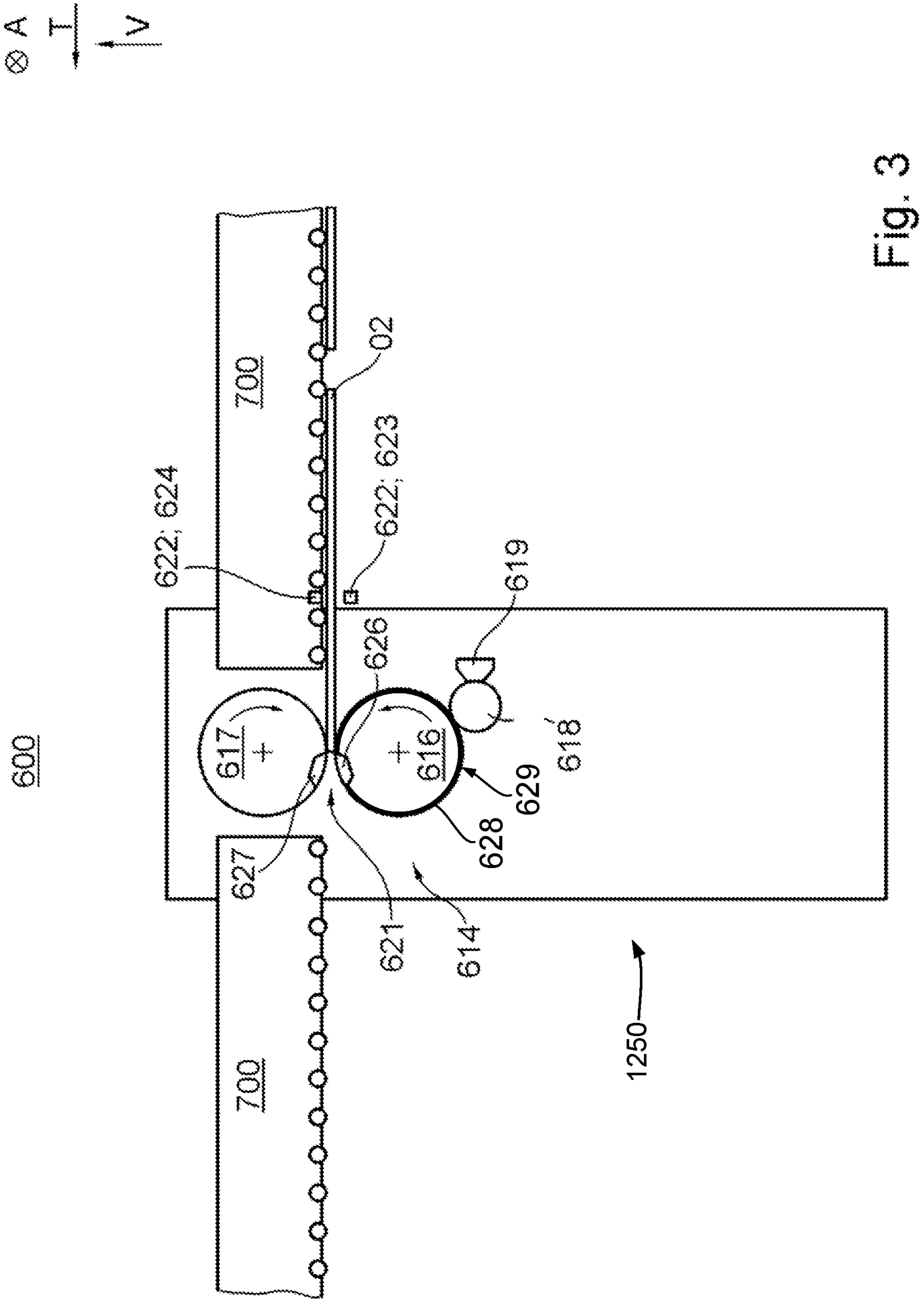
FIG. 3 a schematic representation of an application unit comprising at least one sheet sensor.
Figure 4:
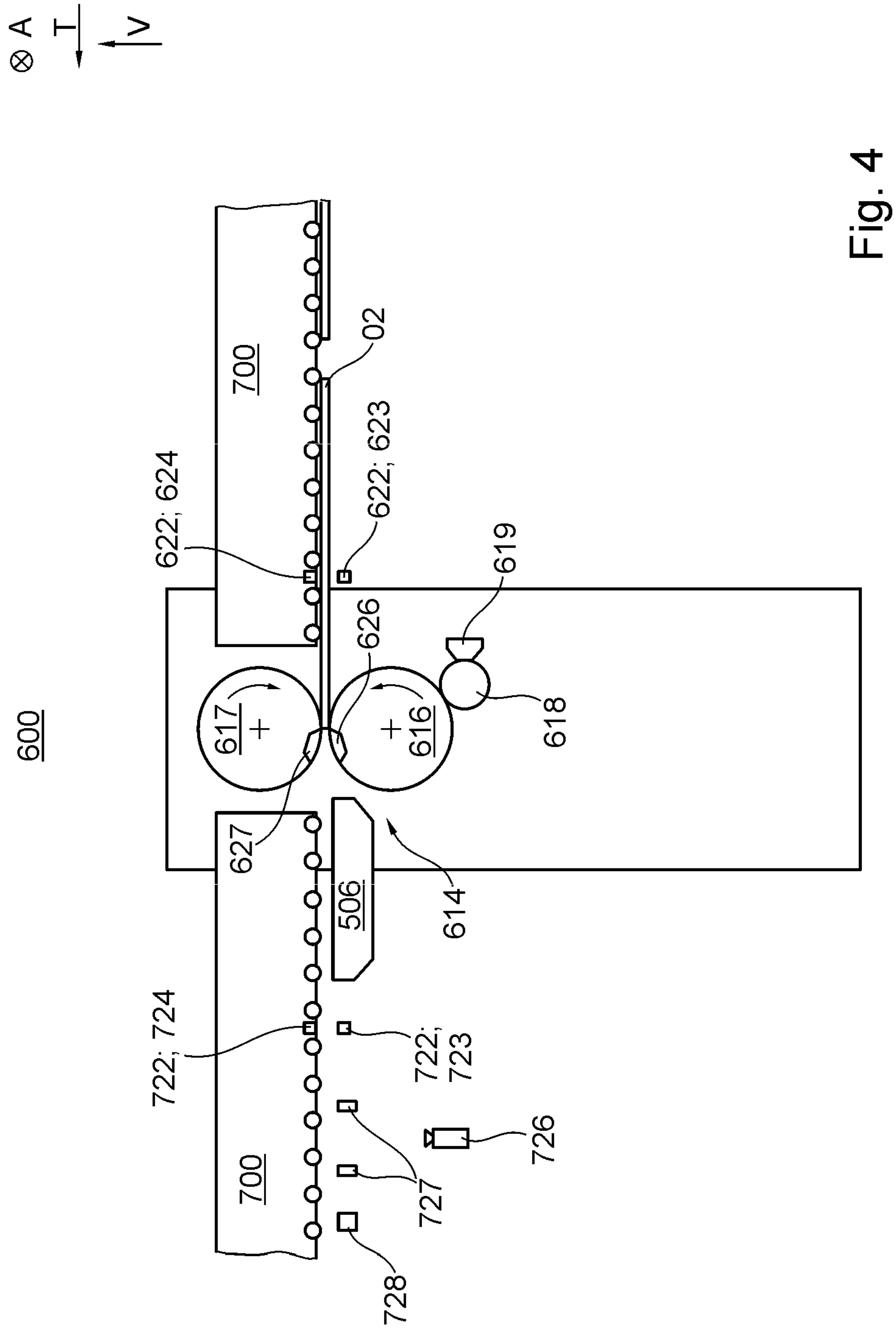
FIG. 4 a schematic representation of two inspection devices arranged in a transport direction downstream from a last application unit.
Figure 5:
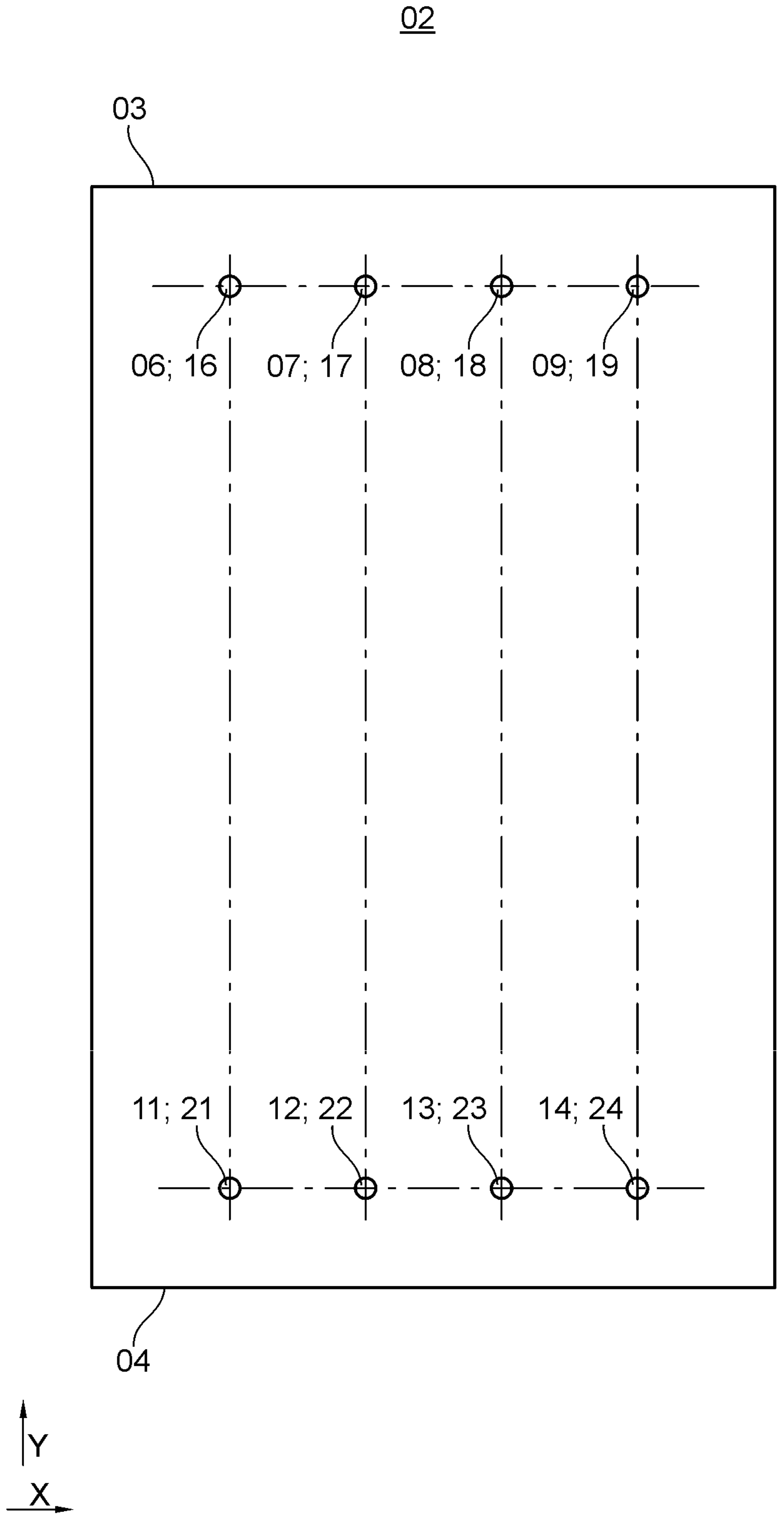
FIG. 5 a sheet including a first and a second register mark, each arranged in its reference position, for four application mechanisms, for example.
Figure 6:
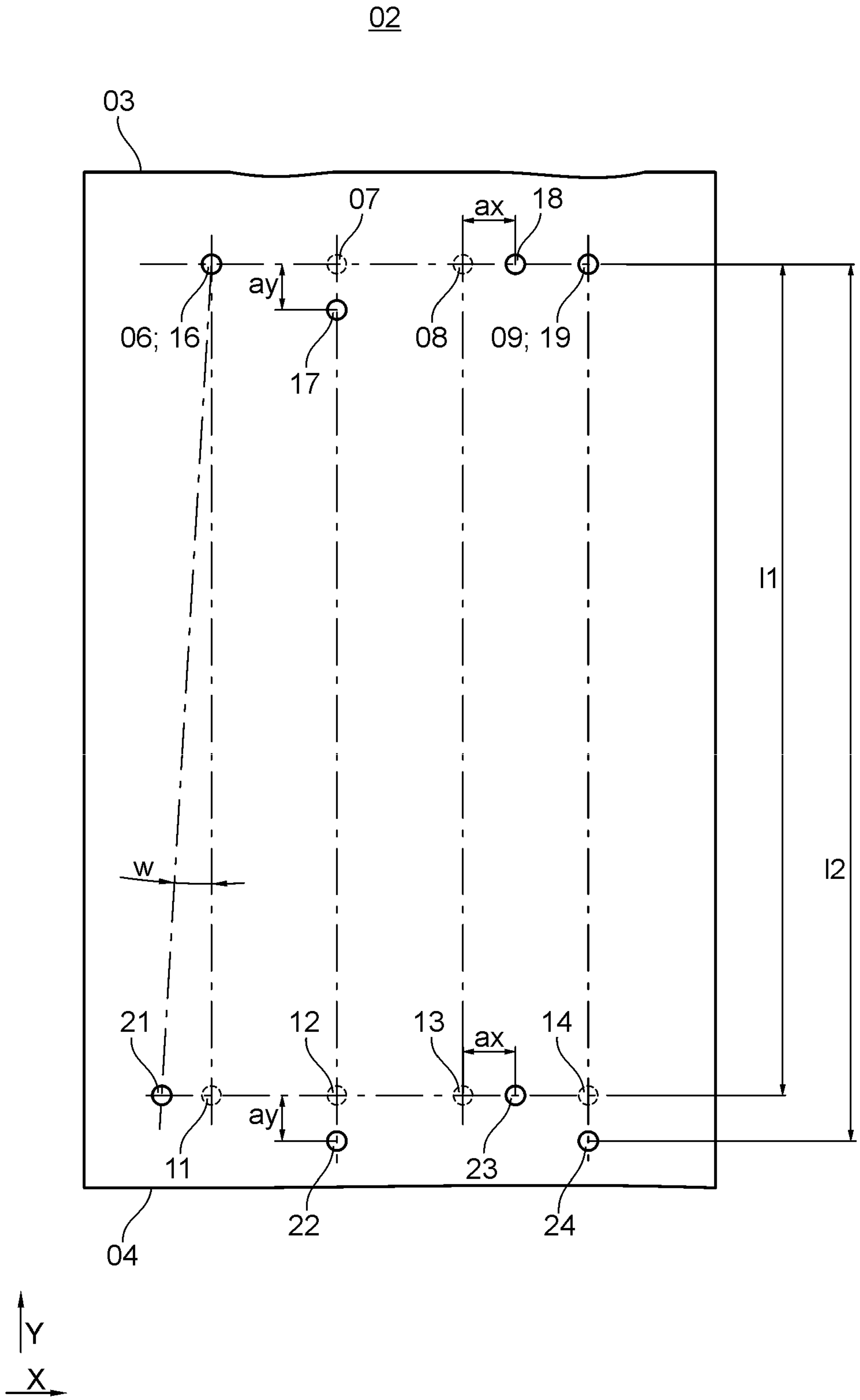
FIG. 6 a sheet including a first and a second register mark in each case, which deviate from the reference position, for four application mechanisms, for example.
Figure 7:
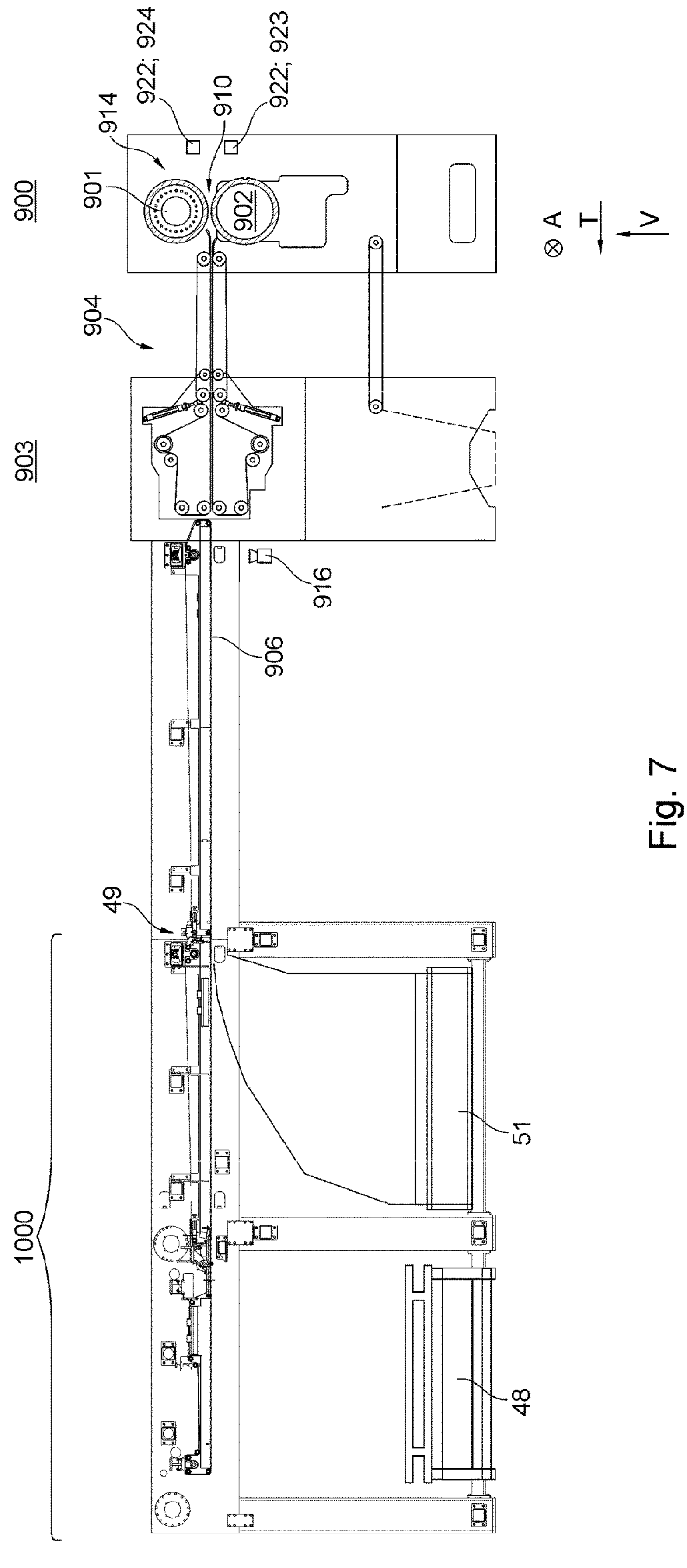
FIG. 7 a schematic representation of a shaping device and a sheet delivery unit.
Figure 8:
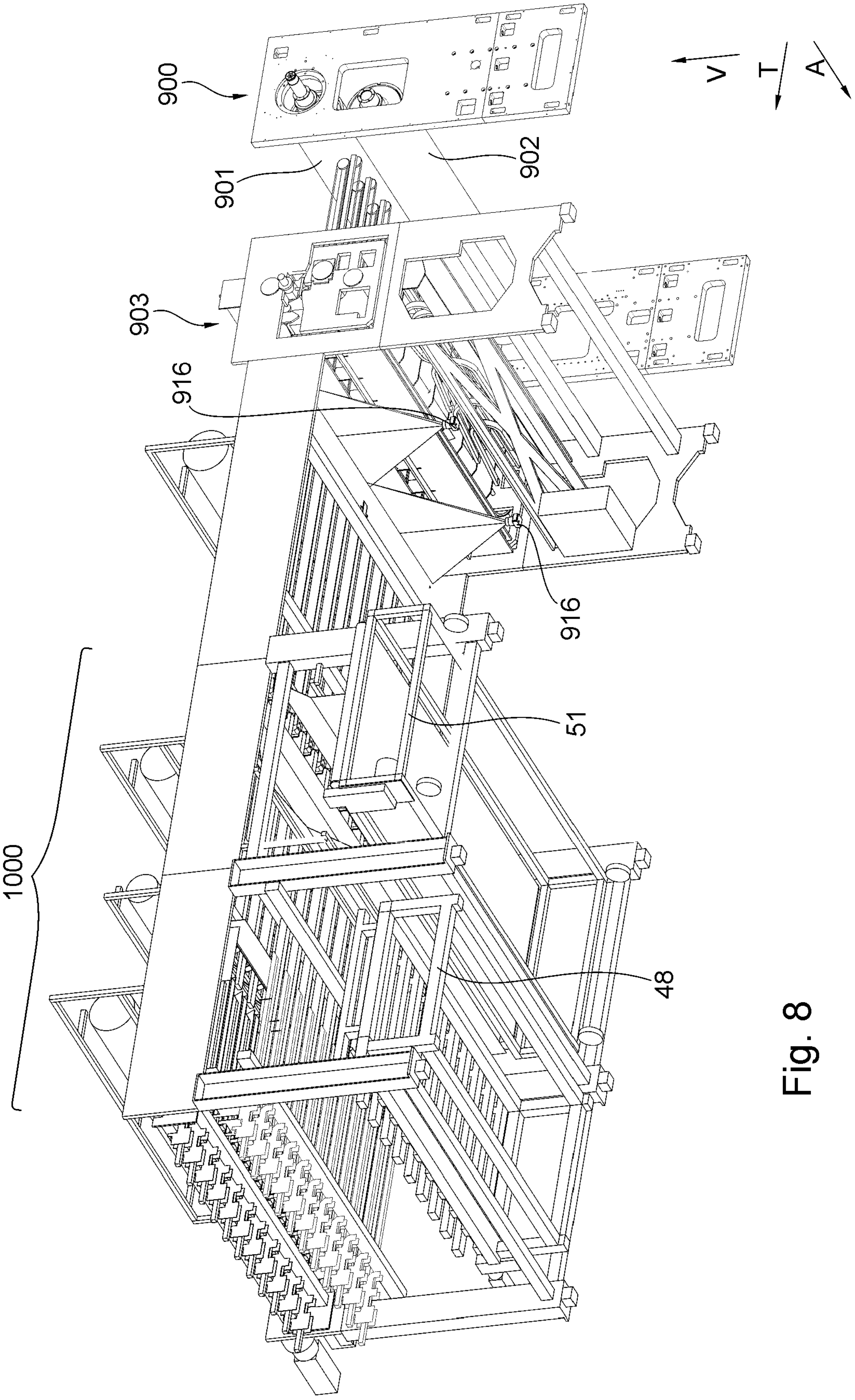
FIG. 8 a schematic representation of a shaping device and of a sheet delivery unit comprising at least one inspection device in the transport direction downstream from the shaping device.
Figure 9:
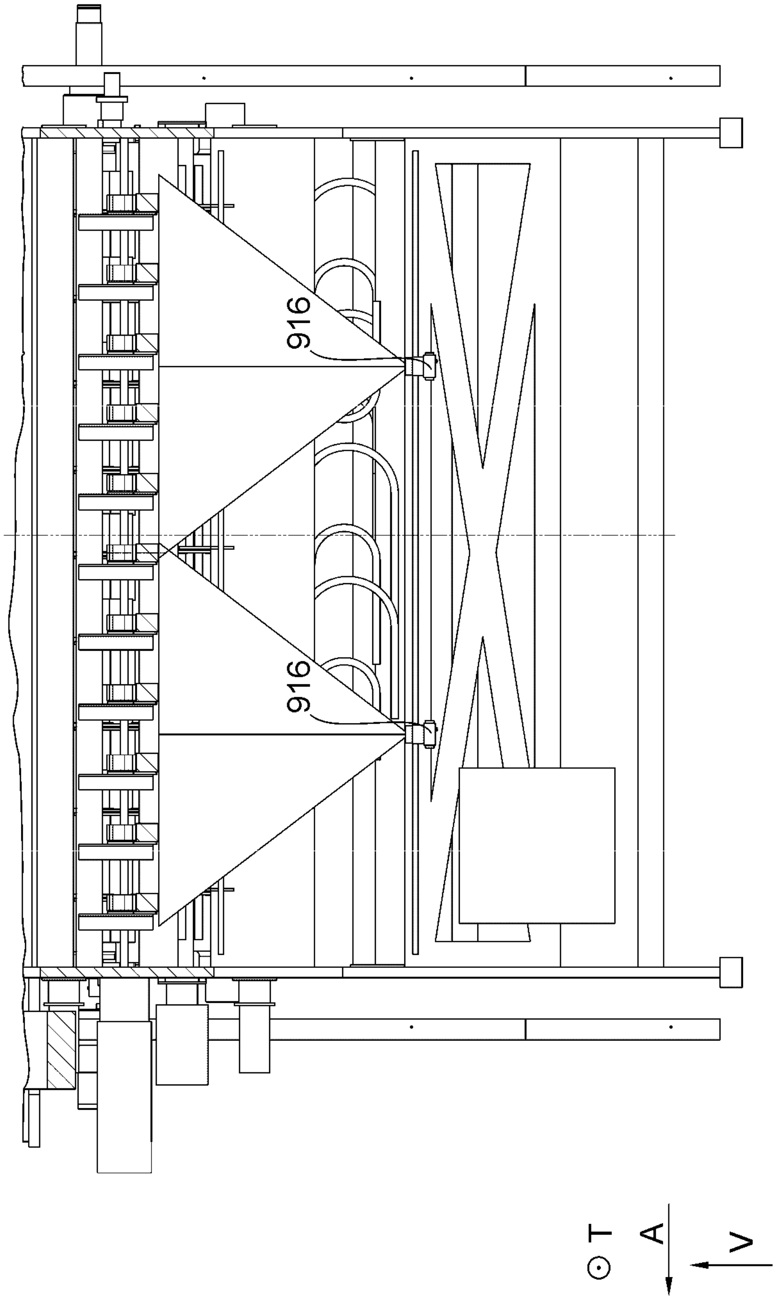
FIG. 9 a schematic representation of the at least one inspection device in the transport direction downstream from the shaping device.
Figure 10:
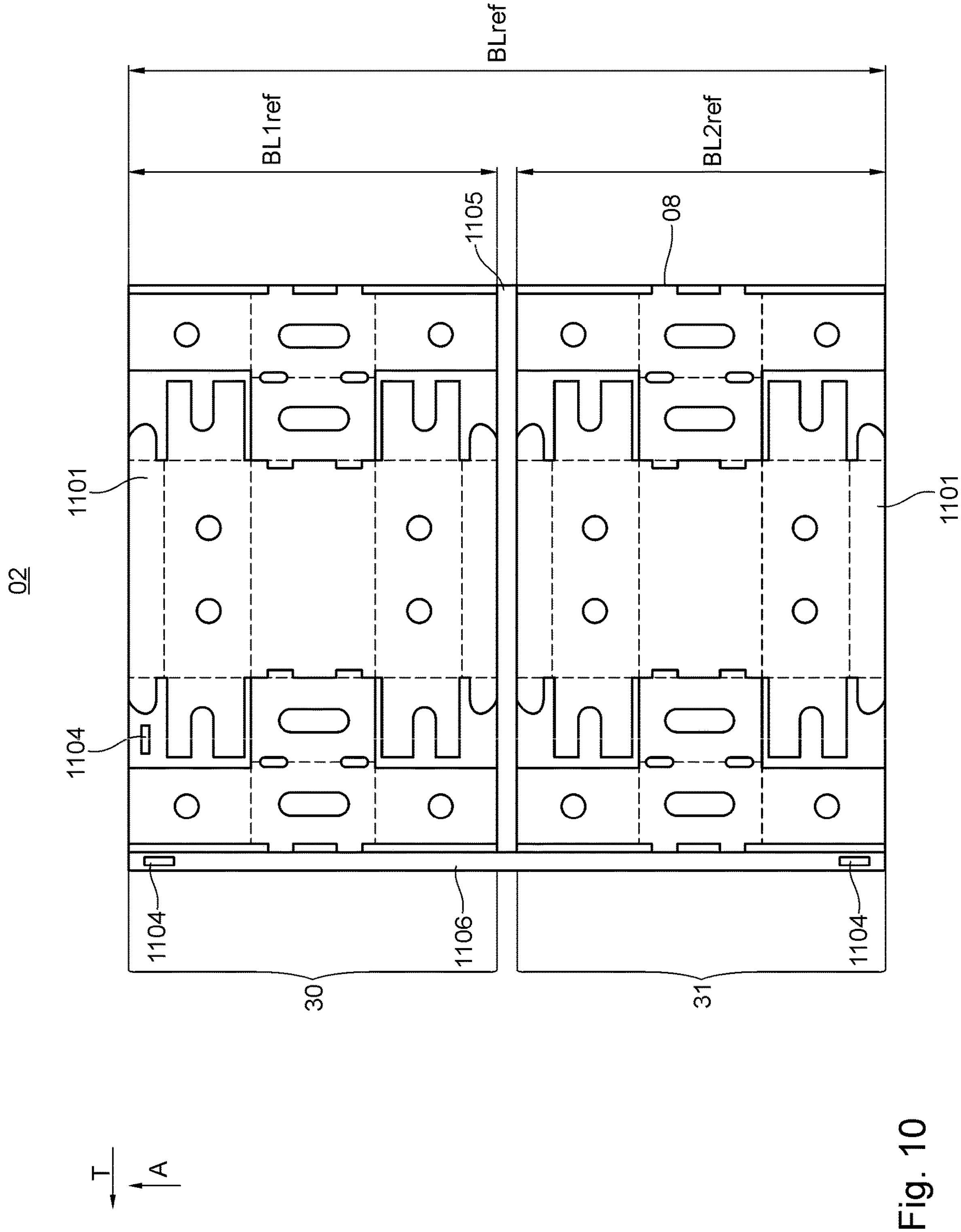
FIG. 10 an exemplary representation of a sheet comprising multiple-ups.
Figure 11:
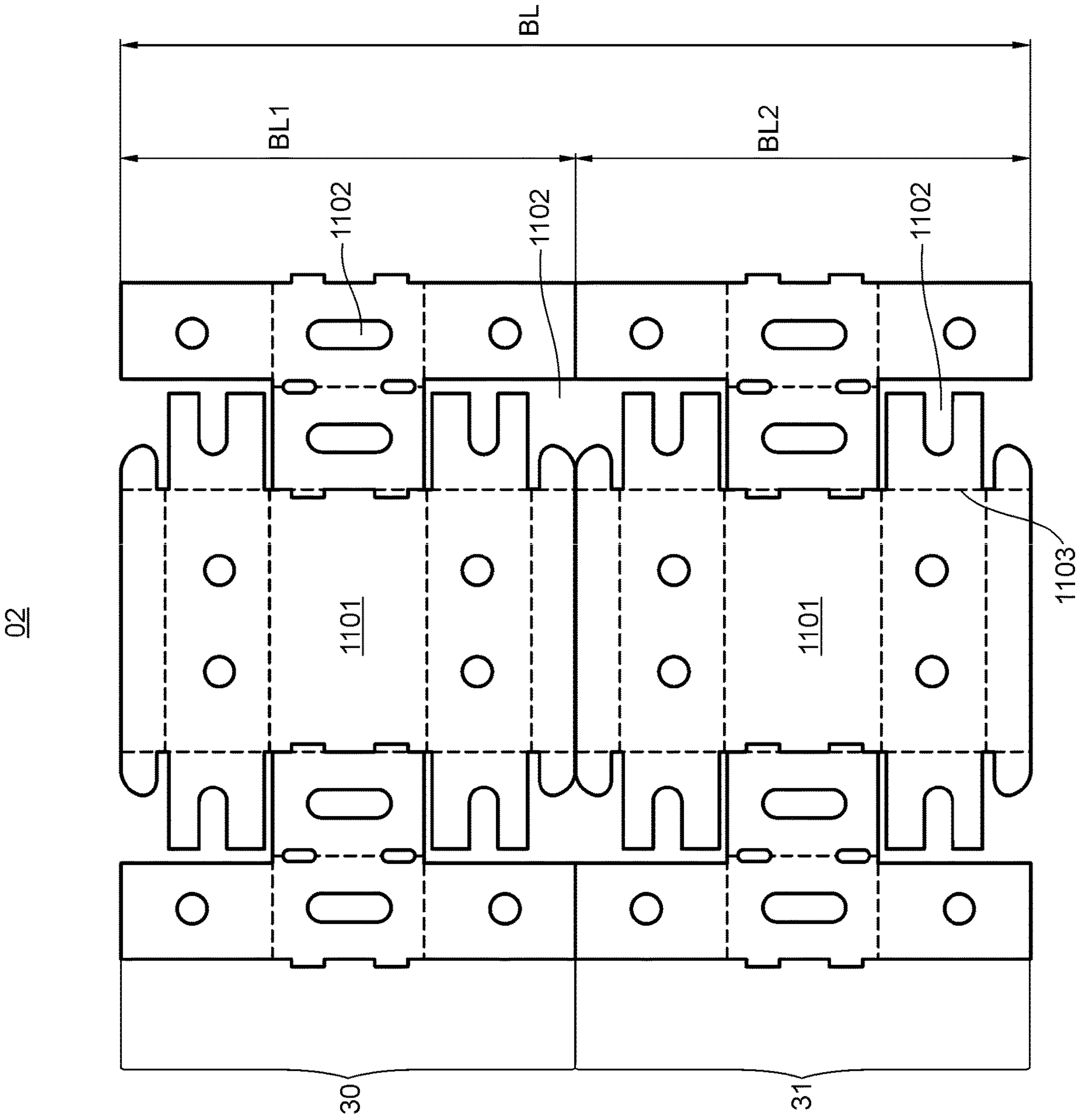
FIG. 11 a schematic representation of two connected multiple-ups.
Figure 12:
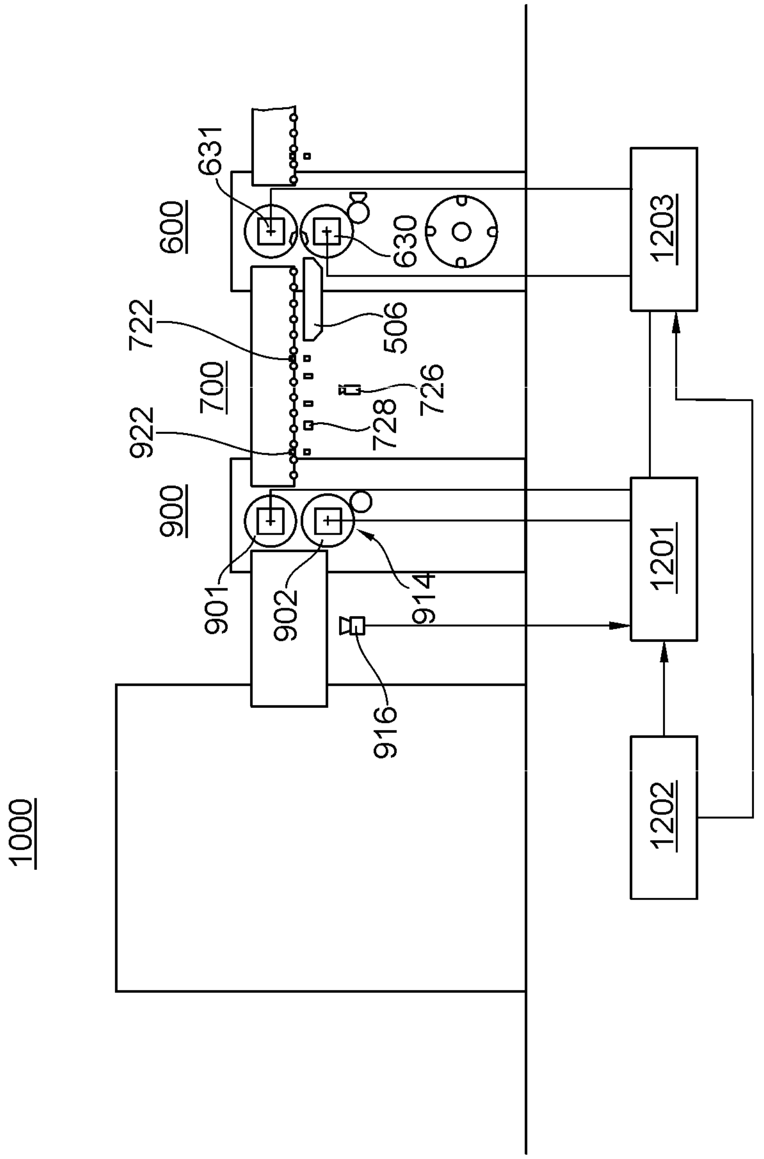
FIG. 12 a representation of a machine section of the processing machine comprising a shaping unit and a control unit for adapting the processing length.
Figure 13:
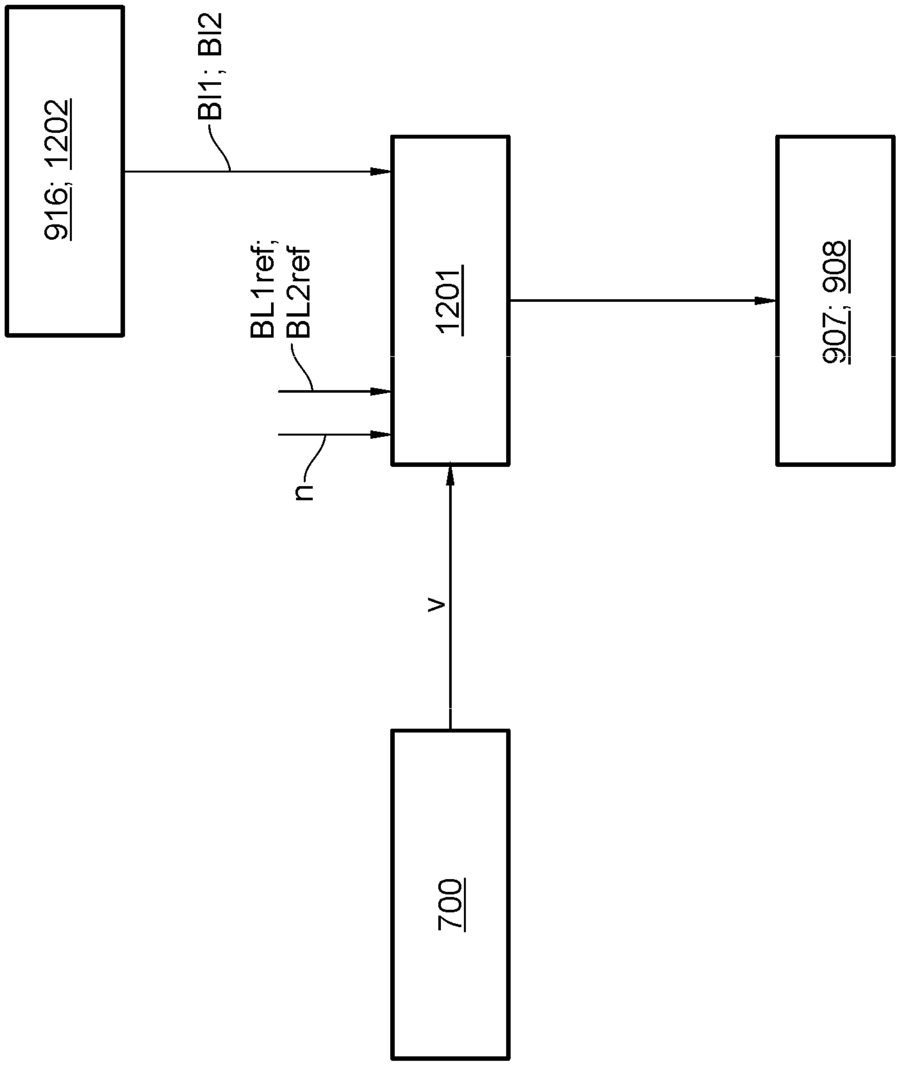
FIG. 13 a representation of the processed values for the processing length correction.
Figure 14:
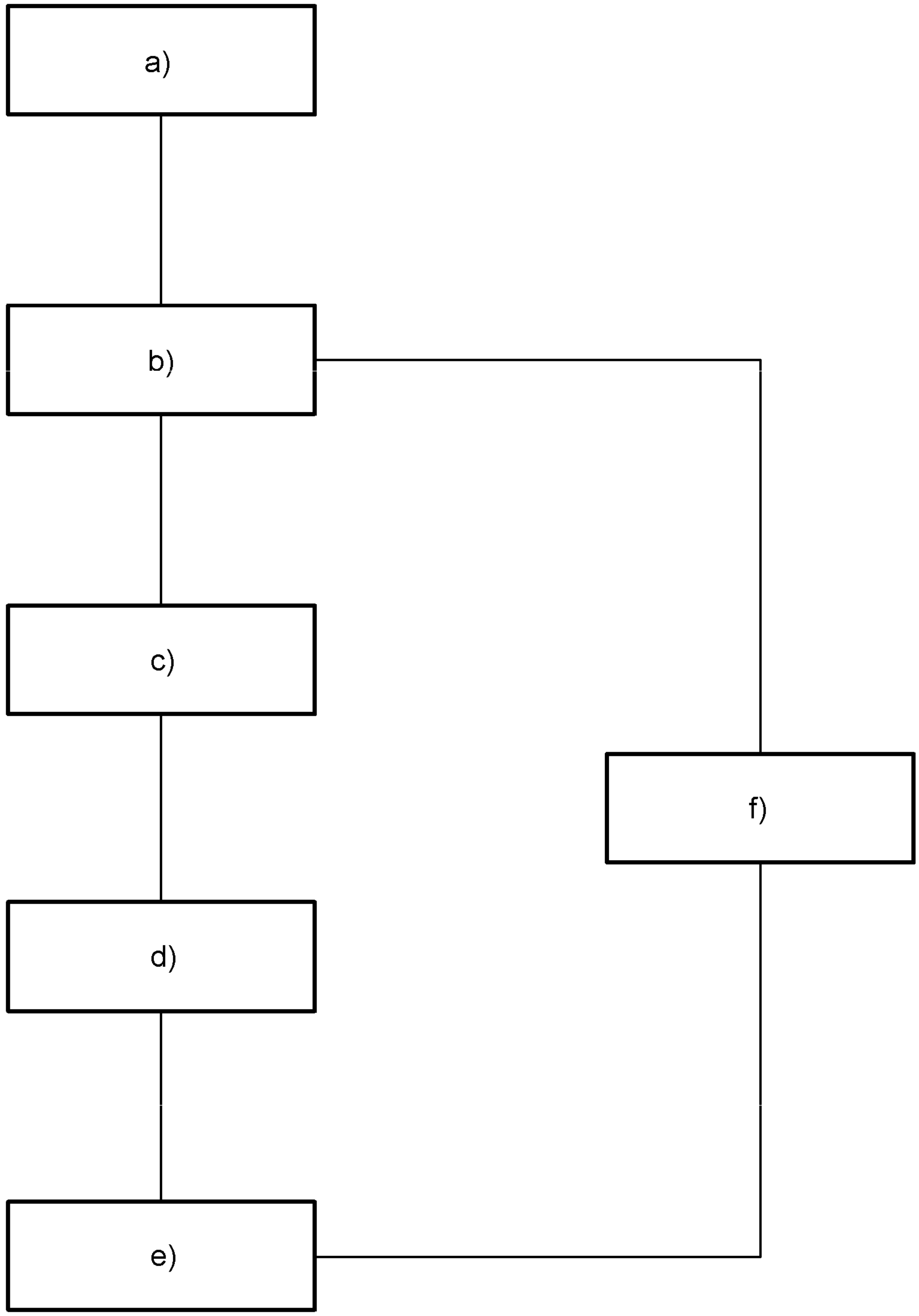
FIG. 14 a flow chart of the correction of the processing length.
Figure 15:
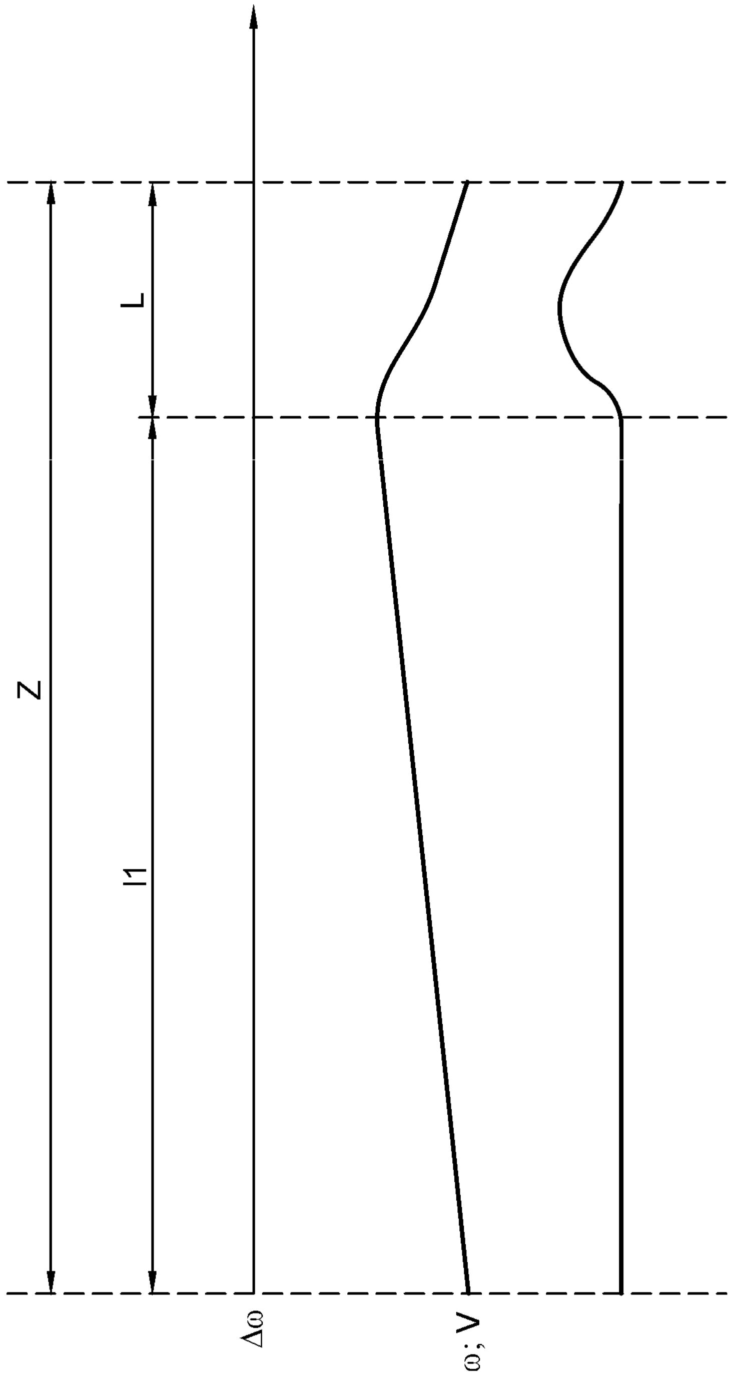
FIG. 15 a representation of the speed profile and of the rotation angle deviation of the printing length correction.
Figure 16:
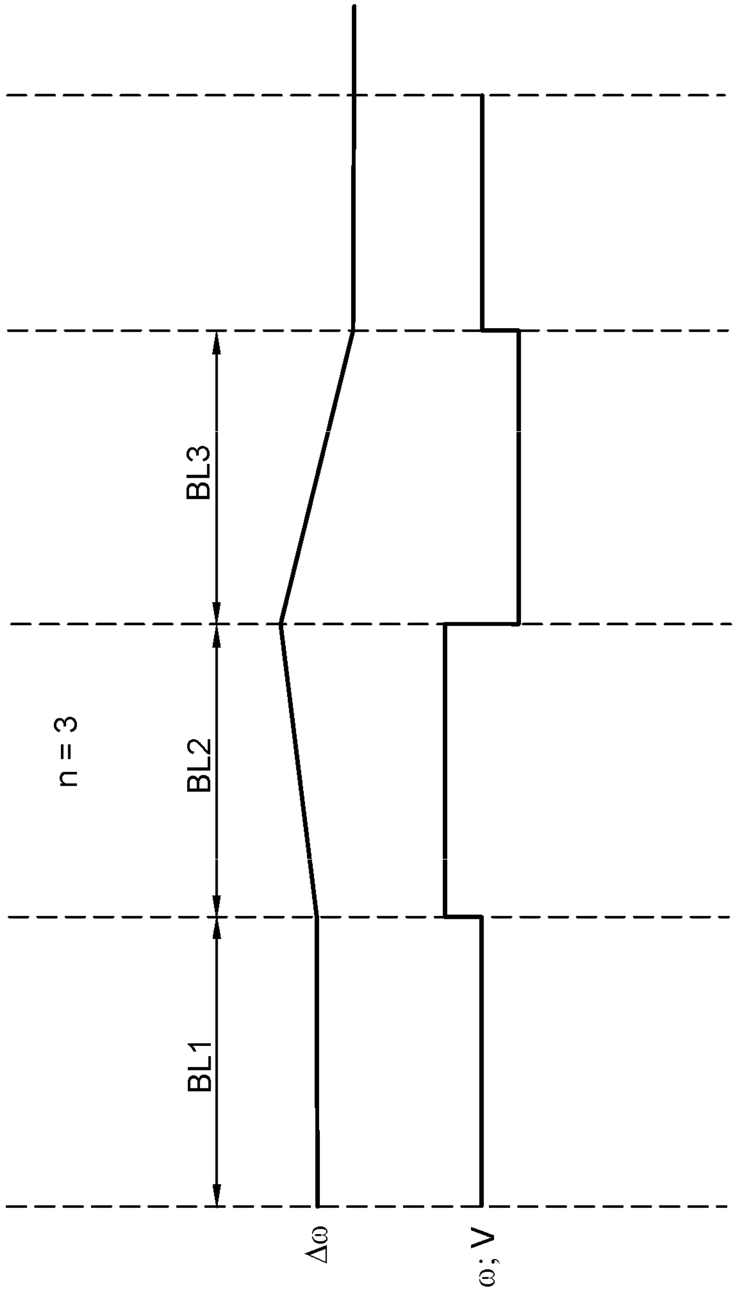
FIG. 16 a representation of the speed profile and of the rotation angle deviation of the correction of the processing length.
Figure 17:
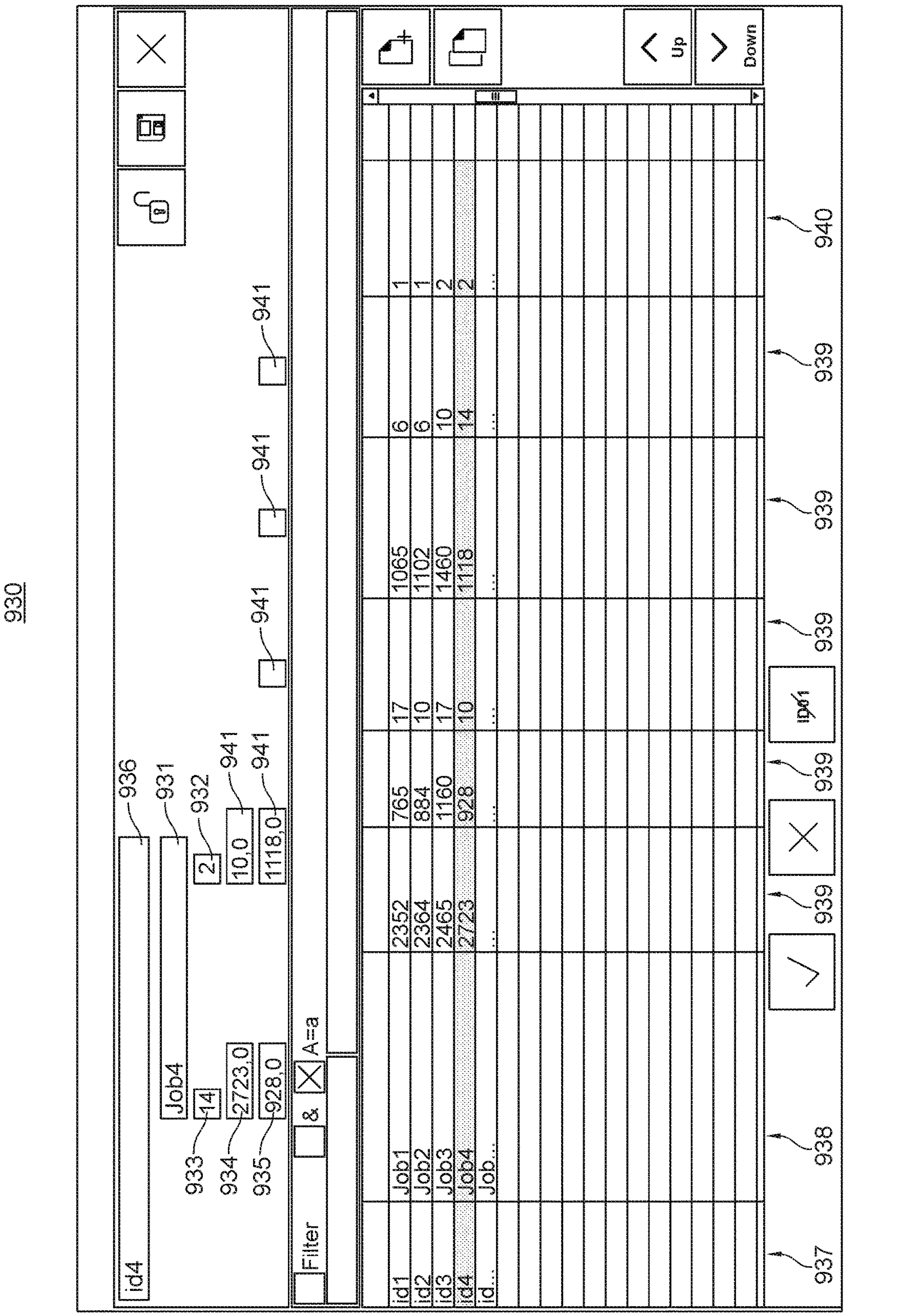
FIG. 17 an exemplary representation of an input mask of a tool form.
Figure 18:
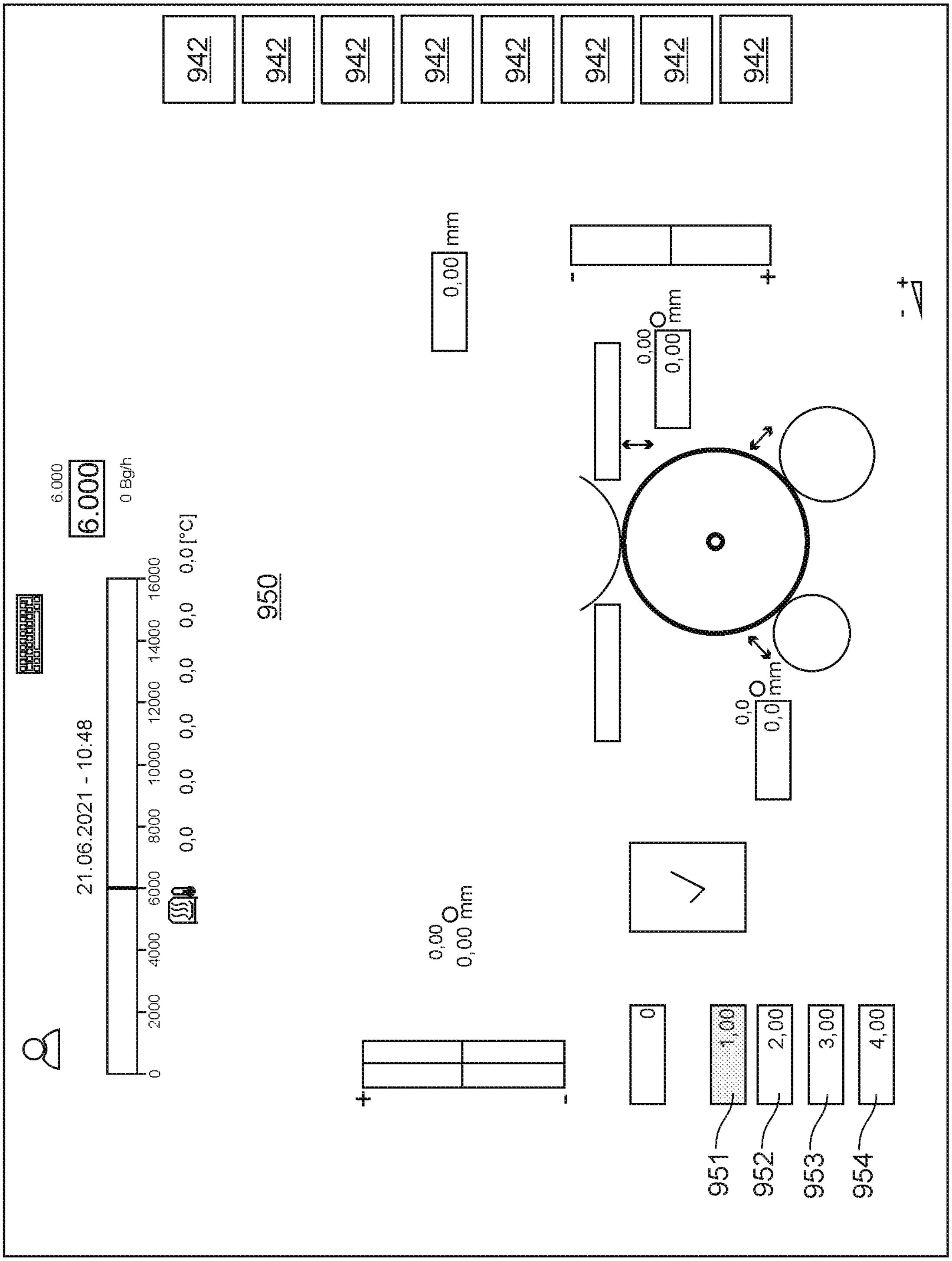
FIG. 18 a representation of an input mask for entering correction values of the processing length.
Figure 19:
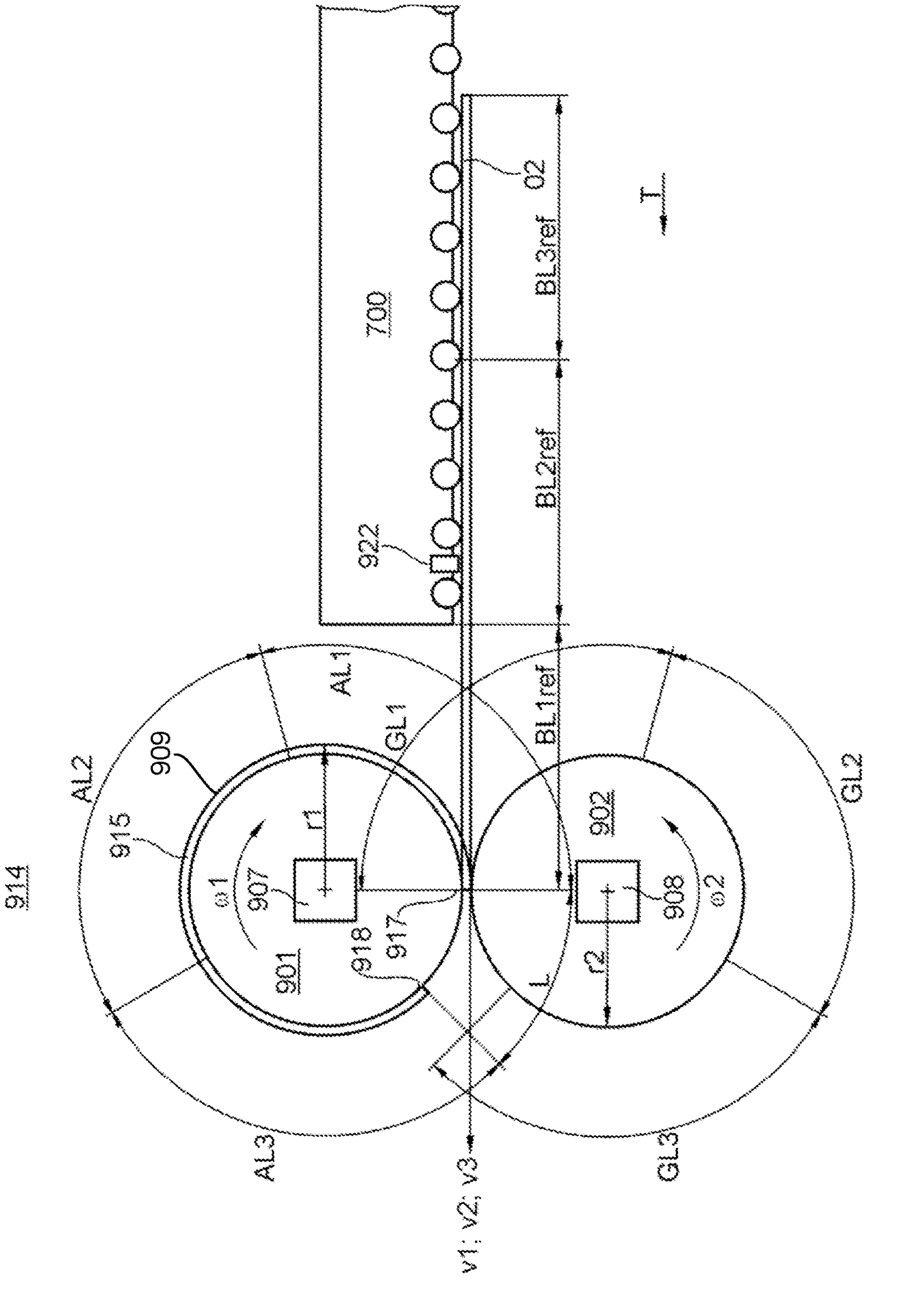
FIG. 19 a representation of the processing mechanism during arrival of the sheet.
Figure 20:
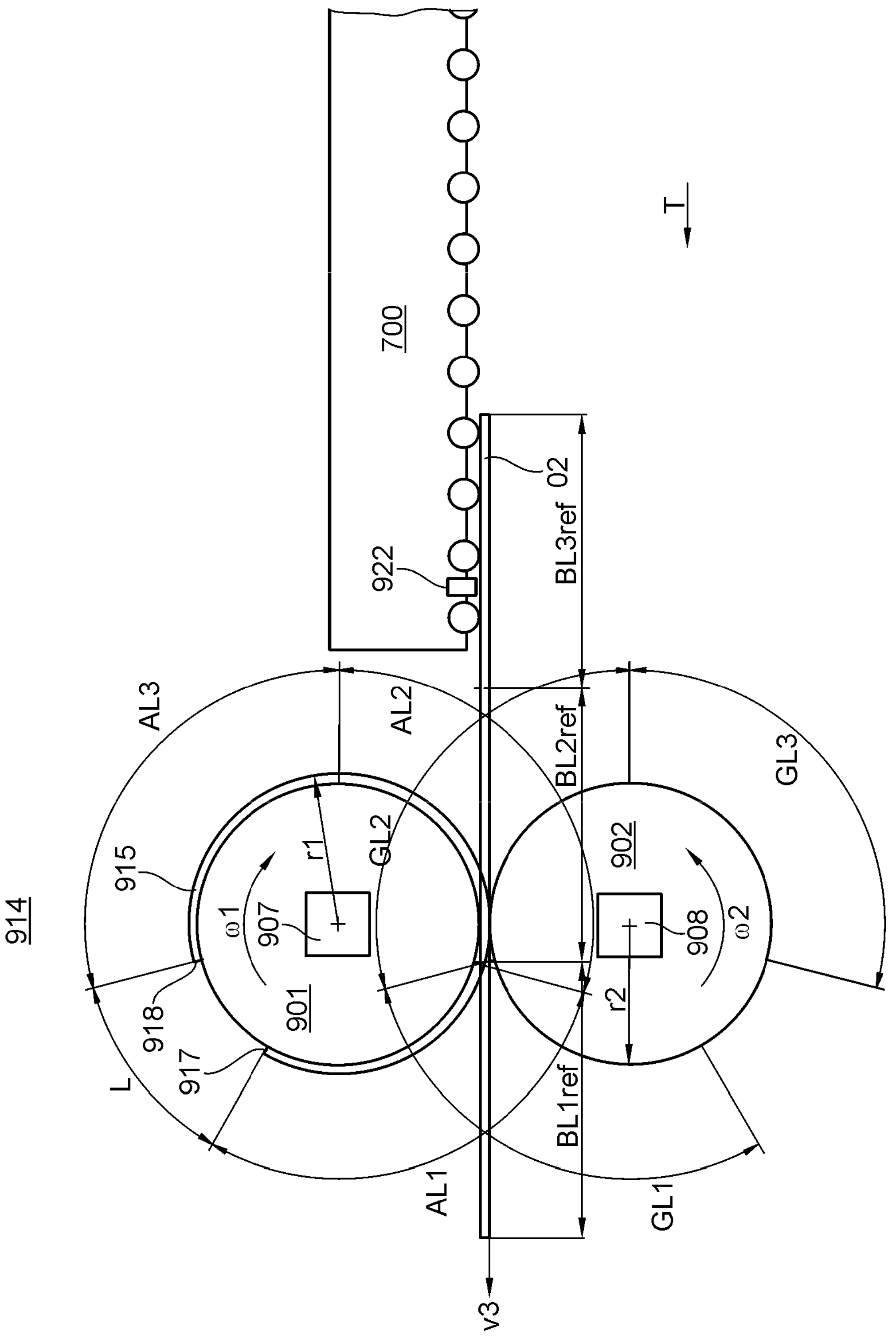
FIG. 20 a representation of the processing mechanism during processing of the sheet in the section of the second processing length BL2.
Figure 21:
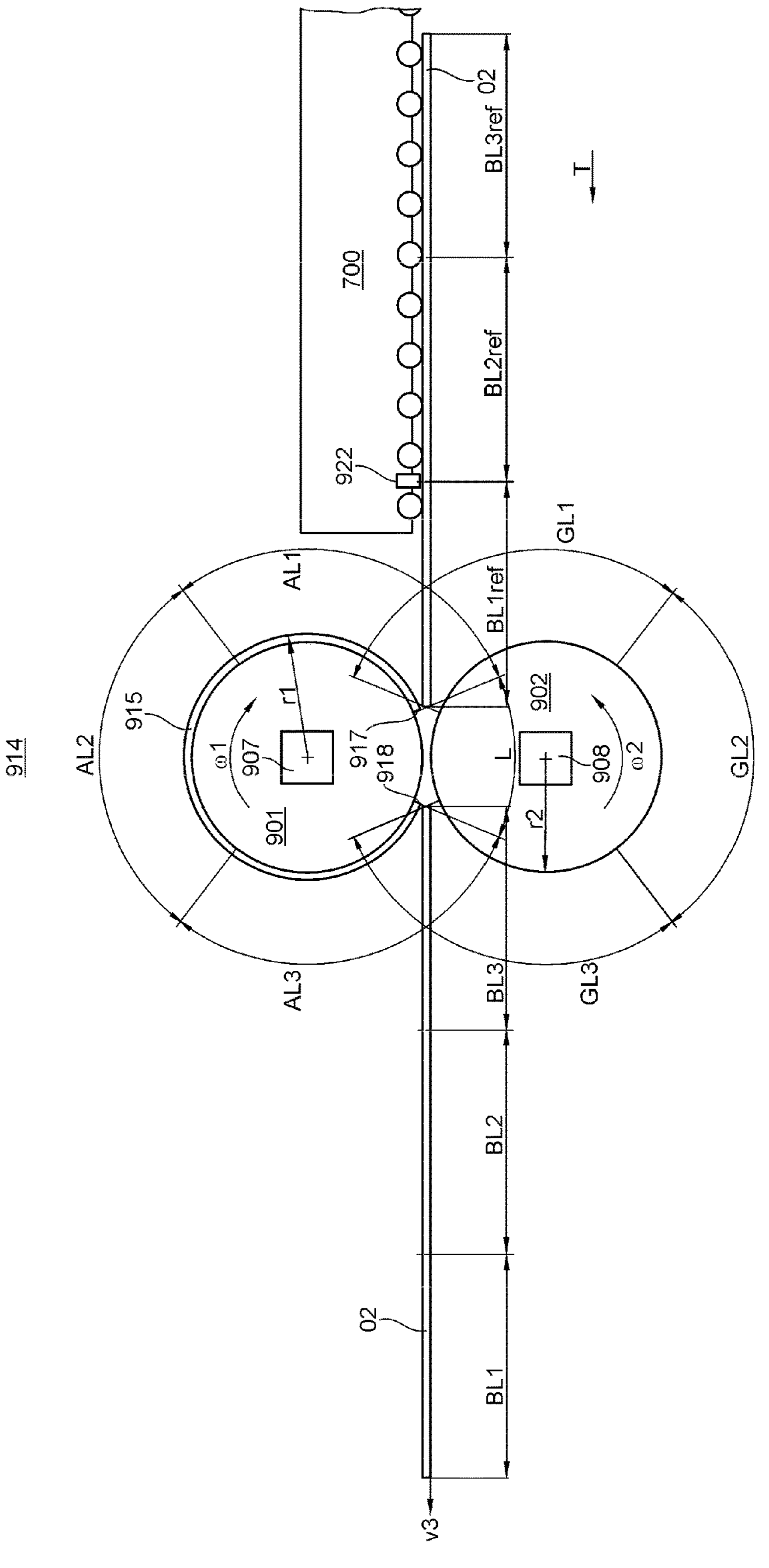
Figure 22:
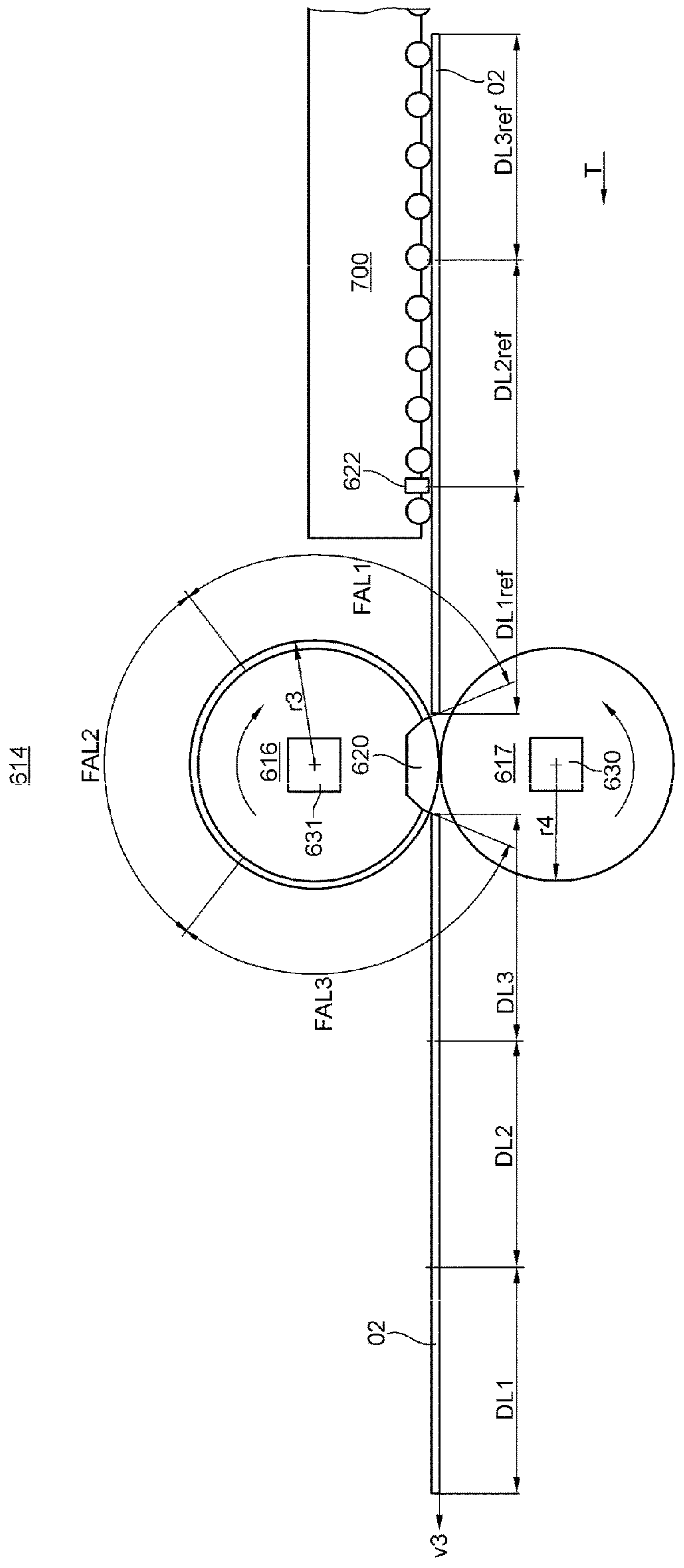
FIG. 22 a representation of a printing mechanism including a sheet having different sections and in each case individual printing lengths.
Figure 23:
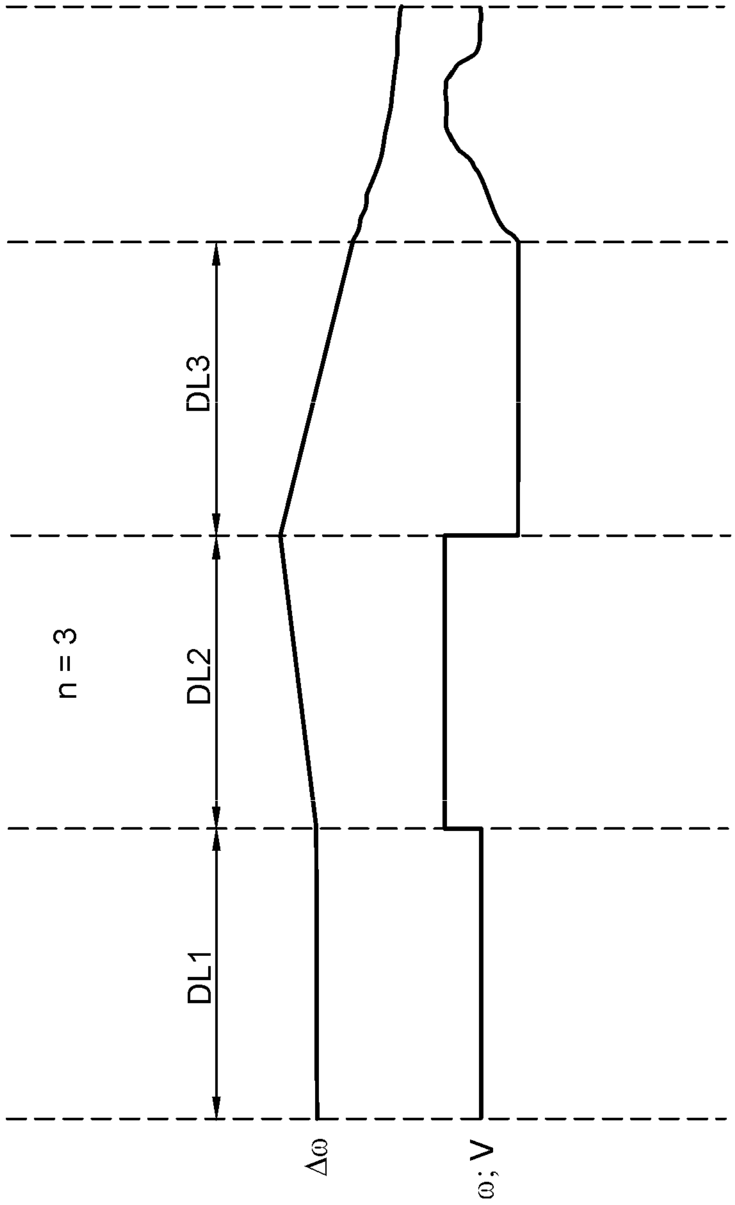
FIG. 23 a representation of the speed profile and of the rotation angle deviation of the correction of the printing length.
Figure 24:
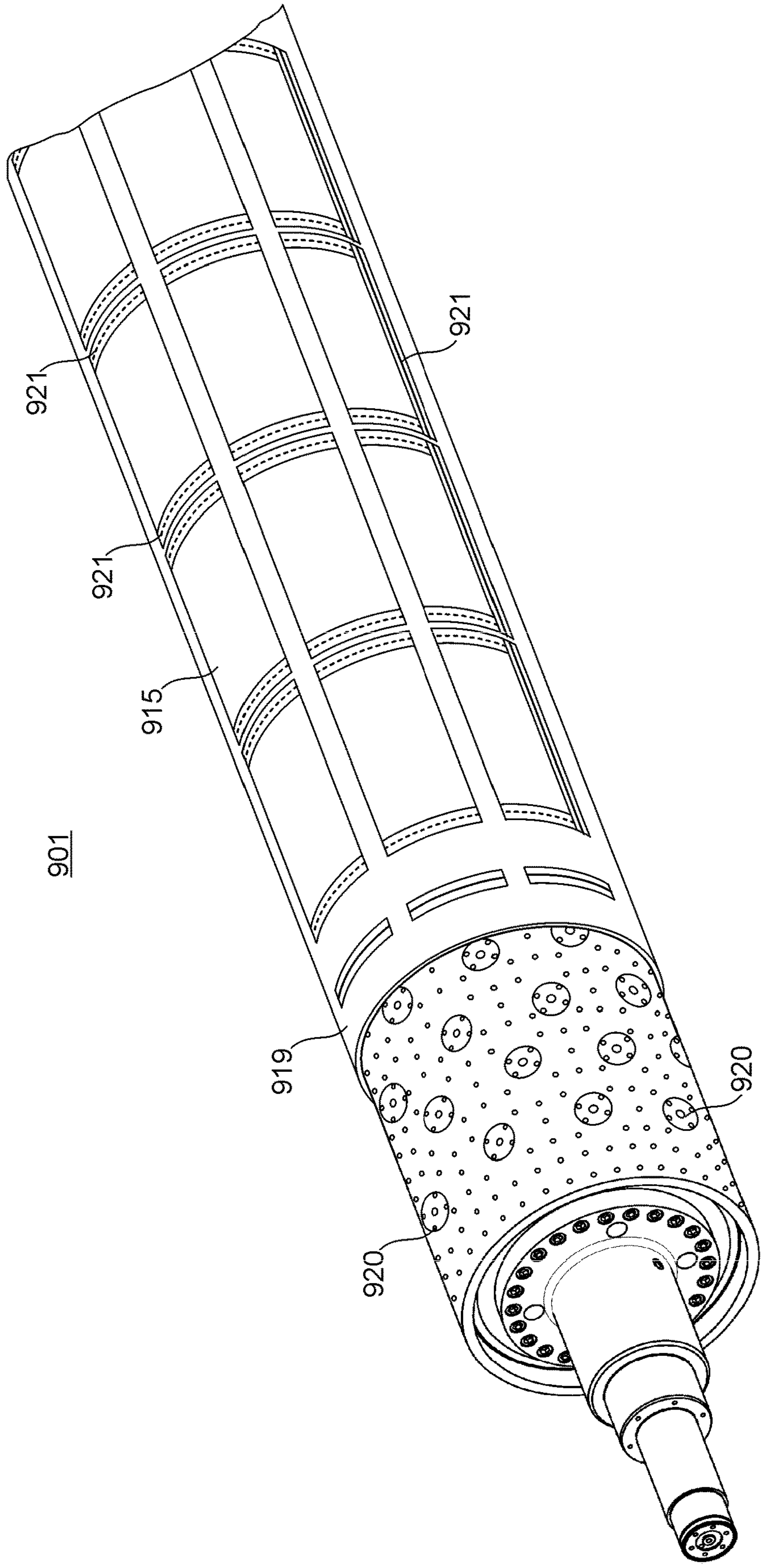
FIG. 24 a representation of a shaping cylinder in a possible embodiment.
Figure 25:
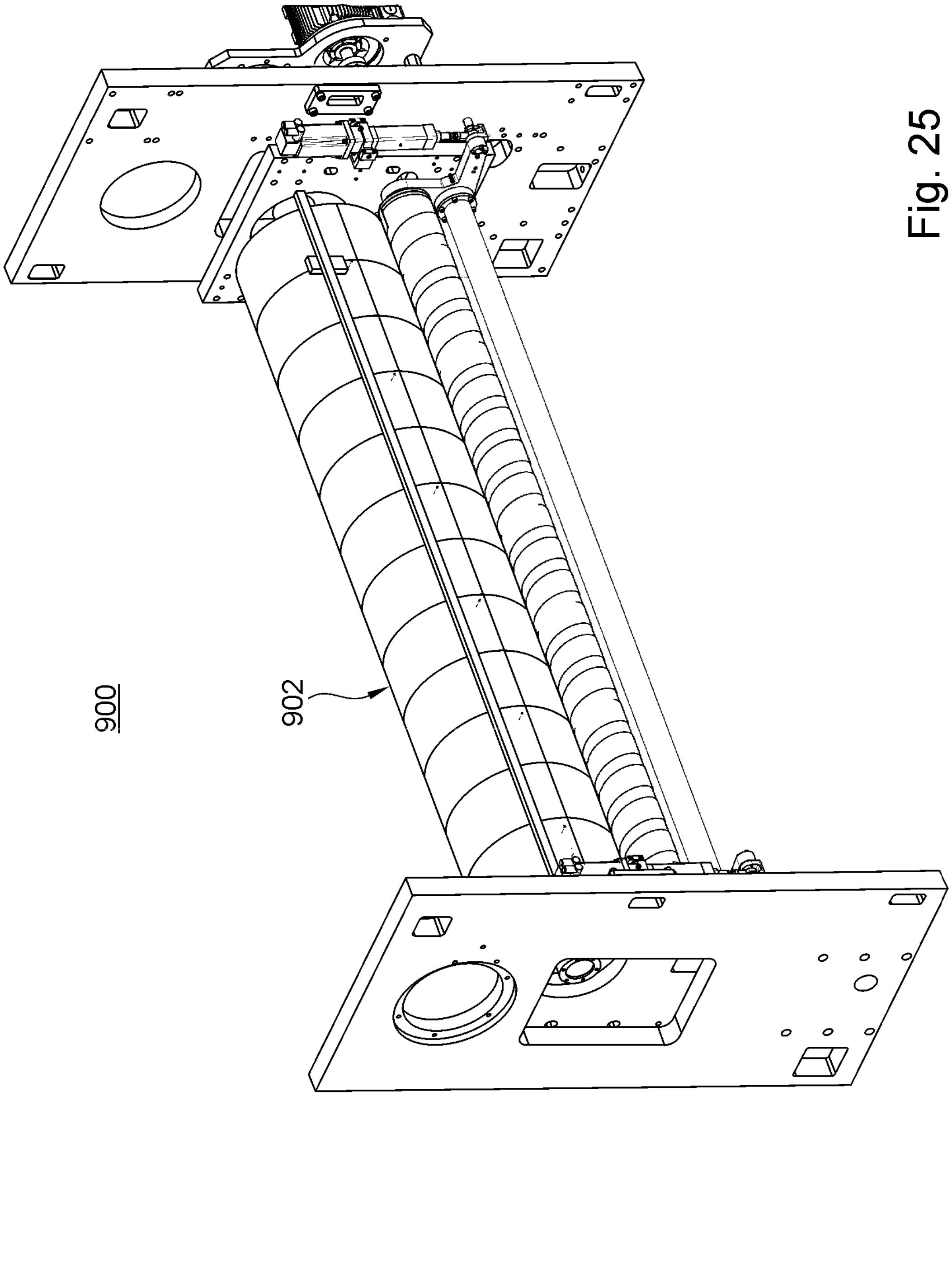
FIG. 25 a representation of the impression cylinder when installed.

A processing machine 01 is preferably configured as a printing press 01 and/or as a shaping machine 01, in particular a die-cutting machine 01. The printing press 01 is preferably configured as a flexographic printing press 01.

The processing machine 01 is preferably referred to as a printing press 01 when it comprises at least one application mechanism 614 configured as a printing unit 614 and/or at least one printing unit 600 configured as a unit 600, in particular regardless of whether it comprises additional units for processing substrate 02. A processing machine 01 configured as a printing press 01 also comprises, for example, at least one additional such unit 900, for example at least one shaping unit 900, which is preferably configured as a die-cutting unit 900, more preferably as a die-cutting device 900. The processing machine 01 is preferably referred to as a shaping machine 01 when it comprises at least one shaping mechanism 914 and/or at least one shaping unit 900, in particular regardless of whether it comprises additional units 600 for processing substrate 02. The processing machine 01 is preferably referred to as a die-cutting machine 01 when it comprises at least one die-cutting mechanism 914 configured as a shaping mechanism 914 and/or at least one die-cutting unit 900 and/or at least one die-cutting device 900, in particular regardless of whether it comprises additional units 600 for processing substrate 02. A processing machine 01 configured as a shaping machine 01 or die-cutting machine 01 also comprises, for example, at least one additional unit 600 for processing substrate 02, for example at least one printing unit 600 and/or at least one printing mechanism 614.

In a preferred embodiment, the processing machine 01, in particular a sheet processing machine 01, preferably comprises a unit 100 configured as a sheet feeder 100 and/or at least one printing mechanism 614 configured as an application mechanism 614 for applying at least one print image onto substrate 02. Thus, if the processing machine 01 comprises at least one printing mechanism 614 and/or at least one printing unit 600, and also comprises at least one shaping mechanism 914 and/or at least one shaping unit 900, it is configured both as a printing press 01 and as a shaping machine 01. If the processing machine 01 comprises at least one printing mechanism 614 and/or at least one printing unit 600, and also comprises at least one die-cutting mechanism 914 and/or at least one die-cutting unit 900 and/or at least one die-cutting device 900, it is accordingly configured both as a printing press 01 and as a shaping machine 01, in particular a die-cutting machine 01.

The processing machine 01 is preferably configured as a sheet processing machine 01, i.e., as a processing machine 01 for processing sheet-format substrate 02 or sheets 02, in particular a sheet-format print substrate 02. For example, the sheet processing machine 01 is configured as a sheet-fed printing press 01 and/or as a sheet-fed shaping machine 01 and/or as a sheet-fed die-cutting machine 01. The processing machine 01 is further preferably configured as a corrugated cardboard sheet processing machine 01, i.e., as a processing machine 01 for processing sheet-format substrate 02 or sheets 02 made of corrugated cardboard 02, in particular sheet-format print substrate 02 made of corrugated cardboard 02. The processing machine 01 is further preferably configured as a sheet-fed printing press 01, in particular as a corrugated cardboard sheet printing press 01, i.e., as a printing press 01 for coating and/or printing sheet-format substrate 02 or sheets 02 made of corrugated cardboard 02, in particular sheet-format print substrate 02 made of corrugated cardboard 02. The printing press 01 is configured as a printing press 01 that operates according to a printing forme-based printing method, for example.

Unless an explicit distinction is made, the term sheet-format substrate 02, in particular print substrate 02, specifically sheet 02, shall generally include any flat substrate 02 present in the form of sections, i.e., including substrates 02 in tabular form or panel form, i.e., including boards or panels. The sheet-format substrate 02 or sheet 02 thus defined is made, for example, of paper or paperboard, i.e., as a sheet of paper or paperboard, or by sheets 02, boards, or optionally panels made of plastic, cardboard, glass, or metal. More preferably, the substrate 02 is corrugated cardboard 02, in particular corrugated cardboard sheets 02. The at least one sheet 02 is preferably configured as corrugated cardboard 02. A thickness of a sheet 02 shall preferably be understood to mean a dimension orthogonal to a largest surface area of the sheet 02. This largest surface area is also referred to as the main surface area. Preferably, printing fluid is applied at least partially and/or at least on one side of the sheet 02 on the at least one main surface area. The thickness of the sheets 02 is, for example, at least 0.1 mm (zero point one millimeters), more preferably at least 0.3 mm (zero point three millimeters), and still more preferably at least 0.5 mm (zero point five millimeters). Considerably greater thicknesses are also customary, especially in the case of corrugated cardboard sheets 02, for example at least 4 mm (four millimeters) or also 10 mm (ten millimeters) and more. Corrugated cardboard sheets 02 are relatively stable and are therefore not very flexible. Corresponding adjustments of the processing machine 01 therefore facilitate the processing of sheets 02 of great thickness. Above and below, the term sheet 02 refers in particular both to sheets 02 that have not yet been processed by means of at least one shaping device 900, and to sheets 02 that have already been processed by means of the at least one shaping device 900 and/or by means of at least one separation device 903 and in the process have possibly been altered in terms of their shape and/or their mass.

A forward edge 03, for example leading edge 03, of the sheet 02 is preferably the edge 03 of the sheet 02 with which the relevant sheet 02 first makes contact with a unit 100; 300; 600; 700; 900; 1000 when transported through the processing machine 01. The forward edge 03 is preferably oriented parallel to a direction A, in particular transverse direction A, and/or orthogonally to a direction T, in particular transport direction T, along the transport path within the processing machine 01. A direction Y is preferably oriented perpendicularly to the forward edge 03 of the sheet 02, the direction preferably being oriented parallel to a side edge of the sheet 02, in particular if the relevant sheet 02 has a rectangular shape. The direction Y is preferably oriented parallel to the transport direction T and/or orthogonally to the transverse direction A. The sheet 02 preferably has a rear edge 04, for example trailing edge 04, with which the relevant sheet 02 last makes contact with a unit 100; 300; 600; 700; 900; 1000 when transported through the processing machine 01. The rear edge 04 is preferably arranged parallel to the forward edge 03 of the sheet 02, in particular in the case of a rectangular shape of the sheet 02. A direction X is oriented parallel to the forward edge 03 of the sheet 02, the direction preferably being oriented orthogonally to a side edge of the sheet 02, in particular if the relevant sheet 02 has a rectangular shape. The direction X is preferably oriented parallel to the transverse direction A and/or orthogonally to the transport direction T. Two side edges of the sheet 02 and the forward edge 03 of the sheet 02 and the rear edge 04 of the sheet 02 preferably delimit the main surface area of the sheet 02.

The respective sheet 02 is preferably made of paper or cardboard or paperboard. More preferably, the respective sheet 02 is made of cardboard, preferably corrugated cardboard. According to DIN 6730, paper is a flat material, consisting mainly of fibers usually derived from vegetable sources, which is formed by the dewatering of a fiber suspension on a sieve. In the process, a card web is created, which is subsequently dried. The basis weight of paper is preferably a maximum of 225 $g/m^2$ (two hundred and twenty-five grams per square meter). According to DIN 6730, cardboard is a flat material, consisting mainly of fibers derived from vegetable sources, which is formed by the dewatering of a fiber suspension on a sieve or between two sieves. The fiber structure is compressed and dried. Cardboard is preferably manufactured from cellulose and/or by gluing or pressing. Cardboard is preferably configured as solid board or corrugated cardboard 02. Above and below, corrugated cardboard 02 is cardboard made of one or more layers of corrugated paper that is glued to one layer or between multiple layers of another, preferably smooth, paper or cardboard. The basis weight of cardboard is preferably more than 225 $g/m^2$ (two hundred and twenty-five grams per square meter). Above and below, the term paperboard refers to a sheet material that is preferably primed on one side and made of paper, preferably having a basis weight of at least 150 $g/m^2$ (one hundred and fifty grams per square meter) and no more than 600 $g/m^2$ (six hundred grams per square meter). Paperboard preferably has high strength relative to paper.

Above and below, the term application fluid covers inks and printing inks, but also primers, coating materials, and pasty materials. Application fluids are preferably materials that are transferred and/or can be transferred by a processing machine 01, in particular a printing press 01, or by at least one application mechanism 614 or a unit 600 configured as an application unit 600 of the processing machine 01, in particular at least one printing mechanism 614 or printing unit 600 of the printing press 01, onto a substrate 02, in particular a print substrate 02, for example onto at least one sheet 02, thereby creating a preferably visible and/or perceptible, by sensory impressions, and/or machine detectable texture, preferably in finely structured form and/or not merely over a large surface area, on the substrate 02, in particular print substrate 02. Inks and printing inks are preferably solutions or dispersions of at least one colorant in at least one solvent, for example water and/or organic solvent. As an alternative or in addition, the application fluid may be an application fluid that cures under UV light. Inks are relatively low viscosity application fluids, and printing inks are relatively high viscosity application fluids. Inks preferably contain no binding agent or relatively little binding agent, whereas printing inks preferably contain a relatively large amount of binding agent, and more preferably contain additional auxiliary substances. Above and below, when application fluids and/or inks and/or printing inks are mentioned, this in particular also includes colorless coating materials. Above and below, when application fluids and/or inks and/or printing inks are mentioned, this preferably also includes, in particular, agents, in particular priming agents, for pretreating, known as priming or precoating, the printing substrate 02. The term printing fluid and the term coating agent shall be understood as synonymous alternatives to the term application fluid. A respective application fluid is preferably not gaseous. A respective application fluid is preferably liquid and/or powdered.

The processing machine 01 preferably comprises several units 100; 300; 600; 700; 900; 1000. A unit in this context shall preferably be understood to mean a group of devices that cooperate functionally, in particular in order to carry out a preferably self-contained processing operation of sheets 02. At least two, for example, and preferably at least three, and more preferably all of the units 100; 300; 600; 700; 900; 1000 are configured as modules 100; 300; 600; 700; 900; 1000 or at least each is assigned to such a module. A module in this context shall in particular be understood to mean a respective unit or a structure made up of multiple units, which preferably comprises at least one transport means and/or at least a dedicated drive controllable by open-loop and/or closed-loop control, and/or as an independently functioning module and/or as an individually manufactured and/or separately assembled machine unit or functional assembly. A dedicated drive, controllable by open-loop and/or closed-loop control, of a unit or module shall in particular be understood to mean a drive that is used to power the movements of components of this unit or module and/or that is used to transport substrate 02, in particular sheets 02, through this particular unit or module and/or through at least one operating zone of this particular unit or module and/or that is used to directly or indirectly drive at least one component of the particular unit or module that is intended for contact with sheets 02. These drives of the units 100; 300; 600; 700; 900; 1000 of the processing machine 01 are preferably embodied, in particular, as closed loop position-controlled electric motors.

Each unit 100; 300; 600; 700; 900; 1000 preferably comprises at least one drive control system and/or at least one drive controller, which is assigned to the respective at least one drive of the particular unit 100; 300; 600; 700; 900; 1000. The drive control systems and/or drive controllers of the individual units 100; 300; 600; 700; 900; 1000 can preferably be operated individually and independently of one another. More preferably, the drive control systems and/or drive controllers of the individual units 100; 300; 600; 700; 900; 1000 are linked and/or can be linked in terms of circuitry, in particular by means of at least one BUS system, to one another and/or to a machine control system of the processing machine 01, in such a way that coordinated open-loop and/or closed-loop control of the drives of several or all units 100; 300; 600; 700; 900; 1000 of the processing machine 01 is and/or can be carried out. Accordingly, the individual units 100; 300; 600; 700; 900; 1000 and/or in particular modules 100; 300; 600; 700; 900; 1000 of the processing machine 01 can be and/or are operated preferably electronically synchronized with one another, at least with respect to their drives, in particular by means of at least one virtual and/or electronic master axis. For this purpose, the virtual and/or electronic master axis is preferably specified, for example by a higher-level machine control system of the processing machine 01. As an alternative or in addition, the individual units 100; 300; 600; 700; 900; 1000 of the processing machine 01 are and/or can be mechanically synchronized with one another, for example, at least with respect to their drives. Preferably, however, the individual units 100; 300; 600; 700; 900; 1000 of the processing machine 01 are mechanically decoupled from one another, at least with respect to their drives.

The virtual and/or electronic master axis preferably has a sequence of temporally equidistant master axis signals. Each of these master axis signals corresponds to a time at which it is generated and/or a virtual angle value. These virtual angle values preferably range between 0° (zero degrees) and 360° (three hundred and sixty degrees) and are output in consecutively ascending order, in particular via the BUS system, wherein more preferably the process starts with 0° (zero degrees) again when 360° (three hundred and sixty degrees) has been reached. A sequence of angle values of 0° (zero degrees) to 360° (three hundred and sixty degrees) preferably corresponds to a machine cycle. The machine cycle preferably corresponds to a full revolution of a forme cylinder 616 of the application mechanism 614 and/or a distance between the leading edges 03 of sheets 02 that follow one another and are transported at a constant and identical speed and/or the time interval between two times at which sheets 02 following one another are accelerated for the first time with at least one primary acceleration means 136. Master axis signals have intervals of 4 ms (four milliseconds), for example.

The spatial area provided for the transport of substrate 02, which the substrate 02, if present, at least temporarily occupies, is the transport path. The transport path is preferably defined by at least one device for guiding the substrate 02 in an operating state of the processing machine 01. Unless described otherwise, each of the units 100; 300; 600; 700; 900; 1000 of the processing machine 01 is preferably characterized in that the section of a transport path provided for a transport of sheets 02, which is defined by the respective unit 100; 300; 600; 700; 900; 1000, is at least substantially flat, and more preferably completely flat. A substantially flat section of the transport path provided for the transport of sheets 02 in this context shall be understood to mean a section that has a minimum radius of curvature of at least two meters, more preferably at least five meters, and still more preferably at least ten meters, and still more preferably at least fifty meters. A completely flat section has an infinitely large radius of curvature and is thus likewise substantially flat and therefore likewise has a minimum radius of curvature of at least two meters. Unless described otherwise, each of the units 100; 300; 600; 700; 900; 1000 of the processing machine 01 is preferably characterized in that the section of the transport path provided for the transport of sheets 02, which is defined by the respective unit 100; 300; 600; 700; 900; 1000, extends at least substantially horizontally, and more preferably exclusively horizontally. This transport path preferably extends in a direction T, in particular in the transport direction T. A substantially horizontal transport path provided for the transport of sheets 02 means in particular that, within the entire area of the particular unit 100; 300; 600; 700; 900; 1000, the provided transport path only has one or more directions that deviate by no more than 30° (thirty degrees), preferably no more than 15° (fifteen degrees), and more preferably no more than 5° (five degrees) from at least one horizontal direction. The transport path provided for the transport of sheets 02 preferably begins at the point where the sheets 02 are removed from a feeder pile 104.

The direction T of the transport path, in particular the transport direction T, is in particular the direction T in which the sheets 02 are transported at the point at which the direction T is measured. The transport direction T provided in particular for a transport of sheets 02 is preferably the direction T that is preferably oriented at least substantially, and more preferably entirely, horizontally and/or that preferably points from a first unit 100; 300; 600; 700; 900; 1000 of the processing machine 01 to a last unit 100; 300; 600; 700; 900; 1000 of the processing machine 01, in particular from a sheet feeder unit 100 or a substrate feed device 100 on the one hand, to a delivery unit 1000 or a substrate output device 1000 on the other hand, and/or that preferably points in a direction in which the sheets 02 are transported, apart from vertical movements or vertical components of movements, in particular from a first point of contact with a unit 300; 600; 700; 900; 1000 of the processing machine 01 that is arranged downstream from the substrate feed device 100 or a first point of contact with the processing machine 01 to a last point of contact with the processing machine 01.

Regardless of whether the infeed device 300 is an independent unit 300 or module 300 or is a component of the substrate feed device 100, the transport direction T is preferably the direction T in which a horizontal component of a direction points which is oriented from the infeed device 300 to the substrate output device 1000.

A direction A, preferably the transverse direction A, is preferably a direction A that is oriented orthogonally to the transport direction T of the sheets 02 and/or orthogonally to the intended transport path of the sheets 02 through the at least one application unit 600 and/or through the at least one shaping unit 900 and/or through the at least one sheet delivery unit 1000. The transverse direction A is preferably a horizontally oriented direction A. A longitudinal axis of the at least one forme cylinder 616 is preferably oriented parallel to the transverse direction A.

A working width of the processing machine 01 and/or of the at least one application unit 600 and/or of the at least one shaping unit 900 and/or of the at least one sheet delivery unit 1000 is preferably a dimension that extends preferably orthogonally to the provided transport path of the sheets 02 through the at least one application unit 600 and/or the at least one shaping unit 900 and/or the at least one sheet delivery unit 1000, more preferably in the transverse direction A. The working width of the processing machine 01 preferably corresponds to a maximum width that a sheet 02 may have in order to still be processable by the processing machine 01, i.e., in particular a maximum sheet width that can be processed by the processing machine 01. The width of a sheet 02 shall, in particular, be understood to mean its dimension in the transverse direction A, in particular the direction X. This is preferably independent of whether this width of the sheet 02 is greater than or smaller than a horizontal dimension of the sheet 02 orthogonal thereto, which more preferably represents the length of this sheet 02 in the direction Y. The working width of the processing machine 01 preferably corresponds to the working width of the at least one application unit 600 and/or of the at least one shaping unit 900 and/or of the at least one sheet delivery unit 1000. The working width of the processing machine 01, in particular sheet processing machine 01, is preferably at least 100 cm (one hundred centimeters), more preferably at least 150 cm (one hundred and fifty centimeters), still more preferably at least 160 cm (one hundred and sixty centimeters), still more preferably at least 200 cm (two hundred centimeters), and still more preferably at least 250 cm (two hundred and fifty centimeters).

A vertical direction V preferably denotes a direction that is parallel to the normal vector of a plane spanned by the transport direction T and the transverse direction A. For example, in the region of the shaping device 900, the vertical direction V is preferably oriented so as to point from the print substrate 02 toward a forme cylinder 901 of the shaping device 900.

The processing machine 01 preferably comprises at least one substrate feed device 100, which more preferably is configured as a unit 100, in particular a substrate feed unit 100, and/or as a module 100, in particular a substrate feed module 100. In particular in the case of a sheet processing machine 01, the at least one substrate feed device 100 is preferably configured as a sheet feeder 100 and/or sheet feeder unit 100 and/or sheet feeder module 100.

For example, the processing machine 01 comprises at least one unit configured as a conditioning device, in particular a conditioning unit, which is more preferably configured as a module, in particular as a conditioning module. Such a conditioning device is, for example, configured as a pre-processing device, in particular as a pre-processing device for applying primer, or as a post-processing device, in particular as a post-processing device for applying varnish. The processing machine 01 preferably comprises at least one unit configured as a pre-processing device, in particular a pre-processing unit, which more preferably is configured as a module, in particular as a pre-processing module and represents a conditioning device. The processing machine 01 preferably comprises at least one post-processing device. The processing machine 01 preferably comprises at least one unit 300, preferably an infeed device 300, which is more preferably configured as an infeed unit 300 and/or infeed module 300. Alternatively, the at least one infeed device 300 is configured as a component of the substrate feed device 100 or of another unit.

For example, the processing machine 01 comprises at least one unit 600, for example the application unit 600, which is preferably configured as a module 600, in particular an application module 600. The at least one application unit 600 is preferably arranged and/or designed based on its function and/or application method. The at least one application unit 600 is preferably used to apply at least one respective application fluid or coating agent over the entire surface area and/or at least a portion of the surface area of the sheets 02. One example of an application unit 600 is a printing unit 600 or printing module 600, which is used in particular for applying printing ink and/or ink onto substrate 02, in particular sheets 02. Above and below, an optionally provided priming unit and/or an optional varnishing unit may also be considered to be such an application unit 600 or printing unit 600.

Independently, in particular, of the function of the application fluid that can be applied by the application units 600, these units can preferably be distinguished in terms of their application method. One example of an application unit 600 is a forme-based application unit 600, which comprises, in particular, at least one fixed, physical, and preferably exchangeable printing forme for the application of printing fluid. Forme-based application units 600 preferably operate according to a planographic printing process, in particular an offset planographic printing process, and/or according to a gravure printing process, and/or according to a letterpress printing process, in particular preferably according to a flexographic printing process. The corresponding application unit 600 is preferably a flexographic application unit 600 or flexographic printing unit 600, in particular a flexographic application module 600 or flexographic printing module 600. In another preferred embodiment, the at least one application unit 600 is configured as an offset printing unit 600.

The processing machine 01, for example, comprises at least one unit configured as a drying device, in particular a drying unit, which is more preferably configured as a module, in particular as a drying module. As an alternative or in addition, at least one drying device 506 and/or at least one after-drying device, for example, is a component of at least one unit 100; 300; 600; 700; 900; 1000 preferably configured as a module 100; 300; 600; 700; 900; 1000. For example, at least one application unit 600 comprises at least one drying device 506 and/or comprises at least one unit 700 configured as a transport device 700 and/or at least one unit configured as a transport unit 700.

The processing machine 01 preferably comprises at least one transport device 700, which more preferably is configured as a unit 700, in particular the transport unit 700, and/or as a module 700, in particular as a transport module 700. The transport device 700 is also referred to as a transport means

700. In addition, or as an alternative, the processing machine 01 preferably comprises transport devices 700, for example as components of other units and/or modules.

The processing machine 01 preferably comprises at least one shaping device 900, which more preferably is configured as a unit 900, in particular a shaping unit 900 or die-cutting unit 900, and/or as a module 900, in particular as a shaping module 900 or die-cutting module 900 and/or as a die-cutting device 900. The processing machine 01 preferably comprises at least one shaping unit 900 configured as a die-cutting unit 900. The at least one shaping device 900 is preferably configured as a rotary die-cutting device 900 and/or preferably comprises at least one shaping mechanism 914 or die-cutting mechanism 914. A shaping device 900 shall also be understood to mean a stamping device and/or a creasing device. A perforating device is preferably likewise a form of a die-cutting device 900.

The processing machine 01 preferably comprises at least one unit 1000 configured as a substrate output device 1000, in particular a delivery 1000, in particular a sheet delivery 1000, in particular a delivery unit 1000, which is more preferably configured as a module 1000, in particular as a delivery module 1000.

The processing machine 01, for example, comprises at least one unit configured as a post-press processing device, in particular a post-press processing unit, which is more preferably configured as a module, in particular as a post-press processing module. The post-press processing unit is preferably arranged downstream from the at least one shaping device 900 in the transport direction T. For example, the post-press processing unit is arranged downstream from the at least one sheet delivery 1000 in the transport direction T. For example, the at least one post-press processing device is configured as a gluing device and/or folding device.

The processing machine 01 preferably comprises transport means 119; 136; 700; 904; 906 at one or more points. At least one of these transport means 119; 136; 700; 906 is preferably configured as a suction transport means 119; 136; 700; 906, in particular as a suction belt and/or as a suction box belt and/or as a roller suction system and/or as a suction roller. Such suction transport means 119; 136; 700; 906 are preferably used to move sheets 02 forward in a controlled manner and/or to enable movements while sheets 02 are held against at least one counterpressure surface of the corresponding suction transport means 119; 136; 700; 906. A relative vacuum is preferably used in the process to pull and/or to press the sheets 02 against at least one transport surface. A transporting movement of the sheets 02 is preferably produced by a corresponding, in particular revolving, movement of the at least one transport surface. As an alternative or in addition, the sheet 02 is held in its path, for example along the transport path provided for the transport of sheets 02, by the at least one suction transport means 119; 136; 700; 906, and a transporting movement of the sheet 02 is produced in the process by a force that is predefined by another transport means 119; 136; 700; 904; 906 situated upstream and/or downstream, for example. The vacuum is in particular a vacuum relative to an ambient pressure, in particular relative to an atmospheric pressure.

The suction transport means 119; 136; 700; 906 shall thus preferably be understood to mean a device that has at least one counterpressure surface, which more preferably is configured as a sliding surface and/or in particular as a movable transport surface, and which is at least partially movable, for example, at least in the transport direction T. Furthermore, the respective suction transport means 119; 136; 700; 906 preferably comprises at least one vacuum chamber, which more preferably is connected to at least one vacuum source by means of a suction line. The vacuum source comprises a fan, for example. The at least one vacuum chamber has at least one suction opening, which is used to apply suction to the sheets 02. Depending on the embodiment of the suction transport means 119; 136; 700; 906 and the size of the sheets 02, the sheets 02 are drawn by suction into a position in which they close off the at least one suction opening or are merely drawn by suction against a counterpressure surface in such a way that ambient air can still travel past the sheets 02 and into the suction opening. The transport surface has one or more intake openings, for example. The intake openings are preferably used to pass a vacuum from the suction opening of the vacuum chamber to the transport surface, in particular without pressure losses or with very low pressure losses. As an alternative or in addition, the suction opening acts on the sheets 02 in such a way that these are drawn by suction against the transport surface, even though the transport surface has no intake openings. At least one deflection means is provided, for example, which directly or indirectly ensures a revolving movement of the at least one transport surface. The at least one deflection means and/or the transport surface preferably are and/or can be self-propelled, in particular to ensure movement of the sheets 02. Alternatively, the transport surface allows sheets 02 to slide along the transport surface.

A first embodiment of a suction transport means 119; 136; 700; 906 is a suction belt. A suction belt shall be understood to mean a device that comprises at least one flexible transport belt, the surface of which serves as a transport surface. The at least one transport belt is preferably deflected by deflection means configured as deflection rollers and/or deflecting cylinders and/or is preferably self-contained, in particular such that continuous circulation is enabled. The at least one transport belt preferably has a multiplicity of intake openings. The at least one transport belt preferably covers the at least one suction opening of the at least one vacuum chamber over at least a portion of its circulation path. More preferably, the vacuum chamber is only connected to a surrounding environment and/or to sheets 02 by way of the intake openings of the at least one transport belt. Support means are preferably provided, which prevent the at least one transport belt from being pulled too far or at all into the vacuum chamber and/or which ensure that the transport surface assumes a desired shape, for example such that it forms a flat surface, at least in the region in which its intake openings are connected to the vacuum chamber. A revolving movement of the at least one transport belt then results in a forward movement of the transport surface, with sheets 02 being held securely on the transport surface precisely in the region where they are situated opposite the suction opening that is covered by the at least one transport belt, with the exception of the intake openings.

A second embodiment of a suction transport means 119; 136; 700; 906 is a roller suction system. A roller suction system shall be understood to mean a device in which the at least one transport surface is formed of at least sections of lateral surfaces of a multiplicity of transport rollers and/or transport cylinders. Thus, each of the transport rollers and/or transport cylinders forms a part of the transport surface that is closed, for example, and/or that circulates as a result of rotation. The roller suction system preferably has a multiplicity of suction openings. These suction openings are preferably arranged at least between adjacent transport rollers and/or transport cylinders. At least one covering mask is provided, for example, which preferably represents a boundary of the vacuum chamber. The covering mask preferably has the multiplicity of suction openings. The covering mask preferably forms a substantially flat surface. The transport rollers and/or transport cylinders are preferably arranged in such a way that they are intersected by this flat surface and more preferably protrude only slightly, for example only a few millimeters, beyond this flat surface, in particular in a direction facing away from the vacuum chamber. The suction openings then preferably have a frame-like configuration, with each opening surrounding at least one of the transport rollers and/or transport cylinders. A revolving movement of the transport rollers and/or transport cylinders then results in a forward movement of the corresponding parts of the transport surface, with sheets 02 being held securely on the transport surface precisely in the region in which they are situated opposite the suction opening. The transport unit 700 is preferably in each case configured as the at least one suction transport means 700. A suction transport means 700 preferably comprises at least two roller suction systems, which are preferably each configured as individually driven roller suction systems. The roller suction system is also referred to as a suction box.

A third embodiment of a suction transport means 119; 136; 700; 906 is a suction box belt. A suction box belt shall be understood to mean a device that comprises a plurality of in particular circulating suction boxes, each of which has an outer surface that serves as a transport surface.

A fourth embodiment of a suction transport means 119; 136; 700; 906 is at least one suction roller. A suction roller shall be understood to mean a roller which has a lateral surface that serves as a transport surface and has a multiplicity of intake openings, and which has at least one vacuum chamber in its interior, which is connected to at least one vacuum source, for example by means of a suction line.

A fifth embodiment of a suction transport means 119; 136; 700; 906 is at least one sliding suction device. The sliding suction device is preferably configured as a passive transport means and is used, in particular, to establish boundary conditions with respect to a position of a respective sheet 02, without setting the sheet 02 itself in motion. The respective sliding suction device preferably includes at least one sliding surface and at least one vacuum chamber and at least one suction opening. The at least one sliding surface then serves as a counterpressure surface and serves as a transport surface. In the case of the sliding suction device, the transport surface configured as a sliding surface is preferably not moved. The sliding surface serves as a counterpressure surface against which the corresponding sheets 02 are pressed. The sheets 02 can nevertheless be moved along the sliding surface, in particular to the extent that they are acted upon otherwise by a force that is at least also oriented parallel to the sliding surface. A region between two driven suction transport means 119; 136; 700; 906 can be bridged by means of a sliding suction device, for example.

It is possible for different embodiments of suction transport means 119; 136; 700; 906 to be combined. These suction transport means can, for example, comprise at least one shared vacuum source and/or at least one shared vacuum chamber and/or can cooperate as a suction transport means 119; 136; 700; 906 and/or can be arranged one behind the other and/or side by side. Each such combination is then preferably to be assigned to at least two of the embodiments of suction transport means 119; 136; 700; 906.

Regardless of the embodiment of the particular suction transport means 119; 136; 700; 906, at least two arrangements of the particular suction transport means 119; 136; 700; 906 as described below are possible.

In a first arrangement, a section of the transport path provided for the transport of sheets 02 which is defined by the particular suction transport means 119; 136; 700; 906 is situated beneath the, in particular movable, transport surface, which serves, in particular, as a counterpressure surface and, for example, can be moved at least partially at least in the transport direction T. For example, the particular suction transport means 119; 136; 700; 906 is then configured as an upper suction transport means 700; 906, wherein more preferably its suction openings or intake openings, at least while these are connected to the at least one vacuum chamber, preferably at least also or only point downwardly and/or its suctioning action is preferably at least also or only directed upwardly. The sheets 02 are then transported, preferably in a hanging state, by the suction transport means 119; 136; 700; 906. The at least one transport unit 700 is preferably configured as an upper suction transport means 700. The at least one transport means 906 is preferably configured as an upper suction transport means 906.

In a second arrangement, a section of the transport path provided for the transport of sheets 02 which is defined by the particular suction transport means 119; 136; 700; 906 is situated above the, in particular movable, transport surface, which serves, in particular, as a counterpressure surface and, for example, can be moved at least partially in the transport direction T. For example, the particular suction transport means 119; 136; 700; 906 is then configured as a lower suction transport means 119; 136; 700; 906, wherein more preferably its suction openings or intake openings, at least while these are connected to the at least one vacuum chamber, preferably at least also or only point upwardly and/or its suctioning action is preferably at least also or only directed downwardly. The sheets 02 are then transported, preferably in a lying state, by the suction transport means 119; 136; 700; 906. At least two suction transport means 119; 136 are preferably configured as lower suction transport means 119; 136.

The processing machine 01 for processing sheets 02 comprises the at least one application unit 600 and at least one sheet sensor 622 that is assigned to the respective application unit 600. The processing machine 01 is preferably configured as a sheet processing machine 01 comprising the substrate feed device 100 and the at least one application unit 600 and the at least one shaping device 900, and more preferably comprising the at least one delivery 1000 arranged along the transport path provided for the transport of sheets 02, downstream from the at least one shaping device 900.

The substrate feed device 100 preferably comprises the infeed unit 300. The infeed unit 300 preferably comprises the at least one feeder pile 104. The feeder pile 104 preferably comprises a multiplicity of sheets 02, which are preferably present at least temporarily in a stacked manner in a storage area 166. In the transport direction T, the storage area 166 is preferably delimited by at least one front stop 137. The front stop 137 is preferably configured in such a way that in each case an individual sheet 02 is configured so as to be transportable in the vertical direction V beneath the front stop 137 in the transport direction T. For a transport of sheets 02, in particular of the bottommost sheet 02 in the vertical direction V, in the transport direction T, the at least one transport means 136, which is preferably configured as an acceleration means 136, is assigned to the storage area 166. The acceleration means 136 is preferably configured as a lower suction transport means 136. The acceleration means 136 is preferably used to accelerate sheets 02 of the feeder pile 104 to a target transport speed, in particular a processing speed, of sheets 02, with which, preferably, the sheets 02 within the processing machine 01 are preferably transported to a processing operation of the sheets 02 by the units 100; 300; 600; 700; 900; 1000. The transport means 119 configured as a secondary acceleration means 119 is preferably arranged downstream from the acceleration means 136 in the transport direction T. The secondary acceleration means 119 is preferably configured as a transport belt and/or a transport cylinder, more preferably as a lower suction transport means 119. The secondary acceleration means 119 is preferably configured to adapt a real transport speed of sheets 02 to the processing speed as soon as their real transport speed deviates from the processing speed.

The at least one transport unit 700, in particular a first transport unit 700, is preferably arranged in the transport direction T downstream from the infeed unit 300, in particular downstream from the secondary acceleration means 119. For example, at least one transfer means is preferably provided for transferring sheets 02 from the secondary acceleration means 119 to the transport unit 700 which is preferably configured as an upper suction transport means 700.

The at least one application unit 600, including the at least one application mechanism 614 configured as a printing mechanism 614, is preferably arranged downstream from the first transport unit 700 in the transport direction. The at least one application unit 600 in each case comprises the at least one printing mechanism 614, including the forme cylinder 616, and a dedicated drive 631; 630 assigned to the forme cylinder 616. The at least one application unit 600 is preferably embodied as a flexographic application unit 600 or as an offset printing unit 600. The processing machine 01 preferably comprises at least four application units 600, in particular flexographic application units 600. For example, the processing machine 01 comprises at least six application units 600, wherein the individual application units 600 preferably at least partially differ in the printing fluid they process and/or a print image element they apply onto the print substrate 02. Preferably, at least one respective transport means 700 is arranged in each case between two application units 600. The at least one printing mechanism 614 is preferably configured as a flexographic printing unit, which is in particular configured according to the principle of the flexographic printing method for applying printing fluid onto the sheet 02. In a preferred embodiment, the application mechanism 614 comprises the at least one forme cylinder 616, at least one impression cylinder 617, at least one anilox roller 618 and at least one ink fountain 619. The ink fountain 619 preferably includes the printing fluid and is designed to dispense the printing fluid to the anilox roller 618. The anilox roller 618 is designed to transfer the printing fluid to at least one printing forme of the forme cylinder 616 for printing a print substrate 02. The forme cylinder 616 and the impression cylinder 617 preferably define a processing point 621 of the application mechanism 614. The processing point 621, which is configured as a press nip 621 and through which sheets 02 can preferably pass through the printing mechanism 614, is preferably defined by an outer cylindrical surface of the forme cylinder 616 and an outer cylindrical surface of the impression cylinder 617. The press nip 621 is preferably the region in which the particular forme cylinder 616 on the one hand and the particular counter-pressure cylinder 617 on the other hand are closest to one another.

In a preferred embodiment of the processing machine 01, the printing mechanism 614 in each case comprises the at least one forme cylinder 616. The forme cylinder 616 comprises at least the one printing forme and at least one mount 626 for the at least one printing forme. The mount 626 of the printing forme is configured as a clamping device, for example. Along a circumferential direction of the outer cylindrical surface of the forme cylinder 616, the mount 626 of the printing forme is preferably configured as a non-printing region of the outer cylindrical surface of the forme cylinder 616. In the circumferential direction of the forme cylinder 616, the non-printing region of the forme cylinder 616 preferably has a length that is preferably at least 3%, preferably at least 5%, more preferably at least 8%, of the circumferential length of the forme cylinder 616. The length of the non-printing region is preferably defined by the length in the circumferential direction of the printing region of the forme cylinder 616, in particular the length of the at least one printing forme in the circumferential direction of the forme cylinder 616. In a preferred embodiment, the non-printing region corresponds to a cylinder channel of the at least one forme cylinder 616.

In the non-printing region of the outer cylindrical surface of the forme cylinder 616, preferably no printing fluid is transferred from the outer cylindrical surface of the forme cylinder 616 onto sheets 02 during a printing operation of the processing machine 01. Printing fluid is preferably only transferred from the forme cylinder 616 onto sheets 02 within the region of the outer cylindrical surface of the forme cylinder 616 which includes the at least one printing forme. The region of the outer cylindrical surface of the forme cylinder 616 which includes the at least one printing forme is preferably configured as the printing region of the outer cylindrical surface of the forme cylinder 616. Preferably the at least one printing forme, more preferably exactly one printing forme, and the at least one non-printing region, preferably exactly one non-printing region, are arranged one behind the other along the circumferential direction of the outer cylindrical surface of the forme cylinder 616. In the direction of rotation of the forme cylinder 616, the mount 626 is preferably arranged upstream from the printing region of the forme cylinder 616, more preferably a rear edge of the non-printing region of the forme cylinder 616 is arranged upstream from the printing region of the forme cylinder 616 in the direction of rotation of the forme cylinder 616. A forward edge of the printing region of the forme cylinder 616 is preferably identical to the rear edge of the non-printing region of the forme cylinder 616.

In the embodiment of the at least one application unit 600 as an offset printing unit 600, the unit 600 comprises an additional cylinder, which is preferably configured as a blanket cylinder, between the at least one forme cylinder 616 and the at least one impression cylinder 617.

Preferably, the forme cylinder 616 is configured so as to be driven and/or is driven by the drive configured as a dedicated drive 631. Preferably, the dedicated drive 631 of the forme cylinder 616 is preferably configured as a closed loop position-controlled electric motor 631. The forme cylinder 616 is in each case driven mechanically independently of any further cylinder and/or roller of the printing mechanism 614.

In a preferred embodiment, the impression cylinder 617 preferably has a continuous surface along a circumferential direction of the impression cylinder 617. This is the case, for example, when the impression cylinder 617 has a sleeve as the outer cylindrical surface. In this embodiment, the impression cylinder 617 is, for example, configured so as to be drivable by the dedicated drive 630 of the forme cylinder 616, in addition to the forme cylinder 616. As an alternative or in addition, the impression cylinder 617 preferably comprises a separate dedicated drive, in particular a preferably closed loop position-controlled electric motor 630. As an alternative or in addition, the impression cylinder 617 is driven and/or can be driven via a drive of the virtual and/or electronic master axis. For example, the impression cylinder 617, which has a continuous surface, has a circumference that differs from the circumference of the assigned forme cylinder 616, and preferably is smaller than the circumference of the assigned forme cylinder 616.

In a further, preferred embodiment, the impression cylinder 617 is preferably configured as a plate cylinder and, additionally or alternatively, preferably comprises at least one impression plate. The diameter of the impression cylinder 617 configured as a plate cylinder preferably corresponds to the circumference of the forme cylinder 616. For attaching the at least one impression plate, the impression cylinder 617 comprises at least one mount 627. The mount 627 of the impression cylinder 617 preferably has the same size along the outer cylindrical surface of the impression cylinder 617 as the mount 626 along the outer cylindrical surface of the forme cylinder 616. Preferably, the mount 627 of the impression cylinder 617, preferably along the outer cylindrical surface of the impression cylinder 617, is arranged in such a way that the positions of the mounts 626; 627 are configured so as to be synchronizable with one another during a rotational movement of the impression cylinder 617 assigned to the processing speed and a rotational movement of the forme cylinder 616 assigned to the processing speed. During a rotational movement assigned to the processing speed, the mounts 626; 627 preferably each arrive at the respective press nip 621 at the same time as a respective forward edge of the mounts 626; 627. During a rotational movement assigned to the processing speed, the mounts 626; 627 are preferably each configured to leave the respective press nip 621 at the same time as a respective rear edge of the mounts 626; 627.

For example, at least one first application unit 600, in the transport direction T, is configured as a priming mechanism and/or at least one last application unit 600, in the transport direction T, is configured as a varnishing mechanism.

The at least one shaping device 900 including the at least one shaping mechanism 914 is preferably arranged downstream from the at least one application unit 600, preferably downstream from the last application unit 600, in the transport direction T. The at least one shaping device 900 is preferably configured as a die-cutting device 900 and/or as a rotary die-cutting device 900. For example, exactly one shaping device 900, in particular die-cutting device 900 and/or rotary die-cutting device 900, is provided. The at least one shaping device 900 preferably comprises at least one, and more preferably exactly one, processing point 910 preferably configured as a shaping point 910, which is formed by at least one, and more preferably exactly one forme cylinder 901, in particular configured as a die plate cylinder 901, on the one hand, and at least one impression cylinder 902 on the other hand. The shaping point 910 is preferably the region in which the particular plate cylinder 901 and the particular counterpressure cylinder 902 are closest to one another. The at least one shaping point 910 is preferably configured as at least one die-cutting point 910. The shaping device 900, in particular the shaping mechanism 914, preferably comprises at least one tool, and more preferably the at least one forme cylinder 901 comprises at least one tool. In a preferred embodiment, the tool of the shaping device 900, in particular of the shaping mechanism 914, preferably the tool of the forme cylinder 901, is at least temporarily in direct contact with the impression cylinder 902, in particular in the region of the shaping point 910.

A sheet 02 that has been processed by the shaping device 900, i.e., that is arranged downstream from the at least one shaping point 910 on the transport path in the transport direction T, preferably has at least one die-cut impression 1103. The at least one die-cut impression 1103 is configured as a crease and/or a score mark and/or an embossment and/or a cut and/or a perforation, for example. The at least one die-cut impression 1103, in particular when it is embodied as a perforation and/or a cut, is preferably configured to at least partially separate at least one multiple-up 1101 from at least one scrap piece and/or from at least one further multiple-up 1101. A sheet 02 that has been processed by the shaping device 900, i.e., that is arranged downstream from the at least one shaping point 910 on the transport path in the transport direction T, preferably comprises at least one multiple-up 1101, preferably at least two multiple-ups 1101, and at least one scrap piece.

Above and below, according to DIN 16500-2 the term multiple-up 1101 preferably refers to the number of identical objects that are produced from the same piece of material and/or are arranged on shared substrate material, for example a shared sheet 02. A multiple-up 1101 is preferably the region of a sheet 02 that is either configured as a product of the sheet processing machine 01, in particular as an intermediate product for producing an end product, for example as a blank, and/or, for example, is further processed and/or is configured to be further processable to the desired or required end product. Each of the at least one multiple-up 1101 of the respective sheet 02 preferably includes the at least one print image. Here, the desired or required end product, which was generated by the particular multiple-up 1101, or preferably by further processing of the particular multiple-up 1101, is preferably a folder-type box and/or a telescope-type box and/or a slide-type box and/or a rigid-type box.

Above and below, an offcut piece, preferably a scrap piece, is the region of a sheet 02 that does not correspond to any multiple-up 1101. An offcut piece is preferably configured as a scrap piece and/or trimmed-off piece and/or broken-off piece and is preferably configured so as to be at least partially removable from at least one multiple-up 1101. During operation of the sheet processing machine 01, the at least one scrap piece is preferably produced at the at least one shaping point 910 of the shaping device 900, for example during at least one die-cutting process, and is preferably at least partially, preferably entirely, removed from the particular sheet 02 during operation of the sheet processing machine 01.

As an alternative or in addition, the sheet processing machine 01 is preferably characterized in that the at least one separation device 903 for removing at least one scrap piece from at least one sheet 02 is arranged downstream from the at least one shaping point 910 along the transport path provided for the transport of sheets 02. The separation device 903 is preferably configured to entirely remove scrap pieces from the particular sheet 02. The at least one separation device 903 is thus used, in particular, to separate offcut pieces, in particular of the former portions of the sheet 02 that were already entirely or partially detached from the sheet 02 and are to be removed from the sheet 02, from multiple-ups 1101, in particular those portions of the sheet 02 that are to continue to be treated as sheets 02 and, if necessary, to be further processed. The at least one separation device 903 is configured as a separation unit 903 and/or as a separation module 903, for example. As an alternative, the at least one separation device 903 is a component of another unit 900 or module 900, in particular of the at least one shaping unit 900 or shaping module 900.

The at least one separation device 903 preferably comprises at least one transport means 904 configured as a separation transport means 904, in particular for transporting sheets 02. The at least one separation transport means 904 is preferably used to transport respective sheets 02 along the transport path provided for the transport of sheets 02 and/or in the direction of transport T while scrap pieces are removed from the respective sheets 02. The scrap pieces are preferably transported in a respective direction that has at least one component which is oriented orthogonally to the transport direction T, preferably counter to a vertical direction V, for example vertically downwardly. Preferably, at least the force of gravity is also utilized to remove such scrap pieces from the particular sheet 02. In this way, it is preferably only necessary to apply a force that severs the respective scrap piece from the respective sheet 02, and the respective scrap piece is then carried away by gravity in a direction that has at least one component which is oriented orthogonally to the transport direction T, preferably downwardly.

Preferably, exactly one separation transport means 904 is arranged along the transport path provided for the transport of sheets 02. As an alternative, several, for example differently configured, separation transport means 904 are arranged along the transport path provided for the transport of sheets 02. As an alternative or in addition, the sheet processing machine 01 is preferably characterized in that the at least one separation transport means 904 is configured to act and/or to be capable of acting on sheets 02 both from above and from beneath. This enables sheets 02 to be transported with sufficient precision along the transport path provided for the transport of sheets 02 despite the action of the at least one separation device 903. As an alternative or in addition, the sheet processing machine 01 is preferably characterized in that the at least one separation transport means 904 comprises several upper separation transport belts arranged side by side and spaced apart from one another, based on the transverse direction A, and/or several lower separation transport belts arranged side by side and spaced apart from one another, based on the transverse direction A. Separation transport belts are configured as continuous and/or revolving belts, for example, which more preferably have a relatively small dimension in the transverse direction A, for example less than 5 cm (five centimeters), preferably less than 2 cm (two centimeters), and more preferably less than 1 cm (one centimeter). Based on the transverse direction A, relatively large distances between respective adjacent separation transport belts are preferably, for example, at least 2 cm (two centimeters), more preferably at least 5 cm (five centimeters), still more preferably at least 10 cm (ten centimeters), and still more preferably at least 20 cm (twenty centimeters). In this way, scrap pieces can be moved through, in particular can drop through, between the separation transport belts in a direction that has at least one component which is oriented orthogonally to the transport direction T, preferably in or counter to the vertical direction V, more preferably downwardly and/or upwardly. As an alternative or in addition, the sheet processing machine 01 is preferably characterized in that the at least one separation transport means 904 is different from any suction transport means, i.e., is not configured as a suction transport means.

As an alternative or in addition, the sheet processing machine 01 is preferably characterized in that the at least one separation device 903 is configured as at least one jogging device 903 and/or that the at least one separation device 903 comprises at least one jogging drive. The at least one jogging drive can preferably be used to deflect at least one separation transport belt orthogonally to its local transfer direction. A local transfer direction shall be understood to mean the direction in which a respective element of the respective separation transport belt is moved based on a revolving movement of the respective separation transport belt, in particular apart from any superimposed deflection movements. The at least one jogging drive thus preferably serves to jog the respective sheet 02, in particular by movements in directions orthogonal to the direction of transport T. Such movements are only necessary in the case of a small deflection, for example. For example, the at least one jogging drive is arranged so as to act and/or be capable of acting directly or indirectly on the at least one separation transport means 904 and/or at least one separation transport belt, for example via at least one impact shaft. For example, the at least one jogging drive is arranged so as to act and/or be capable of acting directly or indirectly on at least one deflection means and/or at least one guide means of at least one separation transport belt. At least one electric and/or at least one pneumatic and/or at least one hydraulic and/or at least one magnetic drive is provided as the jogging drive, for example. Alternatively or additionally, the at least one separation device 903 comprises at least one separation fan, for example, which further preferably serves to remove scrap pieces from the respective sheets 02 by means of at least one at least temporarily activated flow of gas.

As an alternative or in addition, the sheet processing machine 01 is preferably characterized in that at least one transport means 906 configured as a selective transport means 906 is arranged along the transport path provided for the transport of sheets 02, in particular downstream from the at least one separation transport means 904 along the transport path provided for the transport of sheets 02. The at least one transport means 906 configured as a selective transport means 906 is preferably arranged so as to follow the at least one separation transport means 904 along the transport path provided for the transport of sheets 02, in particular directly follow the at least one separation transport means 904. A selective transport means 906 shall in particular be understood to mean a transport means 906 that only transports and/or is configured to be capable of only transporting selected objects, for example exclusively sheets 02 and/or no offcut pieces. For example, at least one position and/or at least one dimension of the particular object, in particular with respect to the transverse direction A, is used as a distinguishing criterion. The at least one selective transport means 906 is preferably configured as at least one upper suction transport means 906 for a hanging transport of sheets 02, more preferably as at least one exclusively upper suction transport means 906 and/or for an exclusively hanging transport of sheets 02. Any offcut pieces can then also drop out counter to the vertical direction V, preferably downwardly, downstream from the at least one separation transport means 904, and can be moved away from the sheets 02 without interfering with subsequent processes. The sheet processing machine 01 is preferably characterized in that the sheet processing machine 01 comprises at least one transport means 906, in particular an upper suction transport means 906, downstream from the separation device 903 in the transport direction T along the transport path provided for the transport of sheets 02, which is configured for the hanging transport of sheets 02, preferably for the hanging transport of the at least one remaining portion of the at least one sheet 02 processed by the shaping device 900, the sheet including the at least one multiple-up 1101.

The at least one substrate output device 1000 is preferably arranged in the transport direction T downstream from the at least one shaping unit 900, more preferably downstream from the at least one separation device 903, more preferably subsequent to the at least one transport means 906. The substrate output device 1000 preferably comprises at least one delivery pile carrier 48 and at least one diverted delivery 51. The substrate output device 1000 configured as a delivery 1000 preferably comprises at least one sheet diverter 49, which can preferably be controlled in a closed loop and/or an open loop and which is configured to guide sheets 02 either to the delivery pile carrier 48 or the diverted delivery 51.

Preferably, at least one transport means configured as a sheet decelerating means is arranged downstream from the at least one selective transport means 906 along the transport path provided for the transport of sheets 02, which more preferably is arranged at least partially, and more preferably entirely, above a delivery pile carrier of the sheet delivery unit 1000. The at least one sheet decelerating means is used in particular to decelerate sheets 02 before they are deposited onto a delivery pile on the delivery pile carrier 48.

In addition or as an alternative, the sheet processing machine 01 is preferably characterized in that preferably at least one change in the transport path provided for the transport of sheets 02, in particular the sheet diverter 49, is controlled in an open loop and/or a closed loop and/or configured to be controllable in a closed loop and/or configured to be controllable in an open loop, upstream from the delivery 1000 in the transport direction T. The change in the transport path is preferably configured to channel out and/or divert sheets 02 onto a transport path that bypasses the actual transport path. The change in the transport path, in particular the sheet diverter 49, is preferably configured to channel out and/or divert sheets 02 onto a transport path that bypasses the at least one sheet decelerating means. The change in the transport path, in particular the at least one sheet diverter 49, is used, for example, to channel out at least one sheet 02, in particular a test sheet to be inspected and/or at least one waste sheet. A waste sheet has at least one defect by which it is distinguished from a target state of sheets 02. More preferably, the sheet processing machine 01 is characterized in that the change in the transport path, in particular the at least one sheet diverter 49, for channeling sheets 02 onto a transport path that bypasses the at least one sheet decelerating means, is arranged between the at least one separation device 903 on the one hand, and the at least one sheet decelerating means on the other hand, along the transport path provided for the transport of sheets 02.

As an alternative or in addition, the sheet processing machine 01 is preferably characterized in that the delivery 1000, preferably the sheet delivery unit 1000, comprises at least one forward pile limiter and/or in that a delivery pile area is at least delimited by the at least one rear sheet stop and the at least one forward pile limiter and/or in that the sheet delivery unit 1000 comprises at least one upper sheet transport system, which is configured for a hanging transport of sheets 02 and comprises at least one imbricating device, and/or that the at least one imbricating device produces imbrication for an imbricated, hanging transport of at least two sheets 02 at at least one point situated above the delivery pile area, as viewed in the vertical direction V.

A sheet 02 that is situated on the transport path downstream from the at least one shaping point 910 and downstream from the at least one separation device 903 in the transport direction T preferably has at least one multiple-up 1101, preferably at least two multiple-ups 1101, and at least one sheet opening 1102, preferably at least two sheet openings 1102. Each of the at least one multiple-up 1101 of the respective sheet 02 preferably includes the at least one print image. The sheet 02 preferably includes at least two multiple-ups 1101, each including the at least one print image. Each of the at least two multiple-ups 1101 of the one particular sheet 02 preferably includes at least one preferably identical print image.

A sheet 02 that is situated on the transport path downstream from the at least one shaping point 910 and downstream from the at least one separation device 903 in the transport direction T and, additionally or alternatively, after passing through the sheet processing machine 01, is situated outside the sheet processing machine 01, includes at least one multiple-up 1101, preferably at least two multiple-ups 1101, wherein at least one offcut piece, preferably at least two offcut pieces, were removed from the sheet 02. For example, the sheet 02 additionally includes at least one die-cut impression 1103, preferably at least two die-cut impressions 1103, in particular a die-cut impression 1103 configured as a crease and/or score mark and/or embossment. The sheet 02 preferably does not include any offcut pieces downstream from the separation device 903 in the transport direction T or after passing through the sheet processing machine 01. Different multiple-ups 1101 are configured to be separable and/or to be separated from one another within a sheet 02, for example, by at least one die-cut impression 1103, for example a perforation and/or an at least partial cut and/or a crease.

A sheet 02 preferably does not include any scrap pieces downstream from the separation device 903 in the transport direction T. A sheet 02 preferably has a sheet opening 1102 downstream from the separation device 903 in the transport direction T at each of those positions of the scrap pieces whose dimension and/or whose contour correspond to the dimension and/or contour of the respective removed scrap piece. In an alternative or additional embodiment, the dimension and/or contour of a sheet opening 1102, for example, corresponds to the dimension and/or contour of several mutually adjoining scrap pieces. The processing machine 01 preferably comprises at least one inspection device 726; 728; 916. The remaining contour of the sheet 02, in particular the remaining contour of the at least one multiple-up 1101, preferably corresponds to the contour of the at least one offcut piece removed upstream from the inspection device 916 and/or to a combined contour of at least two offcut pieces removed upstream from the inspection device 916.

Above and below, a sheet opening 1102, preferably in an actual state of the relevant sheet 02, preferably denotes a region of sheets 02 at which, after the at least one processing operation in the shaping device 900 and, additionally or alternatively, after the at least one processing operation in the separation device 903, the relevant sheet 02 preferably does not have any mass, preferably a gap. The sheet opening 1102 is configured as a sheet gap 1102, for example. Preferably, at least one scrap piece of the relevant sheet 02 can be assigned and/or is assigned to a respective sheet opening 1102. A sheet opening 1102 is preferably the region of a sheet 02 from which at least one scrap piece has been removed and/or in which the sheet 02 has lost mass and/or does not have any remaining mass compared to a time prior to the at least one processing operation in the shaping device 900 and, additionally or alternatively, prior to the at least one processing operation in the separation device 903. Two opposing boundaries of the respective sheet opening 1102, in particular two opposing edges of the respective sheet 02 are preferably spaced apart from one another at a distance of greater than zero, preferably greater than 5 mm (five millimeters), more preferably greater than 10 mm (ten millimeters), more preferably greater than 20 mm (twenty millimeters), more preferably greater than 30 mm (thirty millimeters), so as to delimit the relevant sheet opening 1102. For example, the at least one relevant sheet opening 1102 is configured as a handle in the desired or required end product that was generated by the respective multiple-up 1101 or its post-press processing.

Above and below, the print image describes a representation on the print substrate 02 which corresponds to the sum of all print image elements, in particular all image-producing elements, with the individual print image elements having been transferred and/or being transferable to the print substrate 02 during at least one working stage and/or at least one printing operation. Preferably, at least one respective print image element can in each case be transferred by an application unit 600 of the processing machine 01 onto the print substrate 02. The image-producing element is preferably in each case an element that can be transferred by at least one application unit 600 of the processing machine 01 onto the sheet 02 and that, in the sum of all image-producing elements, yields the print image.

In accordance with DIN 16500-2, a register, for example in multicolor printing, exists when individual print image elements and/or image-producing elements and/or color segments are combined in precise alignment to form a single print image The register is also referred to as a color register.

Registration refers to the exact alignment of a print image on the front and back sides of a print substrate 02 that is printed on both sides (DIN 16500-2).

Above and below, the term register mark 16; 17; 18; 19; 21; 22; 23; 24 or printing mark shall be understood to mean a mark for checking the register and/or the color register. Preferably, at least one register mark 16; 17; 18; 19; 21; 22; 23; 24, preferably in each case at least two register marks 16; 17; 18; 19; 21; 22; 23; 24, more preferably in each case exactly two register marks 16; 17; 18; 19; 21; 22; 23; 24, are applied to at least one relevant sheet 02 for each application unit 600 and/or for each application mechanism 614.

A sheet 02, which is located on the transport path downstream from the at least one application mechanism 614 in the transport direction T, preferably downstream from the last application mechanism 614, and to which printing fluid has been applied at least by the at least one application mechanism 614, in particular printing mechanism 614, preferably has in each case at least one register mark 16; 17; 18; 19; 21; 22; 23; 24, preferably two register marks 16; 17; 18; 19; 21; 22; 23; 24 for each application mechanism 614, by which it was provided with printing fluid. In the case of four application mechanisms 614, for example, the sheet 02 printed by all four application mechanisms 614 has at least four register marks 16; 17; 18; 19; 21; 22; 23; 24, preferably at least eight register marks 16; 17; 18; 19; 21; 22; 23; 24. Preferably, in each case one register mark 16; 17; 18; 19 of the respective application mechanism 614 is configured as a first register mark 16; 17; 18; 19. Preferably, in each case one register mark 21; 22; 23; 24 of the respective application mechanism 614 is configured as a second register mark 21; 22; 23; 24. The first register mark 16; 17; 18; 19 is preferably arranged in the direction Y in a forward region of the printable main surface area of the sheet 02, in particular at a forward edge of the print image, and, additionally or alternatively, the second register mark 21; 22; 23; 24 is preferably arranged in the direction Y in a rear region of the printable main surface area of the sheet 02, in particular at a rear edge of the print image.

Preferably, in each case a first reference position 06; 07; 08; 09 is assigned to each first register mark 16; 17; 18; 19, and in each case a second reference position 11; 12; 13; 14 is assigned to each second register mark 21; 22; 23; 24. The respective reference position 06; 07; 08; 09; 11; 12; 13; 14 is the position of the relevant register mark 16; 17; 18; 19; 21; 22; 23; 24 at which the register mark 16; 17; 18; 19; 21; 22; 23; 24 is arranged on an ideally printed sheet 02 and/or a print template. The first reference positions 06; 07; 08; 09 are preferably arranged side by side in the direction Y and/or one behind the other in the direction X. In addition or as an alternative, the second reference positions 11; 12; 13; 14 are preferably arranged side by side in the direction Y and/or one behind the other in the direction X. Preferably, a respective first reference position 06; 07; 08; 09 and a respective second reference position 11; 12; 13; 14 are arranged one behind the other in the direction Y and/or side by side in the direction X.

The sheet processing machine 01 preferably comprises the at least one sheet sensor 164; 622; 722; 922. For example, the processing machine 01 comprises a multiplicity of sheet sensors 164; 622; 722; 922, which are preferably at least partially arranged one behind the other in the transport direction T. Preferably, depending on the position and/or function, the at least one sheet sensor 164 is configured as a sheet starting sensor 164, or the at least one sheet sensor 622; 922 is configured as a sheet travel sensor 622; 922, or the at least one sheet sensor 722 is configured as a sheet monitoring sensor 722. The sheet sensor 622; 722; 922 is in each case preferably arranged at the same coordinate, based on the transverse direction A. The sheet sensors 622; 722; 922 are preferably in each case arranged one behind the other in the transport direction T, preferably aligned with one another. An arrangement of the sheet sensors 622; 722; 922 in the transport direction T, in each case aligned with one another, preferably ensures that the same position of the leading edge 03 and/or trailing edge 04 of the respective sheet 02 can be detected by the respective sheet sensors 622; 722; 922.

As an alternative or in addition, the sheet processing machine 01 is preferably characterized in that the at least one sheet sensor 164; 622; 722; 922 is configured to detect a location and/or position of the particular sheet 02, for example, so as to be able to deliberately change the location and/or position thereafter and/or so as to be able to use the information regarding the location and/or position of the respective sheet 02 in the respective sheet 164; 622; 722; 922 of downstream units 300; 600; 700; 900; 1000.

For example, the information thus obtained can be used to align the sheets 02 without stops and/or during advancement. The respective sheet sensor 164; 622; 722; 922 is preferably configured so as to be movable by a machine based on the transverse direction A. The at least one sheet sensor 164; 622; 722; 922 is preferably configured as an optical sheet sensor 164; 622; 722; 922. The at least one sheet sensor 164; 622; 722; 922 is preferably configured as a leading edge sensor for generating a leading edge signal and/or the at least one sheet sensor 164; 622; 722; 922 is configured as a trailing edge sensor for generating a trailing edge signal.

The respective sheet sensor 164; 622; 722; 922 is configured to detect the respective leading edge 03 and/or the respective trailing edge 04 and/or the at least one respective image-producing element, for example the register mark 16;

17; 18; 19; 21; 22; 23; 24, of the particular sheet 02, and preferably to emit a corresponding signal. More preferably, the at least one sheet sensor 164; 622; 722; 922 is simultaneously configured as a leading edge sensor and as a trailing edge sensor.

As an alternative or in addition, the sheet processing machine 01 is preferably characterized in that the at least one sheet sensor 164; 622; 722; 922 is configured as a transmitted light sensor. A respective sheet sensor 164; 622; 722; 922 configured as a transmitted light sensor is characterized by comprising in each case at least two sensor elements 171; 172; 623; 624; 723; 724; 923; 924, and is characterized in that the detection zone of the respective transmitted light sensor extends between at least two of these sensor elements 171; 172; 623; 624; 723; 724; 923; 924. At least one sensor element 171; 623; 723; 923 of these in each case at least two sensor elements 171; 172; 623; 624; 723; 724; 923; 924 is configured as a transmitter 171; 623; 723; 923, in particular as a transmitter 171; 623; 723; 923 for electromagnetic radiation. At least one sensor element 172; 624; 724; 924 of these in each case at least two sensor elements 171; 172; 623; 624; 723; 724; 923; 924 is configured as a receiver 172; 624; 724; 924, in particular as a receiver 172; 624; 724; 924 for electromagnetic radiation and/or as a receiver 172; 624; 724; 924 assigned to the at least one transmitter 171; 623; 723; 923.

For example, at least one reflector is provided, which is likewise a sensor element. Preferably, in each case at least one sensor element 171; 172; 623; 624; 723; 724; 923; 924 of the sheet sensor 164; 622; 722; 922 is arranged above the transport path provided for the transport of sheets 02, and in each case at least one sensor element 171; 172; 623; 624; 723; 724; 923; 924 of the sheet sensor 164; 622; 722; 922 is arranged beneath the transport path provided for the transport of sheets 02. The sheet sensor 164; 622; 722; 922 preferably configured as a transmitted light sensor preferably has a particularly high reaction speed and thereby allows the transport of the sheet 02 to be monitored particularly precisely. The at least one sheet sensor 164; 622; 722; 922 preferably has a sampling frequency of at least 2 kHz (two kilohertz), more preferably at least 5 kHz (five kilohertz), still more preferably at least 9 kHz (nine kilohertz), still more preferably at least 19 kHz (nineteen kilohertz), and still more preferably at least 29 kHz (twenty-nine kilohertz).

In addition or as an alternative, the processing machine 01 preferably comprises the substrate feed device 100 including the at least one sheet sensor 164. The at least one sheet sensor 164 of the substrate feed device 100, which is configured as a sheet starting sensor 164, for detecting a respective leading edge 03 and/or a respective trailing edge 04 and/or at least one register mark 16; 17; 18; 19; 21; 22; 23; 24 and/or at least a portion of the print image of respective sheets 02 is preferably arranged so as to be directed at the provided transport path. For example, the infeed device 300 comprises the at least one sheet sensor 164 configured as a sheet starting sensor 164. In an alternative or additional refinement, the processing machine 01 is preferably characterized in that the at least one sheet sensor 164 configured as a sheet starting sensor 164, based on the transport direction T, is arranged downstream from the at least one primary acceleration means 136 and/or downstream from the at least one front stop 137 and/or upstream from the at least one secondary acceleration means 119. As an alternative or in addition, the processing machine 01 is preferably characterized in that the at least one sheet sensor 164, in particular the at least one sheet starting sensor 164, based on the transport direction T, is arranged in the region of the at least one secondary acceleration means 119.

The sheet sensor 164 configured as a sheet starting sensor 164 is preferably arranged in such a way that its detection zone has an intersection with a monitoring section 167 of the transport path provided for the transport of sheets 02. The monitoring section 167 preferably begins at a starting point 168, which is located downstream from the storage area 166 along the transport path provided for the transport of sheets 02, and/or preferably ends at an end point 169, which is located upstream from the at least one application unit 600 along the transport path provided for the transport of sheets 02. If the processing machine 01 only comprises one shaping device 900, the monitoring section 167 preferably ends at the end point 169, which is located upstream from the at least one processing point 910 preferably configured as a shaping point 910 along the transport path provided for the transport of sheets 02. The monitoring section 167 preferably defines a possible region for advantageously arranging the detection zone of the at least one sheet sensor 164.

As an alternative or in addition, the sheet processing machine 01 is preferably characterized in that the starting point 168 is spaced a starting distance apart from the storage area 166 which is at least 50 mm (fifty millimeters), more preferably at least 90 mm (ninety millimeters), more preferably at least 120 mm (one hundred and twenty millimeters), more preferably at least 140 mm (one hundred and forty millimeters), and more preferably at least 145 mm (one hundred and forty-five millimeters). The closer the starting point 168 and/or the detection zone of the at least one sheet starting sensor 164 are located to the storage area 166, the sooner an accelerated sheet 02 can be detected, and the sooner it is possible to react to a corresponding measurement result. Maintaining a minimum distance preferably ensures that the respective sheet 02 to be detected already has the desired transport speed upon detection, in particular the appropriate processing speed.

As an alternative or in addition, the sheet processing machine 01 is preferably characterized in that the end point 169 is spaced an ending distance apart from the at least one, in particular first, processing point 621 which is at least 200 mm (two hundred millimeters), more preferably at least 250 mm (two hundred and fifty millimeters), more preferably at least 290 mm (two hundred and ninety millimeters), more preferably at least 320 mm (three hundred and twenty millimeters), more preferably at least 340 mm (three hundred and forty millimeters), and more preferably at least 350 mm (three hundred and fifty millimeters). The closer the end point 169 of the in particular first processing point 621 is, the greater is the stretch and/or time that remains to check results of compensating measures, in particular when the at least one sheet starting sensor 164 is used for this purpose.

The end point 169 is spaced an ending distance apart from the at least one, more preferably first, and still more preferably each, transport means 700 arranged downstream from the secondary acceleration means 119 in the transport direction T which is at least 200 mm (two hundred millimeters), more preferably at least 250 mm (two hundred and fifty millimeters), more preferably at least 290 mm (two hundred and ninety millimeters), still more preferably at least 320 mm (three hundred and twenty millimeters), still more preferably at least 340 mm (three hundred and forty millimeters), and still more preferably at least 350 mm (three hundred and fifty millimeters). It is then ensured that compensating accelerations of the particular sheet 02 are completed before the sheet 02 is in engagement with the transport means 700, which more preferably is operated at a constant speed, in particular at the processing speed.

In the event that the at least one sheet starting sensor 164 is arranged too close to the first transport means 700 arranged downstream from the secondary acceleration means 119 in the transport direction T, a compensating movement may no longer be possible in some circumstances before the particular sheet 02 is in contact with the transport means 700. The sheet transport, and thus the overall processing speed of the sheet processing machine 01, would then have to be permanently reduced. The respective starting distance and/or the respective ending distance preferably result from the maximum sheet length of the sheets 02 to be processed by way of the processing machine 01 and/or from the maximum processing speed at which the sheet processing machine 01 is to be operated. The starting distance is preferably at least as large as an acceleration stretch on which respective sheets 02 can be accelerated and/or are accelerated to the processing speed by means of the at least one primary acceleration means 136. The ending distance is preferably at least as large as a stretch that sheets 02 travel at the processing speed during the time that is required to calculate and carry out a respective compensating process.

As an alternative or in addition, the sheet processing machine 01 is preferably characterized in that the at least one secondary acceleration means 119 comprises at least three transport belts, which are arranged side by side and spaced apart from another with respect to a transverse direction A, and more preferably that a detection zone of the at least one sheet starting sensor 164 extends between the at least three transport belts arranged side by side and spaced apart from one another with respect to the transverse direction A. This in particular yields the advantage that respective sheets 02, at the moment at which they are detected by the at least one sheet starting sensor 164, are being held particularly well.

Preferably, a movement profile is assigned to each sheet 02, which can be represented as a function in which a position of the respective sheet 02 along the transport path provided for the transport of sheets 02 is described based on the progression of the sequence of master axis values. When a sheet 02 is now detected by means of the at least one sheet sensor 164, the detection time is preferably assigned to a master axis value, for example. It is then possible to carry out a comparison in terms of the time or master axis value at which the sheet 02 would have been expected at the at least the one sheet sensor 164. It is preferably inferred from a possible value deviation how this sheet 02, for example, has to be transported by means of the at least one secondary acceleration means 119 for the value deviation to be compensated for as much as possible or completely eliminated. As a result of an acceleration and/or deceleration of the sheets 02 by way of the at least one secondary acceleration means 119, the respective sheet 02 is preferably adapted to the processing speed, in particular if a value deviation previously existed.

In addition or as an alternative, the processing machine 01 preferably comprises at least two sheet starting sensors 164, which are preferably arranged orthogonally to the transport path of sheets 02, which more preferably are arranged one behind the other in the transverse direction A and/or more preferably side by side in the transport direction T. The at least two sheet sensors 164, which are in particular configured as sheet starting sensors 164, are preferably configured to detect a skewed position of sheets 02. Preferably, these at least two sheet starting sensors 164 arranged one behind the other in the transverse direction A are each configured to detect the leading edge 03 and/or the trailing edge 04 and/or the at least one register mark 16; 17; 18; 19; 21; 22; 23; 24 and/or at least a portion of the print image of a respective sheet 02. More preferably, as an alternative or in addition, the sheet processing machine 01 is characterized in that at least two sheet sensors 164 are provided, whose detection zones differ in their positions based on the transverse direction A. Preferably, a skewed position measurement of the respective sheet 02 is carried out. Based on the transport direction T, the detection zones of these at least two sheet sensors 164 preferably have an identical position, with the exception of a tolerance of no more than 10 mm (ten millimeters), more preferably no more than 5 mm (five millimeters), and more preferably no more than 2 mm (two millimeters). If the skewed position is too large, for example, the corresponding sheet 02 is adjusted or sorted or marked, or the machine is stopped.

The at least one sheet sensor 622 configured as a sheet travel sensor 622 is preferably arranged directly upstream from the respective assigned application unit 600 including the respective forme cylinder 616 in the transport direction T. In one embodiment, the at least one sheet sensor 622 is configured to control in a closed loop and/or in an open loop the position and/or rotational speed of the respective forme cylinder 616. In another preferred embodiment, the sheet sensor 622 is arranged to control the machine speed in a closed loop. In particular, the at least one sheet sensor 622 is arranged so as to control in an open loop and/or in a closed loop a drive means of a transport device 700. In this way, the speed of the sheets 05 is preferably adapted by means of the signal of the sheet sensor 622.

Preferably, at least one sheet sensor 622, in particular a sheet travel sensor 622, is in each case assigned to the at least one application unit 600, more preferably at least two application units 600, more preferably each application unit 600. Preferably, the at least one sheet sensor 922, in particular the sheet travel sensor 922, is in each case assigned to the at least one shaping unit 900, preferably each shaping unit 900. The sheet travel sensor 622 is preferably arranged in each case upstream from the assigned application unit 600 in the transport direction T and/or the sheet travel sensor 922 is in each case arranged upstream from the assigned shaping unit 900 in the transport direction T.

The at least one sheet sensor 622; 922 is configured so as to detect the arrival time of sheets 02 at the position of the sheet sensor 622; 922. The processing machine 01, which is preferably configured as a sheet printing machine 01, is preferably characterized in that the at least one sheet sensor 622; 922 configured as a sheet travel sensor 622; 922, preferably at least for detecting the respective arrival time of sheets 02, in particular the arrival time of the respective leading edge 03 and/or at least one register mark 16; 17; 18; 19; 21; 22; 23; 24 and/or at least a portion of the print image of the respective sheets 02, is arranged so as to be directed at the provided transport path.

Preferably in addition or as an alternative, the sheet processing machine 01 is characterized in that the respective sheet travel sensor 622; 922 is arranged upstream from the respective processing point 621; 910 in the transport direction T. Preferably, the sheet travel sensors 622; 922, which are each assigned to an application unit 600 or a shaping unit 900, are in each case arranged in the same position, based on the transverse direction A. This ensures that in each case the same position of the leading edge 03 and/or of the trailing edge 04 and/or of the at least one register mark 16; 17; 18; 19; 21; 22; 23; 24 and/or of the at least one portion of the print image of a respective sheet 02 can be detected.

The respective sheet travel sensor 622; 922 is preferably arranged at a transport device 700 that is preferably arranged directly upstream from the relevant unit 600; 900 in the transport direction T. The respective sheet travel sensor 622; 922 is preferably arranged in such a way that at least a portion of the transport device 700, in particular at least a portion of the relevant transport means 700, is arranged between the respective sheet travel sensor 622; 922 and the relevant processing point 621; 910 of the relevant unit 600; 900. In a preferred embodiment of the transport device 700, the transport means 700 is configured as an upper suction transport means 700, in particular as the at least one roller suction system. Preferably, at least one transport roller and/or at least one transport cylinder, more preferably additionally no more than three transport rollers and/or three transport cylinders, of the upper suction transport means 700 are then arranged between the respective sheet travel sensor 622; 922 and the processing point 621; 910 of the relevant unit 600; 900, based on the transport direction T.

The respective sheet travel sensor 622; 922 is preferably spaced a minimum distance of at least 200 mm (two hundred millimeters), preferably at least 300 mm (three hundred millimeters), more preferably at least 350 mm (three hundred and fifty millimeters), still more preferably at least 400 mm (four hundred millimeters), apart from the assigned processing point 621; 910. In addition or as an alternative, the respective sheet travel sensor 622; 922 is preferably spaced a maximum distance of no more than 650 mm (six hundred and fifty millimeters), more preferably no more than 600 mm (six hundred millimeters), still more preferably no more than 550 mm (five hundred and fifty millimeters), still more preferably 450 mm (four hundred and fifty millimeters), apart from the assigned processing point 621; 910. The respective sheet travel sensor 622, which is assigned to an application unit 600, is preferably arranged a smaller distance apart from the respective processing point 621 than the respective sheet travel sensor 922, which is assigned to a shaping unit 900. The minimum distance between the sheet travel sensor 622; 922 and the respective processing point 621; 910 preferably ensures that a sufficiently long stretch of the transport path is present between the sheet travel sensor 622; 922 and the respective processing point 621; 910 to synchronize the arrival time of the sheet 02, in particular of the leading edge 03, with the forward edge of the printing region of the forme cylinder 616. The maximum distance between the sheet travel sensor 622; 922 and the respective processing point 621; 910 preferably ensures that as short a stretch of the transport path as possible is present between the sheet travel sensor 622; 922 and the respective processing point 621; 910 to avoid further influencing of the speed of the sheet 02, and thus influencing of its arrival time by the transport path.

The respective at least one sheet travel sensor 622; 922 is configured to detect the arrival time of the sheets 02, in particular the arrival time of the leading edge 03 and/or of the at least one register mark 16; 17; 18; 19; 21; 22; 23; 24 and/or of at least a portion of the print image of the sheets 02, preferably before the respective sheet 02 reaches the respective processing point 621; 910 of the assigned unit 600; 900.

Preferably, a movement profile is assigned to each sheet 02, which can be represented as a function in which a position of the respective sheet 02 along the transport path provided for the transport of sheets 02 is described based on the progression of the sequence of master axis values. When a sheet 02 is now detected by means of the at least one sheet sensor 622; 922, in particular the at least one sheet travel sensor 622; 922, the detection time is preferably assigned to a master axis value, for example. A comparison is then preferably carried out in terms of the time or master axis value at which the sheet 02 would have been expected at the at least one sheet sensor 622; 922.

Hereafter, the design, the arrangement, and the principle of the at least one sheet sensor 622; 922 will be described based on the embodiment of an application unit 600 comprising at least one assigned sheet sensor 622. The design and/or the arrangement and/or the principle of the sheet travel sensor 622 of the application unit 600 can preferably be applied to the sheet travel sensor 922 of the shaping unit 900. In the case of the shaping unit 900, the forme cylinder 901, at least partially along its outer cylindrical surface, comprises at least one tool for processing sheets 02. When applied to this use, the region of the outer cylindrical surface of the forme cylinder 901 which comprises the at least one tool preferably corresponds to the printing region of the forme cylinder 616 of the application unit 600.

If the sheet sensor 622 is assigned to an application unit 600, the master axis value of the sheets 02, which corresponds to the respective detection time by the sheet sensor 622, is preferably comparable to a master axis value of the position of the mount 626 of the forme cylinder 616, and thus preferably a forward edge of the printing region of the forme cylinder 616. The position of the leading edge 03 of the sheets 02 and/or the position of at least one register mark 16; 17; 18; 19; 21; 22; 23; 24 and/or the position of at least a portion of the print image can preferably be determined relative to the position of the forward edge of the printing region of the forme cylinder 616, in particular via the respective assigned master axis value.

Preferably, so as to achieve a correctly positioned print image by way of the respective application unit 600 and/or a correctly positioned die-cut pattern by way of the respective shaping unit 900, in addition or as an alternative the processing speed of the sheets 02 is preferably adapted to a rotational speed and/or speed of the forme cylinder 616; 901, more preferably additionally to a rotational speed and/or speed of the impression cylinder 617; 902, in such a way that the leading edge 03 of the relevant sheet 02 and the forward edge of the printing region of the forme cylinder 616 or, alternatively, a region of the forme cylinder 901 including a leading edge of the tool pass through the respective processing point 621; 910 at the same time.

The position of the leading edge 03 of the relevant sheet 02, in particular the assigned master axis value, and the position of the forward edge of the printing region of the forme cylinder 616, in particular the assigned master axis value, preferably coincide when the leading edge 03 of the relevant sheet 02 and the forward edge of the printing region of the forme cylinder 616 are arranged at the processing point 621 of the respective unit 600. Preferably, the arrival time of the sheet 02, in particular the arrival time of the leading edge 03 and/or of at least one register mark 16; 17; 18; 19; 21; 22; 23; 24 and/or of at least a portion of the print image of the sheet 02, coincides with the arrival time of the forward edge of the printing region of the forme cylinder 616 at the processing point 621.

In the event of a possible respective value deviation of the assigned master axis value of the position of the forward edge of the printing region of the forme cylinder 616 and of the assigned master axis value of the position of the leading edge 03 and/or of at least one register mark 16; 17; 18; 19; 21; 22; 23; 24 and/or of at least a portion of the print image of the relevant sheet 02, at least an adaptation and/or at least a change of the assigned master axis value of the position of the forward edge of the printing region of the forme cylinder 616 relative to the assigned master axis value of the position of the leading edge 03 and/or to at least one register mark 16; 17; 18; 19; 21; 22; 23; 24 and/or to at least a portion of the print image of the relevant sheet 02 is required, for example so as to maintain the register. In a preferred embodiment of the processing machine 01, the forme cylinder 616, in particular the position of the forward edge of the printing region of the forme cylinder 616, is preferably configured so as to be changeable in the event of a value deviation of the assigned master axis value of the position of the forward edge of the printing region of the forme cylinder 616 relative to the assigned master axis value of the position of the leading edge 03 and/or of the at least one register mark 16; 17; 18; 19; 21; 22; 23; 24 and/or of the at least one portion of the print image of the relevant sheet 02. The forme cylinder 616 is preferably accelerated and/or decelerated as long as at least a portion of the non-printing region of the forme cylinder 616 is arranged at the processing point 621, so that the arrival time of the sheet 02 at the processing point 621 coincides with the arrival time of the printing region of the forme cylinder 616 at the processing point 621. Accelerating and/or decelerating the forme cylinder 616 while at least a portion of the non-printing portion passes through the processing point 621 ensures that the arrival time of the sheet 02, in particular the arrival time of the leading edge 03 of the sheet 02, at the processing point 621 coincides with the arrival time of the forward edge of the printing region of the forme cylinder 616 at the processing point 621. The start of processing of sheets 02 at the respective processing point 621 can preferably be adapted and/or determined and/or changed by accelerating and/or decelerating the forme cylinder 616. For example, the forme cylinder 616, as long as at least a portion of the printing region of its outer cylindrical surface is arranged at the processing point 621, at least partially has a speed that differs from the speed of the forme cylinder 616 as long as at least a portion of the non-printing region of its outer cylindrical surface is arranged at the processing point 621. Preferably in addition, the impression cylinder 617 is accelerated and/or decelerated in a manner complementary to the forme cylinder 616.

Above and below, the speed of the forme cylinder 616 preferably corresponds to its circumferential speed at which the relevant forme cylinder 616 rotates in its respective direction of rotation. The direction of rotation of the forme cylinder 616 is preferably the direction in which the relevant forme cylinder 616 rotates and/or is configured to be rotatable for a transport of sheets 02 along the transport path, preferably in the transport direction T.

As soon as the leading edge 03 of the sheet 02 has reached the processing point 621, the forme cylinder 616 is preferably operated at the speed which corresponds to the processing speed of sheets 02 in the particular unit 600.

The forme cylinder 616, for example, has a constant speed as long as at least a portion of the printing region of its outer cylindrical surface is arranged at the processing point 621. Preferably as an alternative, the forme cylinder 616 has a speed that at least partially changes as long as at least a portion of the printing region of its outer cylindrical surface is arranged at the processing point 621. This changing speed is present in particular so as to generate a change in a printing length l2 relative to a reference length l1, preferably so as to minimize the difference between the printing length l2 and the reference length l1, so that the register of the print image is adapted and/or improved and/or changed. The change in the printing length l2 is preferably achieved by accelerating and/or decelerating the forme cylinder 616, while at least a portion of the printing region of its outer cylindrical surface is arranged at the processing point 621. As a result, for example, the respective applied print image on the sheet 02 is stretched and/or compressed relative to the printing forme used. This may be necessary, for example, when sheets 02, while being processed by several units 100; 300; 600; 700; 900; 1000, change their extension in particular in the transport direction T, in particular as a result of the processing operation, for example the application of the at least one printing fluid and/or passing through the at least one processing point 621; 910.

In addition or as an alternative, for example, the transport speed v3 of sheets 02 can be changed by accelerating and/or decelerating the sheet 02 by way of the at least one portion of the transport means 700, upstream from the processing point 621; 910, relative to the processing speed of the processing machine 01 at the relevant position. For this purpose, the sheet 02 is preferably accelerated and/or decelerated by at least a portion of the transport means 700, for example by at least one transport roller and/or transport cylinder of the roller suction system, in particular by at least the transport roller and/or transport cylinder arranged directly upstream from the processing point 621; 910 in the transport direction T. As a result of the acceleration and/or deceleration of the sheet 02, the position of the leading edge 03 of the sheet 02, when reaching the processing point 621, preferably coincides with the rear edge of the non-printing region of the forme cylinder 616; 901 and/or with the forward edge of the printing region of the forme cylinder 616; 901.

In a preferred embodiment of the processing machine 01, at least one image-producing element on sheets 02, for example at least a portion of the print image of the sheet 02 and/or at least one register mark 16; 17; 18; 19; 21; 22; 23; 24, is detected and/or evaluated by the operating staff based on at least one sheet 02 configured as a sample sheet. Preferably, the at least one register of the print image and, additionally or alternatively, the at least one image-producing element of sheets 02 and, additionally or alternatively, the at least one dimension of the printing length l2 of the at least one print image of the respective sheet 02 and, additionally or alternatively, at least one defect in the at least one processing operation of the respective sheet 02 and, additionally or alternatively, at least one defect in the at least one print image of the respective sheet 02, are detected and/or evaluated by operating staff based on at least one sample sheet. The at least one sheet 02 configured as the sample sheet is preferably guided on an alternative transport path to the actual transport path for this purpose, preferably manually or mechanically removed from the processing machine 01 and inspected outside the processing machine 01.

In addition or as an alternative, the processing machine 01 is preferably characterized in that the processing machine 01 comprises the at least one inspection device 726; 728; 916. The processing machine 01 is preferably characterized in that the at least one inspection device 726; 728; 916 is arranged downstream from the forme cylinder 616 of the at least one printing mechanism 614 along the transport path of sheets 02. The at least one inspection device 726; 728; 916 is preferably arranged downstream from the at least one application unit 600 in the transport direction T, preferably downstream from the last application unit 600 in the transport direction T. More preferably, at least two inspection devices 726; 728; 916, still more preferably three inspection devices 726; 728; 916, are arranged downstream from the at least one application unit 600 in the transport direction T, preferably downstream from the last application unit 600 in the transport direction T. Preferably, the at least two inspection devices 726; 728; 916 are arranged one behind the other in the transport direction T in the processing machine 01.

The inspection device 726; 728; 916 is preferably configured as a printed image monitoring system 726 and/or as a register monitoring system 728 and/or as a die-cutting monitoring system 916. The inspection device 726; 728; 916 is preferably configured to detect at least one image-producing element on the sheet 02, for example at least a portion of the print image of the sheet 02 and/or at least one register mark 16; 17; 18; 19; 21; 22; 23; 24. The image-producing element on the sheet 02 is preferably in each case a portion of at least one print image element and/or a register mark 16; 17; 18; 19; 21; 22; 23; 24 and/or an element that produces an image on the respective sheet 02.

The inspection device 726; 728; 916 is configured to detect the at least one register of the print image and, additionally or alternatively, the at least one image-producing element of sheets 02 and, additionally or alternatively, the at least one dimension of the printing length l2 of the at least one print image of the respective sheet 02 and, additionally or alternatively, at least one defect in the at least one processing operation of the respective sheet 02 and, additionally or alternatively, at least one defect in the at least one print image of the respective sheet 02. Defects in the print image preferably encompass missing and/or additional image-producing elements of at least one print image element and, additionally or alternatively, the color of the print image and/or of the respective print image elements and, additionally or alternatively, spatters of printing fluid in undesirable locations. More preferably, the inspection device 726; 728; 916 is configured to detect the at least one image-producing element of sheets 02, and to detect the dimension of the at least one printing length l2 of the at least one print image of the respective sheet 02, and to detect at least one defect in the at least one processing operation of the respective sheet 02, and to detect at least one defect in the at least one print image of the respective sheet 02.

So as to determine the dimension of the printing length l2, the inspection device 726; 728; 916 in each case preferably detects at least the one first register mark 16; 17; 18; 19 and at least the one respectively associated second register mark 21; 22; 23; 24 or at least two image-producing elements on the sheet 02. By detecting the first register mark 16; 17; 18; 19 and the respectively associated second register mark 21; 22; 23; 24, a dimension for the relevant printing length l2 is preferably generated and/or calculated, for example by an evaluation unit and/or the relevant inspection device 726; 728; 916. So as to determine the dimension of the printing length l2, preferably at least the length of the sheet 02 and/or the speed of the sheet 02 at the relevant position of the transport path and/or further factors influencing the sheet 02 are taken into consideration.

In the case that the processing machine 01 comprises exactly one inspection device 726; 728; 916, the at least one image detection device of the inspection device 726; 728; 916 is preferably at least configured to detect the at least one image-producing element on the sheet 02, for example at least a portion of the print image of the sheet 02 and/or at least one register mark 16; 17; 18; 19; 21; 22; 23; 24. In the case that the processing machine 01 comprises exactly one inspection device 726; 728; 916, the inspection device 726; 728; 916 is preferably configured at least to detect the at least one image-producing element of the sheet 02 having a surface area of at least 0.01 $mm^2$ (zero point zero one square millimeters).

Preferably, at least one inspection device 726; 728 is, preferably at least two inspection devices 726; 728, still more preferably exactly two inspection devices 726; 728, if present, are arranged in the transport direction T between the at least one application unit 600, preferably between the last application unit 600, and the at least one shaping unit 900.

In a preferred embodiment, the processing machine 01, which is preferably configured as a sheet processing machine 01, is additionally or alternatively characterized in that at least one sheet sensor 722 configured as a sheet monitoring sensor 722 is arranged upstream from the at least one inspection device 726; 728, preferably upstream from the at least two inspection devices 726; 728, in the transport direction T. The sheet monitoring sensor 722 is preferably arranged downstream from the at least one application unit 600 in the transport direction T, preferably downstream from the last application unit 600 in the transport direction T, of the sheet processing machine 01, and upstream from the at least one inspection device 726; 728, preferably upstream from the at least two inspection devices 726; 728.

The sheet monitoring sensor 722 is preferably arranged upstream from a first inspection device 726; 728; 916 in the transport direction T. The first inspection device 726; 728; 916 preferably denotes the inspection device 726; 728; 916 that is arranged upstream from any additional inspection device 726; 728; 916 in the transport direction T. For example, the first inspection device 726; 728; 916 is configured as a printed image monitoring system 726 and/or as a register monitoring system 728. If the processing machine 01 only comprises one shaping unit 900, without an application unit 600 provided upstream thereof in the transport direction T, for example, the first inspection device 726; 728; 916 is preferably at least configured as a die-cutting monitoring system 916. The at least one further inspection device 726; 728; 916, which is arranged downstream from the first inspection device 726; 728; 916 in the transport direction T, is preferably referred to as a second inspection device 726; 728; 916, and the further succeeding inspection device 726; 728; 916 is referred to as a third inspection device 726; 728; 916.

The sheet monitoring sensor 722 is preferably spaced a minimum distance of at least 250 mm (two hundred and fifty millimeters), preferably of at least 300 mm (three hundred millimeters), more preferably at least 330 mm (three hundred and thirty millimeters), apart from the at least one inspection device 726; 728; 916, in particular the first inspection device 726; 728; 916. In addition or as an alternative, the sheet monitoring sensor 722 is spaced a maximum distance of no more than 500 mm (five hundred millimeters), preferably no more than 450 mm (four hundred and fifty millimeters), more preferably no more than 400 mm (four hundred millimeters), still more preferably no more than 350 mm (three hundred and fifty millimeters) apart from the at least one inspection device 726; 728; 916, in particular the first inspection device 726; 728.

The sheet monitoring sensor 722 is preferably spaced a minimum distance of at least 600 mm (six hundred millimeters), preferably of at least 650 mm (six hundred and fifty millimeters), more preferably at least 700 mm (seven hundred millimeters) apart from the at least one second inspection device 726; 728; 916. In addition or as an alternative, the sheet monitoring sensor 722 is spaced a maximum distance of no more than 850 mm (eight hundred and fifty millimeters), preferably no more than 800 mm (eight hundred millimeters), more preferably no more than 750 mm (seven hundred and fifty millimeters) apart from the at least one second inspection device 726 728; 916.

The sheet monitoring sensor 722 is preferably configured to detect the arrival time of sheets 02 at the position of the sheet monitoring sensor 722, in particular the arrival time of the leading edge 03 and/or of the at least one register mark 16; 17; 18; 19; 21; 22; 23; 24 and/or a portion of the print image of sheets 02 at the position of the sheet monitoring sensor 722. Preferably in addition, the sheet monitoring sensor 722 is configured to emit at least one signal, preferably at least one electrical signal, more preferably at least one closed-loop control signal or at least one open-loop control signal. The sheet monitoring sensor 722 is preferably configured to emit the at least one signal, preferably at least the one electrical signal, more preferably the at least one closed-loop control signal or the at least one open-loop control signal, whenever the leading edge 03 and/or the at least one register mark 16; 17; 18; 19; 21; 22; 23; 24 and/or the relevant portion of the print image of sheets 02 are registered by way of the sheet monitoring sensor 722.

The at least one inspection device 726; 728; 916 can preferably be controlled in a closed loop and/or open loop by the at least one signal, preferably the at least one electrical signal, more preferably the at least one closed-loop control signal or the at least one open-loop control signal, of the at least one sheet monitoring sensor 722. The printed image monitoring system 726 and the register monitoring system 728 can preferably be controlled in a closed loop and/or an open loop by the same sheet monitoring sensor 722. The time for triggering at least one recording of the at least one inspection device 726; 728; 916 can preferably be controlled in a closed loop and/or an open loop by the at least one signal, preferably the at least one electrical signal, more preferably the at least one closed-loop control signal or the at least one open-loop control signal, of the at least one sheet monitoring sensor 722.

The at least one inspection device 726; 728; 916 preferably in each case comprises at least one evaluation means or is in each case connected to an evaluation means.

In a preferred embodiment, the inspection device 726; 728; 916 is configured to ascertain an actual state of the at least one sheet 02, in particular by way of the image acquisition device. The actual state of sheets 02 is preferably the state, in particular with respect to the print image and/or shape and/or mass and/or contour, that the particular sheet 02 has at the time of detection by way of the inspection device 726; 728; 916.

In addition or as an alternative, the sheet processing machine 01 is preferably characterized in that the inspection device 726; 728; 916 comprises the evaluation means or is connected to the evaluation means, and that the evaluation means is configured to compare the actual state of the at least one sheet 02 to a desired state of the relevant sheet 02. The evaluation means is preferably configured to receive data regarding the actual state of sheets 02 from the image acquisition device of the inspection device 726; 728; 916, and to evaluate the data. The target state of the relevant sheet 02 is preferably the state, in particular with respect to the print image and/or shape and/or mass and/or contour, that the sheet 02, preferably an ideally produced sheet 02, is to have, in particular at the time of detection by way of the inspection device 726; 728; 916, and/or that is predefined by at least one reference and/or by at least one sample sheet, in particular as a comparison value, for the at least one sheet 02. For example, the target state of the relevant sheet 02 is the desired and/or required state that a product produced from corresponding sheets 02 is to have. An ideally produced sheet 02 preferably describes a sheet 02 that, after the processing operation has been completed, preferably within the unit 100; 300; 600; 700; 900; 1000 assigned to the particular processing operation, preferably exactly matches the reference for this sheet 02 on which the particular processing operation is based.

In a preferred embodiment, the target state of the relevant sheet 02 is determined and/or configured to be determinable based on a digital reference and/or a taught-in reference. The digital reference preferably contains at least some of the information, preferably all the information, that is necessary to unambiguously determine the required target state of the relevant sheet 02. The digital reference is preferably configured as a digital image template. The digital reference preferably has a pdf or tif or jpg file format. The taught-in reference is preferably a sheet 02 that is configured as a sample sheet and/or, for example, is detected by the inspection device 726; 728; 916 and/or stored in the evaluation means as a basis for comparison.

The inspection device 726; 728; 916 is preferably configured to ascertain a degree of an at least partial deviation of the at least one print image element and/or of the print image of the sheet 02 from the target state of the particular sheet 02. Depending on the result of the ascertained degree of the deviation of the sheet 02 from the target state of the particular sheet 02, the inspection device 726; 728; 916 is preferably configured in each case to output a signal, for example an optical signal and/or an open-loop signal and/or closed-loop control signal. If the degree of the deviation is within the scope of the tolerance of the target state of the particular sheet 02, the inspection device 726; 728; 916 is preferably configured to output at least one "good" signal, i.e., the relevant sheet 02 is considered to be fine. If the degree of the deviation is outside the scope of the tolerance of the desired target of the particular sheet 02, the inspection device 726; 728; 916 is preferably configured to output at least one "bad" signal, i.e., the relevant sheet 02 is not considered to be fine. For example, in addition or as an alternative to the at least one "bad" signal, the inspection device 726; 728; 916 is preferably in each case configured to transmit at least one signal for closed-loop control and/or open-loop control to the sheet diverter 49.

The at least one inspection device 726; 728; 916 is preferably at least configured as the printed image monitoring system 726. The printed image monitoring system 726 is preferably arranged downstream from the sheet monitoring sensor 722 in the transport direction T, more preferably without a further application unit 600 or shaping unit 900 therebetween. The at least one inspection device 726 is preferably arranged downstream from the at least one application unit 600 in the transport direction T, preferably downstream from the last application unit 600 in the transport direction T. More preferably, the printed image monitoring system 726 is arranged downstream from the at least one application unit 600 in the transport direction T, preferably downstream from the last application unit 600 in the transport direction T, and upstream from the at least one shaping unit 900, preferably upstream from a first shaping unit 900.

The inspection device 726 configured as a printed image monitoring system 726 preferably comprises the at least one image acquisition device, preferably at least one optical image acquisition device. The at least one image acquisition device is preferably configured as a camera, more preferably as a color camera, more preferably as a line scan camera, more preferably as at least one CMOS sensor and/or at least one CCD sensor. Preferably, at least one light source 727 configured as a lighting unit 727, for example an LED light source, in particular a light source 727 for white light, is assigned to the printed image monitoring system 726. Preferably, at least two light sources 727, in particular exactly two light sources 727, are assigned to the printed image monitoring system 726. Preferably, at least one lighting unit 727 is arranged in each case directly upstream and/or directly downstream from a detection zone of the printed image monitoring system 726 in the transport direction T and is directed at the detection zone of the printed image monitoring system 726. The printed image monitoring system 726 preferably comprises at least one optical device, for example at least one lens, which is preferably arranged between the at least one image acquisition device and the transport path provided for the transport of sheets 02.

The at least one image acquisition device of the printed image monitoring system 726 is preferably at least configured to detect the at least one image-producing element on the sheet 02, for example at least a portion of the print image of the sheet 02 and/or at least one register mark 16; 17; 18; 19; 21; 22; 23; 24. The printed image monitoring system 726 is preferably at least configured to detect the at least one image-producing element of the sheet 02 having a surface area of at least 0.1 $mm^2$ (zero point one square millimeters).

In a preferred additional or alternative embodiment, the at least one printed image monitoring system 726, in particular the at least one image acquisition device of the printed image monitoring system 726, is directed at the transport path of sheets 02 in such a way that the at least one print image, which can be applied onto sheets 02 by the at least one application unit 600, can be at least partially detected and preferably additionally evaluated by the printed image monitoring system 726, in particular the at least one image acquisition device of the printed image monitoring system 726.

For example, when sheets 02 are guided lying flat, the printed image monitoring system 726 is preferably arranged above the transport path and/or the transport plane, in particular downstream from the transport path and/or the transport plane in the vertical direction V. The sheet 02 can thus be detected and/or inspected at least partially, preferably completely, from above by the printed image monitoring system 726. When the sheet 02 is guided lying flat, the at least one print image is preferably arranged on the main surface area of the sheet 02 so as to point upwardly. The at least one print image of the sheet 02 can thus be detected and/or inspected and/or evaluated at least partially, preferably completely, in this embodiment by the printed image monitoring system 726.

In the case of a preferred hanging guidance of sheets 02, the printed image monitoring system 726 is preferably arranged beneath the transport path and/or the transport plane, in particular upstream from the transport path and/or upstream from the transport plane in the vertical direction V. The printed image monitoring system 726 is thus preferably configured to detect and/or inspect the sheet 02 at least partially, preferably completely, from beneath. In the case of the hanging guidance of sheets 02, the at least one print image is preferably arranged on the main surface area of the sheet 02 so as to point downwardly. At least in this embodiment, the printed image monitoring system 726 is thus preferably configured to detect and/or inspect the at least one print image of the sheet 02 at least partially, preferably completely, from beneath, and is preferably configured to detect and/or inspect it from upstream from the transport path and/or from upstream from the transport plane in the vertical direction V.

The printed image monitoring system 726, in particular the at least one image acquisition device, is preferably configured to detect at least a portion of the working width, more preferably the entire working width, of the sheet processing machine 01. For example, an image acquisition device only detects a portion of the working width, and in this case the printed image monitoring system 726 preferably comprises at least two image acquisition devices, which are each configured to detect regions of the working width that at least partially differ from one another. If present, the at least two image acquisition devices of the printed image monitoring system 726 are preferably arranged side by side in the transport direction T and/or one behind the other in the transverse direction A.

In a preferred embodiment of the processing machine 01, the inspection device 726 configured as the printed image monitoring system 726 is configured to detect at least a portion of the print image of sheets 02, preferably the entire print image of sheet 02. The at least one inspection device 726 configured as the printed image monitoring system 726 can preferably at least partially check and/or evaluate the print image of sheets 02. Defects that occur in at least a portion of the print image of sheets 02 and, additionally or alternatively, defects that occur in the sheets 02 themselves can preferably be detected and/or evaluated by the at least one printed image monitoring system 726. Possible defects that a print image has, for example, are spatters of printing fluid, for example, in locations on the sheet 02 that do not coincide with a print template and, additionally or alternatively, a deviation in the color of the printing fluid used from the color of the printing fluid used as specified in the print template in at least one print image element, and, additionally or alternatively, deviations in the print image, in particular at least one print image element, from the print template, for example due to absent printing fluid in locations intended to contain printing fluid. Possible defects of the sheets 02 are, for example, curling or unevenness of the sheet surface and, additionally or alternatively, holes or cracks in the sheets 02 and, additionally or alternatively, kinks in the sheets 02.

In an alternative embodiment, at least the print image is at least partially inspected and/or evaluated and/or adapted by the operating staff, preferably based on at least one sample sheet. An additional inspection device 726 configured as a printed image monitoring system 726 is then preferably optional in the processing machine 01.

The at least one inspection device 726; 728; 916 is preferably at least configured as a register monitoring system 728, in particular a color register monitoring system 728. The register monitoring system 728 is preferably arranged downstream from the sheet monitoring sensor 722 in the transport direction T, more preferably without a further application unit 600 or shaping unit 900 therebetween. The at least one inspection device 728 is preferably arranged downstream from the at least one application unit 600 in the transport direction T, preferably downstream from the last application unit 600 in the transport direction T. More preferably, the register monitoring system 728 is arranged downstream from the at least one application unit 600 in the transport direction T, preferably downstream from the last application unit 600 in the transport direction T, and upstream from the at least one shaping unit 900, preferably upstream from the first shaping unit 900. For example, the at least one register monitoring system 728 is arranged downstream from the at least one printed image monitoring system 726 in the transport direction T, which is then considered to be the first inspection device 726 of the processing machine 01. As an alternative, the at least one register monitoring system 728 is arranged upstream from the at least one printed image monitoring system 726 in the transport direction T, and is then, more preferably, considered to be the first inspection device 728 of the processing machine 01.

The inspection device 728 configured as a register monitoring system 728 preferably comprises at least one, preferably optical, image acquisition device, preferably at least two, preferably optical, image acquisition devices, more preferably exactly two, preferably optical, image acquisition devices. The at least one image acquisition device is preferably in each case configured as a camera, more preferably as a color camera, more preferably as a line scan camera, more preferably as a CMOS sensor and/or CCD sensor. The register monitoring system 728 preferably comprises at least one light source, for example an LED light source. The register monitoring system 728 preferably comprises at least one optical device, which is preferably arranged between the at least one image acquisition device and the transport path provided for the transport of sheets 02.

The at least one image acquisition device of the register monitoring system 728 is preferably at least configured to detect the at least one image-producing element on the sheet 02, for example at least a portion of the print image of the sheet 02 and/or at least one register mark 16; 17; 18; 19; 21; 22; 23; 24. The register monitoring system 728 is preferably at least configured to detect the at least one image-producing element of the sheet 02 having a surface area of at least 0.01 $mm^2$ (zero point zero one square millimeters).

In a preferred additional or alternative embodiment, the at least one register monitoring system 728 is directed at the transport path for detecting sheets 02. In a preferred additional or alternative embodiment, the at least one register monitoring system 728, in particular the at least one image acquisition device of the register monitoring system 728, is directed at the transport path of sheets 02 in such a way that the at least one register mark 16; 17; 18; 19; 21; 22; 23; 24, which can in each case be applied onto sheets 02 by the at least one application unit 600, can be at least partially, preferably completely, detected and/or evaluated by the register monitoring system 728, in particular the at least one image acquisition device of the register monitoring system 728. The sheet 02 preferably in each case has at least one register mark 16; 17; 18; 19; 21; 22; 23; 24 for each application mechanism 614 used, preferably in each case two register marks 16; 17; 18; 19; 21; 22; 23; 24, with the sheet 02 more preferably in each case having a first register mark 16; 17; 18; 19, preferably in a forward region, in the transport direction T, of the main surface area of the sheet 02 which is provided with at least one print image, and in each case a second register mark 21; 22; 23; 24, preferably in a rear region, in the transport direction T, of the main surface area of the sheet 02 which is provided with at least one print image. The register monitoring system 728 is preferably configured to detect in each case at least one register mark 16; 17; 18; 19; 21; 22; 23; 24 for each application mechanism 614 used. The register monitoring system 728 is preferably configured to detect both the respective at least one first register mark 16; 17; 18; 19 and the respective at least one second register mark 21; 22; 23; 24 of the respective application mechanism 614 used on a relevant sheet 02.

In a preferred embodiment, the register monitoring system 728 comprises at least two image acquisition devices, preferably exactly two image acquisition devices, which are preferably arranged one behind the other in the transport direction T, preferably one directly behind the other in the transport direction T. The first image acquisition device of the register monitoring system 728 in the transport direction T is preferably configured to detect the respective at least one first register mark 16; 17; 18; 19 for each application mechanism 614 used, which is preferably arranged in the forward region, in the transport direction T, of the main surface area of the sheet 02 which is provided with at least one print image. The second image acquisition device of the register monitoring system 728 in the transport direction T is preferably configured to detect the respective at least one second register mark 21; 22; 23; 24 for each application mechanism 614 used, which is preferably arranged in the rear region, in the transport direction T, of the main surface area of the sheet 02 which is provided with at least one print image. As an alternative, the first image acquisition device is configured to detect the respective at least one second register mark 21; 22; 23; 24 for each application mechanism 614 used, and the second image acquisition device is configured to detect the respective at least one first register mark 16; 17; 18; 19 for each application mechanism 614 used. In this way, a respective image acquisition device is thus preferably configured to detect the respective at least one first register mark 16; 17; 18; 19 or the respective at least one second register mark 21; 22; 23; 24 of the respective application mechanism 614 used.

For example, when sheets 02 are guided lying flat, the register monitoring system 728 is preferably arranged above the transport path and/or the transport plane, in particular downstream from the transport path and/or the transport plane in the vertical direction V. The sheet 02 can thus be detected and/or inspected at least in a portion from above by the register monitoring system 728. When the sheet 02 is guided lying flat, the at least one register mark 16; 17; 18; 19; 21; 22; 23; 24 is preferably arranged on the main surface area of the sheet 02 so as to point upwardly. In this embodiment, the at least one register mark 16; 17; 18; 19; 21; 22; 23; 24 of the sheet 02 can thus be detected and/or inspected and/or evaluated at least partially, preferably completely, by the register monitoring system 728.

In the case of a preferred hanging guidance of sheets 02, the register monitoring system 728 is preferably arranged beneath the transport path and/or the transport plane, in particular upstream from the transport path and/or the transport plane in the vertical direction V. The register monitoring system 728 is thus preferably configured to detect and/or inspect the sheet 02 at least in a portion from beneath. When the sheet 02 is guided in a hanging state, the at least one register mark 16; 17; 18; 19; 21; 22; 23; 24 is preferably arranged on the main surface area of the sheet 02 so as to point downwardly. At least in this embodiment, the register monitoring system 728 is thus preferably configured to detect and/or inspect the at least one register mark 16; 17; 18; 19; 21; 22; 23; 24 of the sheet 02 at least partially, preferably completely, from beneath, and is preferably configured to detect and/or inspect it from upstream from the transport path and/or from upstream from the transport plane in the vertical direction V.

The register monitoring system 728, in particular the at least one image acquisition device, is preferably configured to detect at least a portion of the working width of the sheet processing machine 01.

In an alternative embodiment, at least the register is at least partially inspected and/or evaluated and/or adjusted by the operating staff, preferably based on at least one sample sheet. An additional inspection device 728 configured as a register monitoring system 728 is then preferably optional in the processing machine 01.

The registers of the application units 600 with respect to one another are preferably adjusted during a first printing process of the processing machine 01. For adjusting the register, an individual sheet 02 or at least two sheets 02 or as few sheets 02 as possible preferably pass through the units 100; 300; 600; 700; 900; 1000 of the processing machine 01 in the transport direction T. The registers of the application units 600 with respect to one another are preferably detected and/or controlled by the register monitoring system 728. The register monitoring system 728 preferably detects the at least one register mark 16; 17; 18; 19; 21; 22; 23; 24, preferably all register marks 16; 17; 18; 19; 21; 22; 23; 24 of the respective sheet 02.

In an ideally produced sheet 02 in a printing operating state of the processing machine 01, the sheet 02 preferably in each case has the at least one register mark 16; 17; 18; 19; 21; 22; 23; 24 per application mechanism 614 at its assigned reference position 06; 07; 08; 09; 11; 12; 13; 14. Depending on what kind of deviation of the respective register mark 16; 17; 18; 19; 21; 22; 23; 24 from its reference position 06; 07; 08; 09; 11; 12; 13; 14 is present, a different change is needed.

The potentially present deviation of the register mark 16; 17; 18; 19; 21; 22; 23; 24 from its reference position 06; 07; 08; 09; 11; 12; 13; 14, which preferably describes a deviation of the register, is preferably detected and, additionally or alternatively, evaluated by the register monitoring system 728. As an alternative, the deviation of the register is preferably detected and/or evaluated by the operating staff. If a deviation of at least one of the register marks 16; 17; 18; 19; 21; 22; 23; 24 from its reference position 06; 07; 08; 09; 11; 12; 13; 14 is present, preferably a change in the positioning of components of the processing machine 01 and/or in the sheet travel and/or in the speed of the sheets 02 is carried out in accordance with the present deviation. Preferably, for example, the forme cylinder 616 is controlled in a closed loop and/or the forme cylinder 616 is changed in terms of its position and/or a sheet 02 following on the transport path is controlled in a closed loop in accordance with the present deviation.

For example, in the case of a deviation of the first register mark 16; 17; 18; 19 and the respective second register mark 21; 22; 23; 24 of the same application mechanism 614 from their reference position 06; 07; 08; 09; 11; 12; 13; 14 in the direction Y, preferably by the same magnitude, which preferably corresponds to a displacement in the transport direction T in the processing machine 01, the first register mark 16; 17; 18; 19 and the respective second register mark 21; 22; 23; 24 of the same application mechanism 614 preferably have a displacement having the distance ay with respect to their respective reference position 06; 07; 08; 09; 11; 12; 13; 14. If in each case the first register mark 16; 17; 18; 19 and the second register mark 21; 22; 23; 24 of an assigned application mechanism 614 are preferably displaced by the distance ay with respect to the respective reference position 06; 07; 08; 09; 11; 12; 13; 14, the start of printing, for example, differs for the individual print image elements and, additionally or alternatively, for example, the arrival time of the sheet 02, in particular the arrival time of the leading edge 03 of the sheet 02 differs from the arrival time of the printing forme at the respective processing point 621 of the relevant application mechanism 614. Preferably so as to change, in particular to minimize, the displacement in the direction Y having the distance ay of the at least one application mechanism 614, the arrival time of the sheet 02, in particular of the leading edge 03 of the sheet 02, is preferably synchronized and/or harmonized with the arrival time of the forward edge of the printing region of the corresponding forme cylinder 616. The corresponding forme cylinder 616 is preferably at least briefly accelerated and/or decelerated by the change in its rotational speed and/or position, while the non-printing region is arranged at least in part at the processing point 621 so that the forward edge of the printing region of the forme cylinder 616 arrives preferably simultaneously with the leading edge 03 of the sheet 02 at the relevant processing point 621. The corresponding forme cylinder 616 is preferably at least briefly accelerated and/or decelerated by the change in its rotational speed and/or position for changing the register in direction Y, in particular in the circumferential direction of the forme cylinder 616, while the non-printing region is arranged at least in part at the processing point 621.

For example, in the case of a deviation of the first register mark 16; 17; 18; 19 and the respective second register mark 21; 22; 23; 24 of the same application mechanism 614 from their reference position 06; 07; 08; 09; 11; 12; 13; 14 in the direction X, which preferably corresponds to a displacement in the transverse direction A in the processing machine 01, the first register mark 16; 17; 18; 19 and the respective second register mark 21; 22; 23; 24 of the same application mechanism 614 preferably have a displacement in the direction X having the distance ax with respect to their respective reference position 06; 07; 08; 09; 11; 12; 13; 14. If in each case the first register mark 16; 17; 18; 19 and the second register mark 21; 22; 23; 24 of an assigned application mechanism 614 are preferably displaced by the distance ax with respect to the respective reference position 06; 07; 08; 09; 11; 12; 13; 14, the printing forme and/or the forme cylinder 616 of the relevant application mechanism 614 are preferably displaced in the transverse direction A relative to the sheet 02. Preferably so as to change, in particular to minimize, the displacement in the direction X having the distance ax of at least one application mechanism 614, the forme cylinder 616 and/or the printing forme of the forme cylinder 616 of the relevant application mechanism 614 are preferably displaced in the transverse direction A, counter to the direction in which the displacement exists, preferably by the magnitude of the distance ax relative to the sheet 02. Preferably so as to change the register in the direction X, the forme cylinder 616 and/or the printing forme of the forme cylinder 616 of the relevant application mechanism 614 are preferably configured to be adjustable in the transverse direction A, counter to the direction in which the displacement exists, preferably by the magnitude of the distance ax relative to the sheet 02.

The first reference position 06; 07; 08; 09 preferably has a reference length l1, in particular a reference length l1 configured as a reference path, with respect to the second reference position 11; 12; 13; 14 of the same application mechanism 614. The first reference mark 16; 17; 18; 19 preferably has the printing length l2, in particular the printing length l2 configured as a printing path, with respect to the second reference mark 21; 22; 23; 24 of the same application mechanism 614. For example, in the case of a deviation of the second register mark 21; 22; 23; 24 of at least one application mechanism 614 from the assigned reference position 11; 12; 13; 14 in the direction Y, which preferably corresponds to a displacement in the transport direction T in the processing machine 01, and an at least partial agreement between the first register mark 16; 17; 18; 19 of the same application mechanism 614 and the respective assigned reference position 06; 07; 08; 09, the printing length l2 differs from the reference length l1. In the case of a deviation of the printing length l2 from the reference length II, a change in the length with which the sheet 02 is printed by the one printing forme of the relevant forme cylinder 616 preferably exists. This is the case, for example, when the sheet 02, as a result of at least one processing operation and/or the application of printing fluid upstream from the relevant application unit 614 in the transport direction T has a length in the direction Y, in particular its length in the transport direction T within the processing machine 01, which differs from an original length of the sheet 02 upstream from the at least one processing operation and/or prior to the application of printing fluid. For example, the length of the sheet 02 increases in the transport direction T along the transport path as a result of the at least one processing operation and/or the application of printing fluid. Preferably so as to change the printing length l2 relative to the reference length l1, in particular so as to minimize a difference in the printing length l2 with respect to the reference length l1, the forme cylinder 616 preferably has an at least partially changing speed, in particular circumferential speed, as long as at least a portion of the printing region of its outer cylindrical surface is arranged at the processing point 621. Preferably, the rotational speed and/or the circumferential speed of the forme cylinder 616 are changed relative to the rotational speed and/or the circumferential speed of the assigned impression cylinder 617. For example, the impression cylinder 617 has a higher circumferential speed than the forme cylinder 616. The change in the printing length l2 relative to the reference length l1 is preferably achieved by an acceleration and/or a deceleration of the forme cylinder 616 by the dedicated drive of the forme cylinder 616, while the impression cylinder 617 is preferably operated at a constant circumferential speed. As a result, for example, the respective applied print image on the sheet 02 is stretched and/or compressed relative to the printing forme used. For example, the print image on the sheet 02 is extended as a result of a decreased circumferential speed of the forme cylinder 616 relative to the circumferential speed of the impression cylinder 617. Preferably, the register can be adjusted in the circumferential direction of the forme cylinder 616 regarding the printing length l2 by an acceleration and/or a deceleration of the forme cylinder 616 by the dedicated drive of the forme cylinder 616, while the impression cylinder 617 is preferably operated at a constant circumferential speed.

The first reference position 06; 07; 08; 09 preferably has the reference path with respect to the second reference position 11; 12; 13; 14 of the same application mechanism 614. The first register mark 16; 17; 18; 19 preferably has the printing path with respect to the second register mark 21; 22; 23; 24 of the same application mechanism 614. The printing path is preferably parallel, preferably identical, to the reference path in an ideally produced sheet 02. For example, if the first register mark 16; 17; 18; 19 deviates from its reference position 06; 07; 08; 09 or if the second register mark 21; 22; 23; 24 deviates from its reference position 11; 12; 13; 14, the printing path preferably has an angle w, in particular a tilt angle w, with respect to the reference path. For example, the longitudinal axis of the forme cylinder 616 and/or the printing forme of the forme cylinder 616 of the relevant application mechanism 614 is tilted relative to the transverse direction A, preferably relative to the sheet 02, by the tilt angle w. Preferably so as to change the tilt of the longitudinal axis of the forme cylinder 616 and/or the printing forme of the forme cylinder 616 of the relevant application mechanism 614 relative to the transverse direction A, preferably relative to the sheet 02, the relevant forme cylinder 616 and/or the printing forme of the relevant forme cylinder 616 are preferably tilted counter to the tilt angle w, preferably by the same magnitude of the tilt angle w, relative to the transverse direction A. Preferably so as to change the register regarding a skewed position of the print image element, the relevant forme cylinder 616 and/or the printing forme of the relevant forme cylinder 616 are preferably configured so as to be tiltable and/or adjustable counter to the tilt angle w, preferably by the same magnitude of the tilt angle w, relative to the transverse direction A.

In a second printing process of the processing machine 01, sheets 02, in particular a multiplicity of sheets 02, are processed by the at least one unit 600; 900 of the processing machine 01. The respective sheet travel sensor 622 preferably detects the respective sheet 02 while sheets 02, during the second printing process, pass through the processing machine 01 along the transport path, and thus determines its arrival time at the position of the relevant sheet travel sensor 622. Preferably, each sheet 02 that passes the position of the relevant sheet travel sensor 622 is detected by the sheet travel sensor 622. The forme cylinder 616 assigned to the sheet travel sensor 622 is preferably controlled in a closed loop and/or an open loop control in accordance with the arrival time of the one relevant sheet 02 at the position of the sheet travel sensor 622, preferably regardless of further measured values of other sheets 02 by this sheet travel sensor 622, preferably in such a way that the leading edge 03 of the sheet 02 arrives simultaneously with the forward edge of the printing region of the forme cylinder 616 at the processing point 621 of the relevant application unit 600. More preferably, the register monitoring system 728 is used to adjust the speed of the cylinders of the application units 600. In particular, the register monitoring system 728 is used to control in an open loop and/or a closed loop the printing length. Preferably, the speed of the cylinders is adapted for this purpose.

The inspection device 726; 728; 916, in particular the register monitoring system 728, preferably detects the at least one register mark 16; 17; 18; 19; 21; 22; 23; 24, in particular the respective register marks 16; 17; 18; 19; 21; 22; 23; 24, of sheets 02 during the second printing process. Preferably, the inspection device 726; 728; 916, in particular the register monitoring system 728, detects each passing sheet 02. In a preferred embodiment, the inspection device 726; 728; 916, in particular the register monitoring system 728, ascertains the deviation of the at least one register mark 16; 17; 18; 19; 21; 22; 23; 24 from its reference position 06; 07; 08; 09; 11; 12; 13; 14. From the ascertained deviations of at least two sheets 02, preferably of at least five sheets 02, more preferably of at least ten sheets 02, the inspection device 726; 728; 916, in particular the register monitoring system 728, preferably in each case calculates a mean deviation of the one register mark 16; 17; 18; 19; 21; 22; 23; 24 from its reference position 06; 07; 08; 09; 11; 12; 13; 14. The inspection device 726; 728; 916 preferably outputs a signal, in particular a warning signal and/or a closed-loop control signal and/or an open-loop control signal, as soon as the magnitude of the mean deviation exceeds a limit value. Preferably, the inspection device 726; 728; 916 controls in a closed loop and/or an open-loop the forme cylinder 616 assigned to the register mark 16; 17; 18; 19; 21; 22; 23; 24 by an at least brief change in the rotational speed and/or speed, preferably in the case of the mean deviation in the direction Y of the register mark 16; 17; 18; 19; 21; 22; 23; 24 from its reference position 06; 07; 08; 09; 11; 12; 13; 14 by a magnitude that exceeds the limit value, so that the forward edge of the printing region of the forme cylinder 616 arrives preferably simultaneously with the leading edge 03 of the sheet 02 at the relevant processing point 621. Preferably, the inspection device 726; 728; 916 controls in a closed loop and/or an open loop a diversion of the relevant sheet 02 from the actual transport path, for example onto an alternative transport path, and/or outputs at least one signal, as soon as the deviation of the at least one register mark 16; 17; 18; 19; 21; 22; 23; 24 from its reference position 06; 07; 08; 09; 11; 12; 13; 14 exceeds the limit value.

In a preferred embodiment of the processing machine 01, the arrival time of the individual sheet 02 at the processing point 621 of the application unit 600 and the arrival time of the forward edge of the printing region of the forme cylinder 616 of this application unit 600 during the printing process, in particular the second printing process, is in each case adjustable and/or is adjusted by the signal of the sheet travel sensor 622 assigned to the application unit 600 for the closed-loop control and/or open-loop control of the forme cylinder 616. Preferably, the register in the direction Y, preferably the register in the circumferential direction of the forme cylinder 616, during the printing operating state, in particular the second printing process, is in each case configured so as to be adjustable and/or is adjusted by the signal of the sheet sensor 622 assigned to the application unit 600, in particular of the sheet travel sensor 622, for the closed-loop control and/or open-loop control of the forme cylinder 616. Preferably, the closed-loop control and/or open-loop control by the at least one signal of the inspection device 726; 728; 916 is configured to eliminate the mean deviation of the register mark 16; 17; 18; 19; 21; 22; 23; 24 from its reference position 06; 07; 08; 09; 11; 12; 13; 14 which exceeds the limit value. Preferably, a manual and/or mechanical closed-loop control and/or open-loop control of the register in the circumferential direction is carried out following the at least one signal of the inspection device 726; 728; 916 in the event of a mean deviation of the register mark 16; 17; 18; 19; 21; 22; 23; 24 from its reference position 06; 07; 08; 09; 11; 12; 13; 14 which exceeds the limit value.

Preferably, the closed-loop control and/or open-loop control based on the sheet travel sensor 622 outweighs the closed-loop control and/or open-loop control based on the inspection device 726; 728; 916 for changing the register in the direction Y, preferably changing the register in the circumferential direction of the forme cylinder 616 in the second printing process.

Preferably in addition or as an alternative, the processing machine 01 is configured in such a way that the printing length l2 is changed and/or is configured so as to be changeable by a change in the circumferential speed and/or rotational speed of the forme cylinder 616 relative to the circumferential speed and/or rotational speed of the impression cylinder 617 assigned to the respective forme cylinder 616. Preferably in addition or as an alternative, the processing machine 01 is configured in such a way that the dimension of the printing length l2 detected by the at least one inspection device 726; 728; 916, in particular the deviation in the printing length l2 relative to the reference length l1, is changed and/or is configured so as to be changeable by a change in the circumferential speed and/or rotational speed of the forme cylinder 616 relative to the circumferential speed and/or rotational speed of the impression cylinder 617 assigned to the respective forme cylinder 616.

In addition or as an alternative, the processing machine 01 is preferably characterized in that the processing machine 01 comprises the shaping device 900 including the forme cylinder 901 comprising a dedicated drive and the processing point 910 assigned to the forme cylinder 901. The forme cylinder 901 of the shaping device 900 is preferably in each case driven mechanically independently of any further cylinder and/or roller of the shaping device 900 and/or the processing machine 01.

Preferably in addition or as an alternative, the at least one further sheet sensor 922 is arranged along the transport path of sheets 02 upstream from the processing point 910 of the shaping device 900. In one embodiment, the sheet sensor 922 is configured to control in a closed-loop and/or an open loop the position and/or the rotational speed of the forme cylinder 901 of the shaping device 900.

Preferably in addition or as an alternative, the at least one inspection device 726; 728; 916 is arranged along the transport path of sheets 02 downstream from the forme cylinder 901 of the shaping device 900, or additionally the at least one further inspection device 916 is arranged along the transport path of sheets 02 downstream from the forme cylinder 901 of the shaping device 900, for at least partially inspecting sheets 02, preferably for at least partially inspecting at least one remaining portion of the at least one sheet 02, processed by the shaping device 900, including at least one multiple-up 1101. Preferably, the at least one inspection device 916 configured as a die-cutting monitoring system 916 is arranged along the transport path provided for the transport of sheets 02 for at least partially inspecting sheets 02, preferably for at least partially inspecting at least one remaining portion of the at least one sheet 02, processed by the shaping device 900, including at least one multiple-up 1101, preferably at least two multiple-ups 1101.

The inspection device 726; 728; 916 configured as a die-cutting monitoring system 916 is configured, by way of ascertaining, to at least partially inspect the contour of at least one offcut piece, which was removed on the transport path upstream from the die-cutting monitoring system 916, at the remaining sheet 02, in particular at the at least one multiple-up 1101 and/or the at least one sheet opening 1102. The contour of the remaining sheet 02 on the transport path downstream from the separation device 903, or, for example, after the sheet 02 has passed through the sheet processing machine 01, preferably results from the removal of the at least one offcut piece from the relevant sheet 02.

Preferably, the sheet processing machine 01 comprising a shaping device 900 for processing sheets 02 preferably comprises the at least one separation device 903 and the at least one delivery unit 1000, wherein the separation device 903 is configured to remove at least one offcut piece from the at least one sheet 02. The at least one die-cutting monitoring system 916 for at least partially inspecting at least a remaining portion of the at least one sheet 02, processed by the shaping device 900, including the at least one multiple-up 1101 is preferably arranged downstream from the at least one separation device 903 in the transport direction T of the sheets 02.

The respective sheet 02 preferably has at least one multiple-up 1101 including at least one print image and at least one sheet opening 1102. The respective sheet 02 preferably has at least one multiple-up 1101 and at least one sheet opening 1102, the respective sheet 02 being made of paper or cardboard or paperboard. The die-cutting monitoring system 916 is preferably configured to at least partially detect the at least one sheet opening 1102. The die-cutting monitoring system 916, preferably the evaluation means, is preferably configured to at least compare the at least one sheet opening 1102 to a reference of the at least one sheet opening 1102.

The reference of the at least one sheet opening 1102 preferably contains at least some of the information, preferably all of the information, that is necessary to unambiguously determine a required target state of the relevant sheet opening 1102. The reference of the at least one sheet opening 1102 is preferably configured as a digital and/or taught-in reference. The digital reference is preferably configured as a digital image template. The digital reference preferably has a pdf or tif or jpg file format. The taught-in reference is preferably a sheet 02 that is configured as a sample sheet and has at least one sheet opening 1102, which corresponds to the sheet opening 1102 to be inspected, and/or, for example, is detected by the die-cutting monitoring system 916 and/or stored in the evaluation means as a basis for comparison.

The inspection device 916 configured as a die-cutting monitoring system 916 preferably comprises at least one image acquisition device, preferably at least one optical image acquisition device. The at least one image acquisition device is preferably configured as a camera, more preferably as a color camera, more preferably as a line scan camera, more preferably as a CMOS sensor and/or CCD sensor. For example, the die-cutting monitoring system 916 comprises at least one light source, for example at least one LED light source, in addition to the at least one image acquisition device. The die-cutting monitoring system 916 preferably comprises at least one optical device, which is preferably arranged between the at least one image acquisition device and the transport path provided for the transport of sheets 02. The die-cutting monitoring system 916, in particular the at least one image acquisition device, is preferably configured to detect at least a portion of the working width, more preferably the entire working width, of the sheet processing machine 01. For example, an image acquisition device only detects a portion of the working width, and in this case the die-cutting monitoring system 916 preferably comprises at least two image acquisition devices, which are each configured to detect regions of the working width that at least partially differ from one another. If present, the at least two image acquisition devices of the die-cutting monitoring system 916 are preferably arranged side by side in the transport direction T and/or one behind the other in the transverse direction A.

In a preferred embodiment, the die-cutting monitoring system 916 is arranged directly following the separation device 903 in the transport direction T. The die-cutting monitoring system 916 is preferably arranged directly following the separation device 903 in the transport direction T, without any possible further processing device therebetween and/or without any possible further processing stage, such as gluing a multiple-up 1101 and/or separating individual multiple-ups 1101 from one another, being arranged therebetween. More preferably, the die-cutting monitoring system device 916 is arranged directly following the separation device 903, upstream from any possible further processing device, for example a gluing device and/or a multiple-up separation device, for possibly further processing the at least one sheet 02. The die-cutting monitoring system 916 is preferably arranged upstream from the delivery unit 1000, and downstream from the separation device 903, in the transport direction T.

In addition or as an alternative, the sheet processing machine 01 is preferably characterized in that the die-cutting monitoring system 916 is preferably arranged orthogonally to the transport path of the at least one sheet 02 provided for the transport of sheets 02 and is directed at the transport path of the at least one sheet 02. The die-cutting monitoring system 916 is preferably arranged orthogonally to the transport plane of the at least one sheet 02 and is directed at the transport plane of the at least one sheet 02. Above and below, the transport plane preferably denotes a plane of the transport path spanned by the transport direction T and the transverse direction A, in particular at the position along the transport path to which reference is made. The die-cutting monitoring system 916 is preferably arranged outside the transport path and is directed at the transport path and/or the transport plane. The die-cutting monitoring system 916 is preferably directed perpendicularly at the transport path and/or the transport plane. The die-cutting monitoring system 916 is preferably arranged upstream and/or downstream from the transport path in the vertical direction V. The die-cutting monitoring system 916 is preferably configured so as to inspect the sheet 02 from the side of the main surface area of the sheet 02 on which the at least one print image is applied to the sheet 02.

For example, when sheets 02 are guided lying flat, the die-cutting monitoring system 916 is preferably arranged above the transport path and/or the transport plane, in particular downstream from the transport path and/or from the transport plane in the vertical direction V. The die-cutting monitoring system 916 can thus inspect the sheet 02 from above. When the sheet 02 is guided lying flat, the at least one print image is preferably arranged on the main surface area of the sheet 02 so as to point upwardly. The inspection device 916 configured as a die-cutting monitoring system 916 is thus likewise configured in this embodiment to detect the at least one print image of the sheet 02.

In the case of a hanging guidance of sheets 02, the die-cutting monitoring system 916 is preferably arranged beneath the transport path and/or the transport plane, in particular upstream from the transport path and/or upstream from the transport plane in the vertical direction V. The die-cutting monitoring system 916 is thus preferably configured so as to inspect the sheet 02 from beneath. In the case of the hanging guidance of sheets 02, the at least one print image is preferably arranged on the main surface area of the sheet 02 so as to point downwardly. At least in this embodiment, the die-cutting monitoring system 916 is thus, preferably additionally or alternatively, configured so as to inspect the at least one print image of the sheet 02 from beneath, and preferably is configured so as to inspect it from upstream from the transport path and/or from upstream from the transport plane in the vertical direction V.

In addition or as an alternative, the die-cutting monitoring system 916 is preferably configured so as to inspect the at least one remaining portion of the at least one sheet 02 processed by the shaping device 900 during at least one shaping process of at least one further sheet 02. The die-cutting monitoring system 916 is thus preferably configured so as to detect each sheet 02, and preferably is configured so as to individually detect each sheet 02 that passes the die-cutting monitoring system 916 on the transport path in the transport direction T. For example, further sheets 02 are already processed in at least one shaping process of the at least one shaping device 900 and/or pass through at least one unit 100; 300; 600; 700; 900 of the sheet processing machine 01 which is arranged upstream from the inspection device 916 in the transport direction T, while a sheet 02 is being detected by the die-cutting monitoring system 916.

In a preferred embodiment, the die-cutting monitoring system 916, in particular the image acquisition device of the die-cutting monitoring system 916, is at least configured to at least partially detect at least one sheet opening 1102, for example at least one sheet gap 1102, of the at least one sheet 02 and/or at least an inner contour of the at least one sheet 02, preferably defined by at least one sheet opening 1102, and/or at least one outer contour of the at least one sheet 02, preferably defined by at least one outer edge of the respective sheet 02. As an alternative, the die-cutting monitoring system 916, in particular the image acquisition device of the die-cutting monitoring system 916, is preferably at least configured to at least partially detect the at least one multiple-up 1101 and/or the contour, in particular the boundary line, of the particular multiple-up 1101. Above and below, the contour of a sheet 02 preferably describes the shape of the particular sheet 02, in particular an outer and/or inner boundary line of the at least one multiple-up 1101 of the particular sheet 02. The outer contour of the sheet 02 is preferably defined by at least one outer edge of the sheet 02, in particular by at least one outer edge of the at least one multiple-up 1101. The inner contour of the sheet 02 is preferably defined by at least one sheet opening 1102 and/or sheet gap 1102, preferably within the outer contour of the particular sheet 02, more preferably within the main surface area in the region of the at least one multiple-up 1101 of the particular sheet 02. The die-cutting monitoring system 916, in particular the image acquisition device of the inspection device 916, is preferably configured to at least partially detect the main surface area of sheets 02. The die-cutting monitoring system 916, in particular the image acquisition device of the inspection device 916, is preferably configured to at least partially detect the region of the at least one offcut piece and/or of the at least one sheet opening 1102 of sheets 02.

The inner contour of the at least one sheet 02 preferably corresponds to a contour of the at least one offcut piece of the relevant sheet 02, in particular after the at least one offcut piece has been removed from the relevant sheet 02.

The die-cutting monitoring system 916, in particular the evaluation means, is preferably configured to ascertain a degree of a deviation of the at least one sheet opening 1102 and/or of the at least one inner contour and/or of the at least one outer contour of the sheet 02 from the target state of the respective sheet 02.

If, for example, a sheet opening 1102 comprises at least a remaining portion of the at least one offcut piece, the actual state of the relevant sheet 02 deviates from the target state of the relevant sheet 02. If the remaining portion of the offcut piece, for example, has a surface area of less than 25 $mm^2$ (twenty-five square millimeters), preferably of less than 20 $mm^2$ (twenty square millimeters), more preferably of less than 15 $mm^2$ (fifteen square millimeters), the degree of the deviation is preferably within the scope of the tolerance of the target state of the particular sheet 02, and the at least one "good" signal is output. For example, in the case of a surface area of at least 25 $mm^2$ (twenty-five square millimeters), preferably at least 30 $mm^2$ (thirty square millimeters), more preferably 35 $mm^2$ (thirty-five square millimeters) of the at least one remaining portion of the offcut piece, the at least one "bad" signal is preferably output.

In addition or as an alternative, in particular the inspection device 916 configured as a die-cutting monitoring system 916 is preferably at least configured to evaluate the at least one color register of the at least one print image of the at least one sheet 02 and/or at least to compare the at least one print image of the at least one sheet 02 to the at least one sheet opening 1102 and/or the at least one inner contour and/or the at least one outer contour of the particular sheet 02. The inspection device 726; 728; 916 is preferably configured to evaluate the at least one color register of the at least one print image of the at least one sheet 02 and/or at least to compare the at least one print image of the at least one sheet 02 to the at least one sheet opening 1102 and/or the at least one inner contour and/or the at least one outer contour of the particular sheet 02.

The inspection device 726; 728; 916 is preferably configured to at least partially detect and/or evaluate the at least one print image on sheets 02, which was applied by the at least one application mechanism 614. The inspection device 726; 728; 916 is preferably configured to detect the at least one print image of the relevant sheet 02 as at least one informational component of the actual state of the particular sheet 02, and to preferably compare this actual state to the target state regarding the sheet 02, for example by the evaluation means. As an alternative or in addition, the inspection device 726; 728; 916 is preferably configured to at least partially detect the at least one print image, and to at least partially detect the at least one sheet opening 1102 and/or the at least one inner contour and/or the at least one outer contour of sheets 02. The inspection device 726; 728; 916, in particular the evaluation means, is preferably configured so as to compare the at least one print image of the sheet 02 at least to the contour of the respective sheet 02, for example by comparing the actual state to the target state of the particular sheet 02.

In addition or as an alternative, the processing machine 01 is preferably characterized in that the die-cutting monitoring system 916 is configured so as to ascertain a degree of tool wear of the at least one tool of the at least one shaping device 900. The shaping device 900, in particular the shaping mechanism 914 and/or the forme cylinder 901, preferably comprise the at least one tool, preferably at least one cutting tool and/or at least one creasing tool and/or at least one perforating tool and/or at least one embossing tool and/or at least one die-cutting tool, for processing sheets 02. The tool is configured to be subject to wear due to the processing of sheets 02. The die-cutting monitoring system 916 is preferably configured to ascertain the degree of wear of the at least one tool of the shaping device 900, in particular of the shaping mechanism 914, preferably of the forme cylinder 901, by detecting sheets 02, in particular inspecting the at least one remaining portion of the at least one sheet 02, processed by the shaping device 900, including at least one multiple-up 1101, and/or by preferably comparing the actual state of the respective sheet 02 to the target state of the relevant sheet 02. For example, due to the direct contact between the tool of the shaping device 900, in particular of the shaping mechanism 914, preferably of the forme cylinder 901, with the impression cylinder 902 and/or the sheet 02, at least an external force acts on the tool and, for example, causes wear of the tool and/or impression cylinder 902.

In addition or as an alternative, the processing machine 01 is preferably characterized in that the die-cutting monitoring system 916 is configured so as to ascertain a degree of wear of at least one surface of the at least one impression cylinder 902 of the at least one shaping device 900. The at least one impression cylinder 902, for example in the case of a rotary die-cutting device 900, preferably has a surface that is preferably in direct contact with the tool of the shaping device 900, in particular the tool of the forme cylinder 901. For example, due to the direct contact between the surface of the impression cylinder 902 and the tool of the shaping device 900, preferably of the forme cylinder 901, at least an external force acts on the surface of the impression cylinder 902 and, for example, causes wear of the impression cylinder 902 and/or of the particular tool.

The inspection device 726; 728; 916, in particular the evaluation means, is preferably configured to store and evaluate data regarding the respective transported sheets 02, and preferably to create at least one report about the quality of the sheets 02. The report preferably includes at least the total number of processed sheets 02 within at least one unit of time and/or a joint job and/or the number and/or percentage of processed sheets 02 that were in each case guided to the delivery pile carrier 48 and/or to the diverted delivery 51. In addition or as an alternative, the report preferably includes a total number of multiple-ups 1101 and/or the number and/or percentage of multiple-ups 1101 that were in each case guided to the delivery pile carrier 48 and/or to the diverted delivery 51. In addition or as an alternative, the report preferably contains at least one piece of information about the respective cause for channeling the relevant sheets 02 and/or multiple-ups 1101 to the diverted delivery 51. The cause for the channeling to the diverted delivery 51 is, for example, the degree of the deviation of the at least one sheet opening 1102 and/or inner contour and/or outer contour of the particular sheet 02 from the target state of the relevant sheet 02, additionally or alternatively the evaluation of the at least one color register of the at least one print image of the relevant sheet 02 and/or the comparison of the at least one print image to at least one sheet opening 1102 and/or inner contour and/or outer contour of the relevant sheet 02. In addition or as an alternative, the report, for example, includes at least one piece of information about the degree of wear of the at least one tool of the shaping device 900. In addition or as an alternative, the report preferably includes the degree of the position of the at least one multiple-up 1101 relative to a reference of the position of the at least one multiple-up 1101 and, additionally or alternatively, the degree of the color of the at least one print image of the particular sheet 02 and/or multiple-up 1101 and, additionally or alternatively, the degree of at least one defect of the at least one processing operation of the particular sheet 02 and/or multiple-up 1101 and/or of the at least one print image of the particular sheet 02 and/or multiple-up 1101. For example, the report includes further information that is preferably detected and/or detectable by the at least one inspection device 726; 728; 916 or also by further components of the sheet processing machine 01. It is thus possible, for example, to exactly set, and preferably to guarantee, a desired and/or required quality of the sheets 02 preferably processed by the shaping machine 900, for example in the delivery pile of the delivery unit 1000.

In addition or as an alternative, the processing machine 01 is preferably characterized in that the inspection device 726; 728; 916 is preferably configured so as to ascertain a degree of a position of the at least one multiple-up 1101 relative to a reference of the position of the at least one multiple-up 1101 and, additionally or alternatively, a degree of the color of at least one print image of the particular sheet 02 and, additionally or alternatively, a degree of at least one defect of a processing operation of the particular sheet 02 and/or of a print image of the particular sheet 02 due to missing portions and/or additional portions, from the comparison of the actual state of the at least one sheet 02 to the target state of the respective sheet 02.

In addition or as an alternative, the sheet processing machine 01 is preferably characterized in that the inspection device 726; 728; 916 comprises the evaluation means or is connected to the evaluation means, and that the change in the transport path of a relevant sheet 02, in particular the sheet diverter 49, is controlled in an open loop and/or a closed loop and/or configured to be controllable in a closed loop and/or configured to be controllable in an open loop based on at least the one respective signal of at least one evaluation means. The change in the transport path, in particular the sheet diverter 49, is preferably controlled in a closed loop and/or an open loop and/or configured to be controllable in a closed loop and/or configured to be controllable in an open loop as a function of the evaluation of the detected sheet 02 by the evaluation means, preferably by the evaluation means of the inspection device 726; 728; 916. For example, the respective signal can be transmitted from the respective evaluation means, in particular from the evaluation means of the inspection device 726; 728; 916, to an open-loop control unit and/or a closed-loop control unit of the sheet diverter 49, which prompts and/or is configured so as to prompt a closed-loop control of the sheet diverter 49 and/or a change in the transport path.

In addition or as an alternative, the sheet processing machine 01 is preferably characterized in that the transport path between the inspection device 916 configured as a die-cutting monitoring system 916 and the position of the change in the transport path of the relevant sheet 02, in particular of the sheet diverter 49, is at least 30 cm (thirty centimeters), preferably at least 40 cm (forty centimeters), more preferably at least 50 cm (fifty centimeters). The transport path between the inspection device 916 and the sheet diverter 49 preferably has a length that the particular transported sheet 02 is preferably configured to travel in at least 50 ms (fifty milliseconds), preferably in at least 80 ms (eighty milliseconds), more preferably in at least 100 ms (one hundred milliseconds), as a function of the speed of the transported sheets 02. The transport path between the inspection device 916 and the sheet diverter 49 preferably has a length that the particular transported sheet 02 is preferably configured to travel in no more than 1000 ms (one thousand milliseconds), preferably in no more than 800 ms (eight hundred milliseconds), more preferably in no more than 300 ms (three hundred milliseconds), as a function of the speed of the transported sheets 02.

The respective sheet 02 preferably comprises at least one multiple-up 1101, preferably at least two multiple-ups 1101. The multiple-up 1101 preferably in each case includes at least one print image. The respective sheet 02 is preferably processed by way of the at least one application unit 600 and/or in the at least one shaping device 900. Preferably, respective sheets 02 are processed in at least one respective processing operation by means of at least one device of the sheet processing machine 01, for example are furnished with at least one application fluid and/or mechanically processed and/or altered in terms of their shape and/or are die cut. The sheets 02 are preferably transported at a processing speed during their respective processing operation, in particular along the transport path provided for the transport of sheets 02. Preferably, at least one offcut piece is removed from the respective sheet 02 downstream from the shaping device 900, preferably the die-cutting device 900 and/or rotary die-cutting device 900, in the transport direction T of the sheets 02. The at least one offcut piece is preferably already removed from the respective sheet 02 during the at least one processing operation and/or during the transport of the particular sheet 02 along the transport path, preferably along the transport path between the at least one shaping device 900 and the at least one separation device 903, and/or by the at least one separation device 903. The separation device 903 is preferably configured for the removal of the at least one offcut piece. More preferably, the separation device 903 is configured to entirely remove the at least one offcut piece from the respective sheet 02.

The at least one inspection device 726; 728; 916 preferably ascertains the actual state of the respective sheet 02. Preferably, the printed image monitoring system 726 and/or the register monitoring system 728 ascertain the actual state of the respective sheet 02 in the transport direction T downstream from the last application mechanism 614. Preferably, the die-cutting monitoring system 916 ascertains the actual state of the respective sheet 02 in the transport direction T downstream from the separation device 903. The inspection device 726; 728; 916 preferably ascertains the actual state of the respective sheet 02, which is preferably the state of the sheet 02, in particular with respect to the print image and/or agreement of the register and/or shape and/or mass and/or contour, that the respective sheet 02 has at the time of detection by way of the inspection device 726; 728; 916.

The actual state of the respective sheet 02 is preferably compared to the target state of the respective sheet 02. The inspection device 726; 728; 916 and/or the evaluation means preferably compare the actual state of the respective sheet 02 to the target state of the respective sheet 02. More preferably, the evaluation means of the inspection device 726; 728; 916 compares the actual state of the respective sheet 02 to the target state of the respective sheet 02. The actual state of the respective sheet 02 is preferably compared to the target state of the respective sheet 02, wherein the target state of the respective sheet 02 is preferably the state of the sheet 02, in particular with respect to the print image and/or agreement of the register and/or shape and/or mass and/or contour, that an ideally produced sheet 02 in particular is to have and/or has at the time of detection by way of the inspection device 726; 728; 916.

In addition or as an alternative, the method is preferably characterized in that the die-cutting monitoring system 916 preferably at least partially detects the at least one sheet opening 1102 of the at least one sheet 02 and/or the at least one inner contour of the at least one sheet 02, preferably defined by at least one sheet opening 1102, and/or the at least one outer contour of the at least one sheet 02, preferably defined by at least one outer edge of the respective sheet 02. The die-cutting monitoring system 916 preferably detects the shape of the sheet 02 and/or of the at least one multiple-up 1101, preferably at least the inner and/or outer boundary lines of the at least one multiple-up 1101 of the particular sheet 02. The die-cutting monitoring system 916 preferably detects the at least one outer edge of the sheet 02 and, additionally or alternatively, the at least one sheet opening 1102 of the relevant sheet 02. The die-cutting monitoring system 916 preferably at least detects the region of the at least one offcut piece and/or at least the region of the at least one sheet opening 1102. The inner contour of the at least one sheet 02 preferably corresponds to the contour of the at least one offcut piece of the relevant sheet 02, which was preferably removed from the relevant sheet 02.

As an alternative or in addition, the method is preferably characterized in that the degree of the deviation of the at least one sheet opening 1102 and/or of the at least one inner contour and/or of the at least one outer contour of the sheet 02 from the target state of the respective sheet 02 is ascertained from the comparison of the actual state of the at least one sheet 02 to the target state of the relevant sheet 02. Depending on the result of the ascertained degree of the deviation of the at least one sheet opening 1102 and/or of the at least one inner contour and/or of the at least one outer contour of the sheet 02 from the target state of the respective sheet 02, the inspection device 726; 728; 916, in particular the evaluation means, preferably outputs the at least one signal, for example the optical signal and/or the open-loop and/or closed-loop control signal. If the degree of the deviation is within the scope of the tolerance of the target state of the relevant sheet 02, the inspection device 726; 728; 916, in particular the evaluation means, preferably outputs the at least one "good" signal. If the degree of the deviation is outside the scope of the tolerance of the target state of the relevant sheet 02, the inspection device 726; 728; 916, in particular the evaluation means, preferably outputs the at least one "bad" signal. For example, in addition or as an alternative to the at least one "bad" signal, the inspection device 726; 728; 916, in particular the evaluation means, preferably outputs the at least one signal for the closed-loop and/or open-loop control of the sheet diverter 49.

For example, at a surface area of less than 25 $mm^2$ (twenty-five square millimeters), preferably of less than 20 $mm^2$ (twenty square millimeters), more preferably of less than 15 $mm^2$ (fifteen square millimeters), of the at least one remaining offcut piece, in the case that at least a portion of the at least one offcut piece has remained in the relevant sheet 02 downstream from the separation device 903 in the transport direction T, the degree of the deviation is preferably within the scope of the tolerance of the actual state of the particular sheet 02 and, for example, the at least one "good" signal is output. For example, at a surface area of at least 25 $mm^2$ (twenty-five square millimeters), preferably at least 30 $mm^2$ (thirty square millimeters), more preferably 35 $mm^2$ (thirty-five square millimeters), of the at least one remaining portion of the offcut piece, the at least one "bad" signal is preferably output and, additionally or alternatively, the at least one signal for the closed-loop and/or open-loop control of the sheet diverter 49 is output.

In addition or as an alternative, the method is preferably characterized in that the target state of the relevant sheet 02 is determined based on the digital and/or taught-in reference.

In addition or as an alternative, the method is preferably characterized in that a change in the transport path of the relevant sheet 02 provided for the transport of sheets 02, in particular the sheet diverter 49, is controlled in an open loop and/or a closed loop downstream from the inspection device 916 configured as the die-cutting monitoring system 916 and upstream from the delivery unit 1000 in the transport direction T, as a function of the comparison of the actual state of the relevant sheet 02 to the target state of the relevant sheet 02. Preferably, the change in a transport path provided for the transport of sheets 02, in particular the sheet diverter 49, is controlled in an open loop and/or a closed loop as a function of the comparison of the at least one sheet opening 1102 to the reference of the at least one sheet opening 1102 and/or as a function of the comparison of the actual state of the respective sheet 02 to the target state of the respective sheet 02. The relevant sheet 02 is preferably left on the intended transport path, or is diverted from the intended transport path to an alternative transport path, as a function of the comparison of the actual state of the relevant sheet 02 to the target state of the relevant sheet 02.

The inspection device 726; 728; 916, in particular the evaluation means, preferably outputs the at least one signal for controlling in an open loop and/or a closed loop the change in the transport path, in particular the sheet diverter 49. The inspection device 726; 728; 916 preferably comprises the evaluation means or is connected to the evaluation means, and the change in the transport path, in particular the sheet diverter 49, is preferably controlled in a closed loop and/or in an open loop based on the at least one signal of the evaluation means. The inspection device 726; 728; 916, in particular the evaluation means, preferably outputs the at least one signal for controlling in an open loop and/or a closed loop the change in the transport path, in particular the sheet diverter 49, in particular when the degree of the deviation is outside the scope of tolerance of the target state of the relevant sheet 02. The inspection device 726; 728;

916, in particular the evaluation means, preferably outputs the at least one signal for controlling in an open loop and/or a closed loop the change in the transport path, in particular the sheet diverter 49, regardless of whether the degree of the deviation is outside the scope of tolerance of the target state of the relevant sheet 02. This means that the inspection device 726; 728; 916, in particular the evaluation means, preferably outputs the at least one signal for controlling in an open loop and/or a closed loop the change in the transport path, in particular the sheet diverter 49, during and/or after the inspection of the relevant sheet 02, for example in addition or as an alternative to the at least one "good" signal or the at least one "bad" signal.

In addition or as an alternative, the method is preferably characterized in that the inspection device 726; 728; 916 comprises the evaluation means or is connected to the evaluation means, and that the change in the transport path of the respective sheet 02, in particular the sheet diverter 49, is controlled in an open loop and/or a closed loop based on the at least one signal of the evaluation means.

In addition or as an alternative, the method is preferably characterized in that the reaction time from the beginning of the ascertainment of the actual state of the relevant sheet 02 to the closed-loop control and/or open-loop control of the change in the transport path for diverting the respective sheet 02, in particular the sheet diverter 49, is at least 50 ms (fifty milliseconds), preferably at least 80 ms (eighty milliseconds), more preferably at least 100 ms (one hundred milliseconds). The ascertainment of the actual state of the relevant sheet 02 preferably begins at the leading end in the transport direction T, more preferably a forward edge 03 of the relevant sheet 02 in the transport direction T, and/or preferably as soon as the forward edge 03 of the relevant sheet 02 in the transport direction T reaches the region of the transport path in the transport direction T which is detected by the inspection device 726; 728; 916. Preferably, the relevant sheet 02, in particular the leading end of the relevant sheet 02 in the transport direction T, preferably travels the transport path between the inspection device 726; 728; 916 and the position for the change in the transport path, in particular the sheet diverter 49, as a function of the speed of the transported sheets 02, in at least 50 ms (fifty milliseconds), preferably in at least 80 ms (eighty milliseconds), more preferably in at least 100 ms (one hundred milliseconds). Preferably, the relevant sheet 02, in particular the leading end of the relevant sheet 02 in the transport direction T, preferably the forward edge 03 of the relevant sheet 02 in the transport direction T, preferably travels the transport path between the inspection device 916 and the position for the change in the transport path, in particular the sheet diverter 49, as a function of the speed of the transported sheets 02, in no more than 1000 ms (one thousand milliseconds), preferably in no more than 800 ms (eight hundred milliseconds), more preferably in no more than 300 ms (three hundred milliseconds).

In addition or as an alternative, the method is preferably characterized in that the inspection device 726; 728; 916 is arranged orthogonally to the transport path of the at least one sheet 02 provided for the transport of sheets 02 and is directed at the transport path of the at least one sheet 02. The inspection device 726; 728; 916 preferably detects the at least one portion of the transport path and/or of the transport plane at which it is directed. The inspection device 726; 728; 916 is preferably directed perpendicularly at the transport path and/or the transport plane and preferably perpendicularly detects the at least one portion of the transport path.

In addition or as an alternative, the method is preferably characterized in that the at least one print image, in particular the at least one print image of the respective multiple-up 1101, is applied onto the at least one sheet 02 by the at least one application mechanism 614 of the sheet processing machine 01 upstream from the shaping device 900 in the transport direction T. For example, the at least one print image is applied onto the relevant sheet 02 by at least one application mechanism 614. For example, the sheet processing machine 01 comprises at least two application mechanisms 614, whereby, for example, two print images and/or print image elements that differ from one another in at least one property, for example the application fluid that is used and/or the position of the print images on the sheet 02, are applied and/or can be applied onto the relevant sheet 02.

In addition or as an alternative, the method is preferably characterized in that the inspection device 726; 728; 916 comprises the evaluation means or is connected to the evaluation means, and that the inspection device 726; 728; 916 and/or the evaluation means detect and/or evaluate the at least one color register of the at least one print image. The method is preferably characterized in that the inspection device 726; 728; 916 comprises the evaluation means or is connected to the evaluation means, and that the inspection device 726; 728; 916 and/or the evaluation means evaluate the at least one color register of the at least one print image of the at least one sheet 02 and/or compare the at least one print image of the at least one sheet 02 to the at least one sheet opening 1102 and/or the at least one inner contour and/or the at least one outer contour of the respective sheet 02. The inspection device 726; 728; 916, in particular the evaluation means, preferably compares the actual state to the target state of the relevant sheet 02, wherein the at least one print image of the relevant sheet 02, in particular of the particular multiple-up 1101, and/or the at least one sheet opening 1102 and/or the at least one inner contour and/or the at least one outer contour of the relevant sheet 02 are preferably ascertained for ascertaining the actual state of the relevant sheet 02.

In addition or as an alternative, the method is preferably characterized in that the inspection device 726; 728; 916 comprises the evaluation means or is connected to the evaluation means, and that the inspection device 916, which in particular is configured as a die-cutting monitoring system 916, and/or the evaluation means detect and/or evaluate the position of the at least one multiple-up 1101 relative to the reference of the position of the at least one multiple-up 1101. Preferably, at least one further multiple-up 1101 and/or the at least one register mark 16; 17; 18; 19; 21; 22; 23; 24 are formed on the particular sheet 02 and/or at least one edge 03; 04 of the sheet 02 and/or at least one delimitation of the particular sheet 02, in particular the outer contour of the particular sheet 02, as the reference of the position of the relevant multiple-up 1101.

In addition or as an alternative, the method is preferably characterized in that the inspection device 726; 728; 916 comprises the evaluation means or is connected to the evaluation means, and that the inspection device 726; 728; 916 and/or the evaluation means detect and/or evaluate the at least one color of the at least one print image. The respective color of the print image is preferably established by the at least one application fluid that is preferably used to generate the print image and/or preferably corresponds to the application fluid that is preferably dried on the sheet 02 and used to generate the particular print image.

In addition or as an alternative, the method is preferably characterized in that the inspection device 726; 728; 916 comprises the evaluation means or is connected to the evaluation means, and that the inspection device 726; 728; 916 and/or the evaluation means detect and/or evaluate at least one defect in a processing operation of the respective sheet 02 and/or at least one defect of the at least one print image as a result of missing portions and/or additional portions. For example, a defect in the processing operation of the particular sheet 02 is an imperfection in the material of the particular sheet 02. For example, a defect of the at least one print image is an application that, for example, is additionally applied onto the sheet 02, for example a grease stain or additionally applied application fluid.

In addition or as an alternative, the method is preferably characterized in that the degree of tool wear of the at least one tool of the at least one shaping device 900, in particular of the shaping mechanism 914, preferably of the forme cylinder 901, of the sheet processing machine 01 is ascertained from the comparison of the actual state of the at least one sheet 02 to the target state of the respective sheet 02. The inspection device 726; 728; 916 preferably comprises the evaluation means or is connected to the evaluation means, and the inspection device 726; 728; 916 and the evaluation means preferably ascertain the degree of tool wear of the at least one tool of the at least one shaping device 900 of the sheet processing machine 01 for processing the particular sheet 02 prior to the inspection of the relevant sheet 02 by way of the inspection device 726; 728; 916.

In addition or as an alternative, the method is preferably characterized in that the degree of wear of the at least one surface of the at least one impression cylinder 902 of the at least one shaping device 900 of the sheet processing machine 01 is ascertained from the comparison of the actual state of the at least one sheet 02 to the target state of the respective sheet 02.

In addition or as an alternative, the method is preferably characterized in that the at least one sheet 02 is transported in a hanging state in the transport direction T, and that the inspection device 726; 728; 916 is arranged beneath the transport path of the at least one sheet 02 which is provided for the transport of sheets 02 and is directed at the transport path. The inspection device 726; 728; 916 preferably inspects the sheet 02 from the side of the main surface area of the sheet 02 onto which the at least one print image is applied to the sheet 02. In the case of the hanging guidance of sheets 02, the inspection device 726; 728; 916 is preferably arranged beneath the transport path and/or the transport plane, preferably upstream from the transport path and/or the transport plane in the vertical direction V, and/or is directed at the transport path and/or the transport plane. The inspection device 726; 728; 916 thus preferably inspects the sheet 02 from beneath. The inspection device 726; 728; 916 thus preferably detects, from beneath, at least a portion of the transport path and/or at least a portion of the transport plane, and thus at least a portion of the at least one sheet 02 passing the inspection device 726; 728; 916 on the transport path in the transport direction T, at the position of the transport path and/or of the transport plane at which the inspection device 726; 728; 916 is directed. The at least one print image is preferably applied onto the sheet 02 from beneath, i.e., upstream from the sheet 02 in the vertical direction V. At least in this embodiment, the inspection device 726; 728; 916 thus, additionally or alternatively, preferably inspects the at least one print image of the sheet 02 from beneath, and preferably inspects it from upstream from the transport path and/or from upstream from the transport plane in the vertical direction V.

In addition or as an alternative, the method is preferably characterized in that the degree of the position of the at least one multiple-up 1101 relative to a reference of the position of the at least one multiple-up 1101 and, additionally or alternatively, the degree of the color of at least one print image of the respective sheet 02 and, additionally or alternatively, the degree of at least one defect in a processing operation of the respective sheet 02 and/or of the at least one print image of the respective sheet 02 due to missing portions and/or additional portions, are ascertained from the comparison of the actual state of the at least one sheet 02 to the target state of the respective sheet 02.

The respective sheet 02 preferably includes the at least one multiple-up 1101 with the at least one print image and the at least one sheet opening 1102, for example the at least one sheet gap 1102. The inspection device 726; 728; 916 preferably at least partially detects the at least one sheet opening 1102. The inspection device 726; 728; 916, in particular the evaluation means, preferably compares the at least one sheet opening 1102 to the reference of the at least one sheet opening 1102.

The respective sheet 02 preferably has the at least one multiple-up 1101 and at least one sheet opening 1102. The respective sheet 02 is preferably made of paper or cardboard or paperboard. The inspection device 726; 728; 916 preferably at least partially detects the at least one sheet opening 1102.

The at least one sheet opening 1102 preferably corresponds to at least a portion of an offcut piece removed from the particular sheet 02. In addition or as an alternative, the sheet opening 1102 was preferably generated by removing the at least one portion of the at least one offcut piece from the particular sheet 02.

In addition or as an alternative, the method is preferably characterized in that the inspection device 726; 728; 916 at least partially detects the at least one contour and/or the at least one shape and/or the at least one mass and/or the at least one surface area of the at least one sheet opening 1102.

In addition or as an alternative, the method is preferably characterized in that the contour and/or shape and/or mass and/or surface area of the at least one sheet opening 1102 correspond to the contour and/or shape and/or mass and/or surface area of the at least one offcut piece removed from the respective sheet 02.

The reference of the at least one sheet opening 1102 and/or the target state of the relevant sheet 02 are preferably determined and/or configured so as to be determinable based on the digital reference and/or the taught-in reference. The reference of the particular sheet 02 preferably encompasses the reference of the at least one sheet opening 1102 of the particular sheet 02.

The sheet 02 is preferably inspected with respect to the processing of the particular sheet 02 by the shaping device 900 and, additionally or alternatively, the at least one print image applied onto the particular sheet 02 and, additionally or alternatively, the at least one print image applied onto the particular sheet 02 relative to the at least one sheet opening 1102 and/or the at least one inner contour and/or the at least one outer contour of the particular sheet 02.

The method is preferably characterized in that the sheets 02 are modified in terms of their shape in a respective shaping process. The respective shaping process is preferably a respective die-cutting process, in which the respective sheet 02 is die cut, wherein in particular portions of the sheet 02 are removed.

As an alternative or in addition, the method is preferably characterized in that, in a respective separation process, the sheets 02 are at least partially freed from the offcut pieces, for example by being jogged. During this process, the respective sheets 02 are preferably transported by means of the at least one separation transport means 904.

Hereafter, the correction of the processing length BL of a substrate 02 of the at least one shaping unit 900 will be described in greater detail. The processing length BL shall be understood to mean the length of the collectivity of die-cut multiple-ups 1101 of a substrate 02. In the embodiment of the shaping unit 900 as a die-cutting unit 900, the processing length BL can also be referred to as a die-cutting length. In a preferred embodiment, a sheet 02 has multiple sections. Accordingly, a dedicated processing length BL1; BL2; BL3 can also be defined for each section. Such a section can be defined, for example, by a multiple-up 1101. In the case of several multiple-ups 1101 arranged one behind the other in the transport direction T on a sheet, the processing length BL can then comprise several sections having dedicated processing lengths BL1; BL2; BL3 . . . . In the processing machine 01, the processing length BL can be corrected as a whole or, if present, in sections. In particular, the wording of the correction of the processing length BL likewise encompasses the correction of the processing length in sections.

Changes in printing lengths can occur in processing machines 01 that have integrated application units 600, in particular printing units 600. Such changes in printing lengths are usually the result of changes in state variables, such as the temperature or moisture, or the result of changes in the material properties, such as the nature of the sheet 02 to be processed. It is also possible for various state changes with changes in printing lengths to arise during a start-up of a machine. A change in printing lengths can in particular also occur during extended operating times. Likewise, the shaping outcome, for example die-cutting outcome, can change due to a change in state variables or material properties. Accordingly, it may become necessary to adapt the processing length BL. By automatically correcting the printing length l1 in conjunction with an automatic correction of the processing length BL of the respective shaping unit 900, a considerably higher degree of automation of the processing machine 01 can be achieved.

The processing length BL is corrected in multiple steps. In a first initialization step a), the processing length BL is divided into the designed sections. This is in particular useful when several multiple-ups 1101 are arranged one behind the other on a sheet 02. In a second step, this being the inspection step b), an actual state is detected. In a third step c), the actual processing length is compared to the target values. The target values are usually stored in a machine control system. In a further step, this being the comparison step d), a correcting variable is calculated from the deviation of the actual value. In a further step e), this being the control step, a speed ratio between a substrate 02 and a shaping cylinder 901 is adapted in such a way that the processing length BL is corrected. Thereafter, the new actual value is ascertained in a further step f) and is used again as feedback in order to further adapt the processing length BL. In a preferred embodiment, the steps take place in an automated manner in a control loop.

In the initialization step a), it is established how many sections the processing length BL of the substrate 02 has. For this purpose, a value including the number n of sections is preferably transmitted to a control unit 1201 of the processing mechanism 914. The sections BL1; BL2; BL3 of the processing length BL can then be individually adapted. In a preferred embodiment, the number n is entered at the control console 1202 of the processing machine 01 and transmitted to the control unit 1201. In another embodiment, the number n of the sections is evaluated by means of an inspection device 916, and the data is automatically transmitted to the respective control unit 1201. In addition or as an alternative, the number n from an order file, for example a PDF, can be utilized. For example, the number n can also be one, and a processing length BL is then corrected as a whole. In addition, an overall processing length can also be corrected as needed in the case of several sections.

In a preferred embodiment, the number of sections is ascertained by way of the multiple-ups 1101 arranged one behind the other on a sheet 02. The processing length BL can thus, for example, be corrected in sections in such a way that every multiple-up 1101 on the sheet 02 is individually adapted. For example, a sheet 02 comprises a first multiple-up 1101 and a further multiple-up 1101. A first section of the processing length BL1 is then assigned to the forward multiple-up 1101, and a second section of the processing length BL2 is assigned to the rear multiple-up. As a result of the division, the processing length of each multiple-up 1101 arranged one behind the other can be individually corrected. The multiple-ups 1101 are preferably arranged directly one behind the other on a sheet 02. This offers the advantage that the sheet 02 also maintains its stability downstream from the shaping unit 900. The connected multiple-ups 1101 can then be broken off in a further step.

As an alternative, crosspieces can also be arranged between the multiple-ups 1101. In general, the crosspieces are then either assigned to one of the sections or, in particular for a wide crosspiece, a new section is defined.

In a preferred embodiment, the processing length BL is divided into the sections in one method. For this purpose, a tool length of the forme cylinder 902 is stored in a machine control system. A forme length or tool length is between 450 mm and 1600 mm, for example. From this, a processing length BL can be derived, wherein the processing length BL preferably corresponds to the tool length or the forme length. Thereafter, a number of the sections is established and provided to a machine control system, for example by entry at a control console 1202. From this, the processing lengths BL1; BL2 of the individual sections are calculated in a stored sequence. For example, if the processing length BL1; BL2 has two sections and a total processing length is 1000 mm, each section has a length BL1; BL2 of 500 mm. Each of the sections preferably has the same size. In another preferred embodiment, the sections can also be differently sized. Usually, the multiple-ups 1101 are preferably arranged side by side and/or one behind the other on a sheet 02. However, the multiple-ups 1101 arranged one behind the other generally are not arranged so as to overlap and/or to be offset. Rather, the multiple-ups 1101 located one behind the other can be clearly separated from one another. This is in particular advantageous for a downstream multiple-up separating unit since these connected multiple-ups 1101 can then be separated more easily from one another. In a preferred embodiment, such a sheet 02 comprises at least one multiple-up 1101, more preferably at least two multiple-ups 1101, still more preferably at least three, four or five multiple-ups 1101 on a sheet 02. The multiple-ups 1101 are preferably arranged so as to be clearly separable by straight lines. Offset preferably does not occur to allow precise partitioning of the sections or is not helpful for a precise correction of the processing length BL.

A control console 1202 preferably has an input mask 930 for entering the tool values or the tool form. Preferably, a job name 931 and a job reference 936 are stored in such an input mask 930. Moreover, the number 933 of multiple-ups 1101 on a sheet 02 can be defined. What is more important for the correction is the number 932 of multiple-ups 1101 over the circumference of the forme cylinder 901 or the shaping tool 915. In addition, data regarding the dimensions of the tool 915 can be stored. For example, data regarding the width and the length of the tool for the particular job can be stored. In addition, further information 941 can be stored in the input mask 950. For example, distinctive features, such as a special symmetry or a center cut or no cutting blade, can be entered. For each job, the data can be saved and stored in a list. This is where the identifying data can be found, such as the job reference 937 and job designation 938, as well as further data regarding the tool and the multiple-ups 1101 over the circumference 940. The input mask 950 additionally has a navigation bar. Several symbols 942 are provided on this navigation bar. By actuating the symbols 942, it is possible to switch from one input mask 950 to another.

Preferably, the at least one forme cylinder 901 comprises at least one shaping tool 915 including at least one working surface 909. In a preferred embodiment, the at least one shaping tool 915 is mounted on a mounting plate 919. A forme cylinder 901 of a shaping unit 900 preferably has several holes 920 and/or bore holes 920, at which the mounting plate 919 and/or the shaping tool 915 can be directly mounted. The working surface 909 of the shaping tool 915 is preferably defined as a surface having a position that extends in the radial direction through the tool forms extending furthest to the outside. The shaping tool 915 preferably comprises several processing elements 921, preferably die-cutting elements 921. Such die-cutting elements 921 can, for example, be designed as cutting dies. A height of the die-cutting elements is preferably between 10 and 30 mm.

Furthermore, the working surface 909 preferably has a dimension in the circumferential direction. The working surface 909 preferably extends from a tool start 918 to a tool end 917. The tool start 918 is preferably defined by the start of elevations of processing elements 921 and/or die-cutting elements 921 and/or tool parts, in particular cutting dies, which are provided for processing a substrate 02. A working surface 909 preferably represents between 30% and 90% of the outer cylindrical surface of the forme cylinder 901. Covering shall in particular be understood to mean the projection of the working surface 909 directly onto the outer cylindrical surface in the radial direction. In particular, the working surface 909 can also be determined via an input mask from a value for trimming a working surface 909. The working surface 909 can preferably be subdivided into several sections having the lengths AL1; AL2; AL3 . . . in the circumferential direction. The working surface 909 of the shaping tool 915 comprises several sections having the working lengths AL1; AL2; AL3 . . . for processing sections arranged one behind the other on a substrate 02. The number of sections depends on the number n of processing sections of the job or the sections on a sheet. Accordingly, a section length AL1; AL2; AL3 of the working surface is assigned to each processing length of a section BL1; BL2; BL3 . . . . In addition, a surface, in particular a counter-surface having a length GL in the circumferential direction on the at least one impression cylinder 902, is assigned to the lengths of the processing length BL1; BL2; BL3 . . . . In the case of several sections, the counter-surface also comprises several sections. In the circumferential direction, each section then has the length GL1; GL2; GL3 . . . . The surface is preferably defined as the surface that comes in contact with the substrate 02 during operation. In particular when the substrate 02 comprises several sections having dedicated processing lengths BL1, BL2, BL3, each of the corresponding sections of the counter-surface is in contact with the sections of the substrate 02. The impression cylinder 902 preferably has a rough surface and can thus adapt the transport speed v3 of the sheet 02. The at least one impression cylinder 902 is preferably configured as a blanket cylinder or at least comprises a rubber layer. During operation, the shaping tool 915 comes in contact with the rubber layer of the impression cylinder 902. The rubber layer or the coating preferably has a thickness between 8 and 13 mm. During operation, the thickness can be reduced by several mm. For example, a minimum permissible thickness can range between 5 mm and 7 mm. This reduction is achieved, for example, as a result of grinding by means of a grinding roller and/or a grinding cylinder. During operation, the surface can be uneven as a result of contact with the die-cutting elements 921, which can be compensated for by way of grinding. The impression cylinder 902 preferably has a radius r2 from the axis of rotation to the outermost circumference of the impression cylinder 902. The impression cylinder 902 preferably has an inner radius between 200 mm and 400 mm. The radius r2 preferably ranges between 220 mm and 420 mm. The surface speed v2 and the circumferential speed are preferably linked to the angular speed ω2 via the radius r2.

In addition, further data regarding the processing operation can preferably be stored in the input mask. Preferably, it is also possible to enter or store information regarding the shape after the processing operation. For example, the reduction due to removal of material, for example as a result of die-cutting, by means of at least one parameter, for example trimming, is stored. Preferably, on the one hand, a width after trimming 934 can be entered into the input mask and be stored and, on the other hand, a length after trimming 935 can be stored. In addition, a value for the position of the sheet 02 after processing, in particular trimming at the front and a start of a cutting die, can be stored. Additionally, using the net dimensions of a sheet 02, trimming at the rear can then be calculated, and thus a position of the sheet 02 after processing can be predicted.

In a second step, this being the inspection step b), an actual state of the processing length BL or of its sections is detected. Preferably, the processing length BL is inspected downstream from the shaping unit 900. Several variants are conceivable and/or possible. In a first embodiment, an equipment operator removes a test sheet and places it on a sheet inspection table. He or she then inspects or measures the processing length BL or, in the case of several processing sections, inspects or measures the length of the processing sections BL1; BL2. This in particular refers to a length measurement of a meaningful length of a multiple-up 1101. This length is in particular dependent on the product that is being produced. In a preferred embodiment, the processing length BL1; BL2 of a section corresponds to the distance from the trailing edge, or the rearmost extent, to the leading edge, or the foremost extent, of a multiple-up 1101. Thereafter, the processing length BL is, or the sections BL1; BL2 are, for example, entered at a control console 1202 and are transmitted from there to a control unit 1201. As an alternative, a correction value is entered directly at the control console 1202 for the inspection result. In a preferred embodiment, such a correction value is unitless value. In another preferred embodiment, such a correction value is a dimensional absolute value or a percentage. The processing length in the individual sections can preferably be adapted between 0.1% and 1%, more preferably up to 3%. For example, the correction value is entered using a unit of measurement of length, preferably in mm. For example, the processing length BL can be varied between 1 mm and 8 mm, more preferably 5 mm. On the one hand, a correction value can be entered for the entire sheet 02 of the processing length BL. On the other hand, a correction value can be entered for each section. When the sections are divided by multiple-ups 1101 arranged one behind the other on the sheet 02, each multiple-up 1101 can then be individually adapted in terms of its length BL1; BL2; BL3 . . . . In another embodiment, the processing length BL is, or the sections of the processing length BL1; BL2; BL3 . . . are, inspected by means of the inspection device 916. In this case, a correction value can be automatically calculated and forwarded to the control unit 1201.

In a third step c), the actual processing length BL is compared to the target values BLref or a good processing outcome BLref. The processing length of each section BL1; BL2 . . . is preferably compared to the corresponding target values BL1ref, BL2ref . . . . For example, the target values are stored in a control unit 1201. As an alternative, the printing lengths can be used as target values. In this way, it is possible, for example, to compensate for defects in the printing length l2 by adapting the die-cutting result. Thereafter, a correction value is calculated from the respective deviation in a comparison step d), whereby a correcting variable is specified. Using a predefined sequence that is stored in the control unit 1201 in a memory, a controlled variable for open-loop control and/or closed-loop control is calculated.

The greater the deviation from the target value, the stronger is the influence on a speed ratio between the sheet 02 and the shaping unit 900. Preferably a position target value or an angle of rotation is calculated as the correcting variable so as to achieve the corresponding influence of speed ratios. In particular, the additive position target value or the difference in the angle of rotation is used for closed-loop control and/or open-loop control. In another embodiment, the correcting variable can be calculated by an electronic cam disk.

In the embodiment in which correction values are entered directly at the control console 1202, the comparison step to the target values by the control unit 1201 is dispensed with since the comparison has already been carried out by the equipment operator himself or herself. An input mask for the correction values 950 for correcting the processing length BL or the section of the processing lengths BL1; BL2; BL3 . . . includes at least one field 951 for entering the correction of the processing length BL. If several sections are present and the processing length is corrected, additional fields 952; 953; 954 exist for each additional section. In an embodiment comprising 4 sections BL1; BL2; BL3; BL4, a correction value 952; 953; 954 can be entered for each section. This correction value can be a non-dimensional value or a dimensional value. Preferably, additional values, such as distances values of the cylinders of the shaping mechanism 914 can be adjusted.

Thereafter, the speed ratio between the sheet 02 and the shaping unit 900 is adapted in an open-loop control or closed-loop control step e) so that the processing length BL or the die-cutting length BL is corrected. In particular, in this step, the correcting variable is transmitted to a rotary encoder or an angular position encoder and/or a speed controller of at least one drive 907; 908 of the cylinders 901; 902. The at least one forme cylinder 901 is arranged so as to be functionally connected to at least one drive 907. The at least one drive 907 of the at least one forme cylinder 901 is configured as a speed-controlled and/or closed-loop angular position controlled electric motor 907. The at least one impression cylinder 902 is arranged so as to be functionally connected to a further drive 908. The at least one drive 907 of the at least one forme cylinder 901 is configured as a speed-controlled and/or closed-loop angular position controlled electric motor 908.

During operation, the at least one forme cylinder 901 has a speed v1; ω1 and, during operation, the at least one impression cylinder 902 has a speed v2; ω2. During operation, the speeds have a speed ratio with respect to one another. This speed ratio can be changed and/or is changed in order to correct the processing length BL. This means that the at least one forme cylinder 901 and the at least one impression cylinder 902, at a first processing length BL, during a cylinder revolution have a first speed ratio v1/v2; ω1/ω2, and that the at least one forme cylinder 901 and the at least one impression cylinder 902, at a second different processing length BL of a substrate 02, have a second, different speed ratio v1/v2; ω1/ω2.

The speed v1; ω1 of the forme cylinder 901 and/or the speed v2; ω2 of the impression cylinder 902 can, on the one hand, refer to the angular speed ω1; ω2 or, on the other hand, to the circumferential speed v1; v2. The two speeds are preferably linked via the respective radius r1 of the forme cylinder 901 and/or via the radius r2 of the impression cylinder 902, in particular by multiplication. Preferably, the radius r1 preferably refers to the outermost radius, which is defined by the tips of the die-cutting elements 921. Likewise, the radius r2 of the impression cylinder 902 describes the outermost radius of the cylinder 902. Accordingly, the speed ratio v1/v2; ω1/ω2 differs within a full cylinder revolution, i.e., for example, from one cylinder revolution to another.

The at least one forme cylinder 901 and the at least one impression cylinder 902, during a first revolution, have a first speed ratio v1/v2; ω1/ω2, and the at least one forme cylinder 901 and the at least one impression cylinder 902, during another revolution, have a second different speed ratio v1/v2; ω1/ω2.

More preferably, within a full cylinder revolution, the speed ratio v1/v2; ω1/ω2 differs several times when the working surface 909 passes through a processing point 910, in particular in the case of several sections of the processing lengths. For example, the speed v1; v2; ω1; ω2 is varied between 0.1% and 10%, more preferably between 0.5% and 5%, so as to adjust the processing length.

If several sections of the processing length BL1; BL2; BL3 are present, the speed ratio is separately adapted in each section of the processing length BL1; BL2; BL3. The processing machine 01 then comprises at least one control unit 1201 for correcting a processing length BL, which controls in an open loop and/or a closed loop the angular speeds ω1; ω2 and/or the surface speeds v1; v2 of the at least one forme cylinder 901 and/or of the at least one impression cylinder 902. The angular speeds ω1; ω2 are preferably linked to the surface speed v1; v2 via the radius r1; r2 of the cylinders, in particular by multiplication. For correcting the processing length BL, the at least one control unit 1201 is arranged so as to transfer the speed ratio of the cylinders 901; 902 from a first speed ratio to a second speed ratio as a function of a deviation of an actual state of a processing length BL from a target state of a processing length BLref. The at least one control unit 1201 is arranged so as to change the number of speed ratios of the cylinders 901; 902 during a full cylinder revolution when the working surface 909 passes through a processing point 910, as a function of a number of correction values. The speed ratio v1/v2; ω1; ω2 can be adjusted in every section as a function of a correction value for correcting a processing length BL. When a deviation of a processing length BL from a target value BLref is present, the cylinders 901; 902 are arranged so as to be transferred from a first speed ratio v1/v2; ω1; ω2 to a second speed ratio v1/v2; ω1; ω2 by means of a correction value. The processing point 910 is defined as the point that is provided for processing a substrate 02 between the at least one forme cylinder 901 and the at least one impression cylinder 902. The at least one control unit 1202, for correcting the processing length BL, is arranged so as to transfer the speed ratio v1/v2; ω1/ω2 of the cylinders 901; 902 from a first speed ratio v1/v2; ω1/ω2 to a second speed ratio v1/v2; ω1/ω2, as a function of a deviation of an actual state of a processing length BL from a target state of a processing length BLref.

In a preferred embodiment of adjusting the processing length in sections, the at least one forme cylinder 901 and the at least one impression cylinder 902 have a first speed ratio when a section of the working surface 909 passes through the processing point 910, and have a second different speed ratio when another section of the working surface 909 passes through the processing point 910. The more sections a substrate 02 has, the larger is the number of different speed ratios that the two cylinders 901; 902 have with respect to one another. The speed ratios can preferably be adapted and/or are adapted in terms of the number of sections AL1; AL2; AL3 . . . within a full cylinder revolution. As each section of the working surface 909 passes through the processing point 910, the at least one forme cylinder 901 and the at least one impression cylinder 902 preferably have a different speed ratio. The sections are preferably partitioned in such a way that each section processes one multiple-up 1101 of the multiple-ups 1101 arranged one behind the other. In this case, the shaping tool 915 preferably has several at least partially identical structures and/or contours. This is in particular the case when several identical or at least partially identical or similar multiple-ups 1101 are to be produced, or are produced, from a substrate 02, in particular sheet 02. These structures resemble one another in terms of the arrangement of the cutting dies and/or die-cutting contour. However, it is also possible for several different multiple-ups 1101 to be arranged on a sheet 02. In this case, on the one hand, the sections can have different sizes and, on the other hand, the structures can also differ.

As an alternative or in addition, the speed ratio between the substrate 02 and the forme cylinder 901 is adjusted. A substrate 02 is moved in the processing point 910 at a transport speed v3, wherein the speed of the at least one forme cylinder 901 has a ratio with respect to the transport speed v3 of the substrate 02, and the processing length BL of the substrate 02 is adjusted by changing the speed ratio between the forme cylinder 901 and the substrate 02 at the processing point 910. A transport speed v3 during operation is preferably in the range between 2 and 6 m/s. More preferably, a maximum transport speed v3 is 5 to 6 m/s±10% In sheets/h, the production speed preferably ranges between 2000 and 12,000. During production, the cylinders 901; 902; 616; 617 preferably rotate at between 1 revolution per second and 3.5 revolutions per second. In the event of a deviation of a processing length BL from a reference processing length BLref, the speed ratio between the substrate 02 and the forme cylinder 902 is preferably changed from a first speed ratio at a processing point 910 to a second speed ratio. The at least one forme cylinder 901 comprises at least one shaping tool 915 including at least one working surface 909, wherein the shaping tool 915 with the working surface 909 covers at least a portion of the outer cylindrical surface of the at least one forme cylinder 901, and that the speed ratio adjusts in the area where the working surface 909 passes through a processing point 910. The speed ratio between the at least one forme cylinder 901 and the substrate 02 is maintained over several successive cylinder revolutions. Within a full cylinder revolution, while the working surface 909 passes through a processing point 910, the speed ratio between the at least one forme cylinder 901 and the substrate 02 is preferably changed at least once, more preferably several times.

In a preferred embodiment, the speed ratio between sheets 02 to be processed and the at least one shaping unit 900 is adapted by a change in the surface speed v1; v2 and/or the angular speed ω1; ω2 of one of the cylinders 901; 902 of the shaping unit 900. A speed v1; ω1 of the at least one forme cylinder 901 and a speed v2; ω2 of the at least one impression cylinder 902 have a speed ratio v1/v2; ω1/ω2 with respect to one another. On the one hand, the speed ratio refers to a ratio of the angular speeds ω1/ω2 between the at least one forme cylinder 901 and the at least one impression cylinder 902. On the other hand, the speed ratio refers to a ratio of the surface speeds v1/v2 between the at least one forme cylinder 901 and the at least one impression cylinder 902.

During operation, the processing length BL is adjusted by a change in the speed ratio v1/v3; ω1/v3 between the at least one forme cylinder 901 and the substrate 02. Preferably, the speed ratio of the at least one forme cylinder 901 is formed by the ratio of the surface speed v1 of the forme cylinder 901 to the transport speed v3 of the substrate 02. As an alternative, the speed ratio can also be formed by the ratio between the angular speed ω1 of the forme cylinder 901 and the transport speed v3 of the substrate 02. In the event of a deviation of a processing length BL from a reference processing length BLref, the speed ratio v1/v3; ω1/v3 between the substrate 02 and the forme cylinder 902 is preferably changed from a first speed ratio v1/v3; ω1/v3 at a processing point 910 to a second speed ratio v1/v3; ω1/v3. The speed ratio v1/v3; ω1/v3 between the at least one forme cylinder 901 and the substrate 02 is maintained over several successive cylinder revolutions. Within a full cylinder revolution, while the working surface 909 passes through a processing point 910, the speed ratio v1/v3; ω1/v3 between the at least one forme cylinder 901 and the substrate 02 is preferably changed at least once, more preferably several times. The speed ratio v1/v3; ω1/v3 between the forme cylinder 901 and the substrate 02 is adapted by changing the speed ratio v1/v3; ω1/v3 of the at least one forme cylinder 901 to the at least one impression cylinder 902. The substrate 02 comprises several sections having processing lengths BL1; BL2; BL3 . . . , and the speed ratio between the forme cylinder 901 and the substrate 02 is varied and/or can be varied in every section when each section passes through a processing point 910. The speed ratio v1/v3; ω1/ω3 between the forme cylinder 901 and the substrate 02, and thus the processing length BL, is varied by changing the speed ratio v1/v3; ω1/ω2 of the at least one forme cylinder 901 to the at least one impression cylinder 902.

The at least one control unit 1201 is arranged so as to control in an open loop and/or a closed loop at least the at least one impression cylinder 902, whereby the speed ratio differs at least once, preferably several times, due to the acceleration and/or deceleration of the at least one impression cylinder 902. More preferably, the surface speed v2 and/or the angular speed ω2 of the at least one impression cylinder 902 are adapted. In particular, a surface speed v2 or the angular speed ω2 of the impression cylinder 902 is then adapted in such a way that the difference between the actual value of the processing length BL and the target value of the processing length BLref vanishes to as great an extent as possible. If several sections of the processing length BL1; BL2; BL3 are present, the speed of each section is individually adapted. In the respective sections themselves, the angular speed ω1 and the surface speed v1 of the impression cylinder 902 are preferably constant in each section. In another preferred embodiment comprising an electronic cam disk, it is also possible to apply other speed profiles, such as a linear profile. The same also applies to the adaptation of the speed ratio by adjusting the angle of rotation of the forme cylinder 901.

The surface speed of a cylinder 901; 902 preferably refers to a speed on the outer cylindrical surface. In shaping units 900, the at least one shaping cylinder 901 has different heights due to the shaping tool 915. Preferably, the circumferential speed on the outermost edge of the tool, in particular on a cutting blade outer edge, is then defined by way of the surface speed. The angular speed of the forme cylinder 901 is preferably linked via a radius r1 that extends from the axis of rotation to the outer edge of the die-cutting elements 921. The at least one forme cylinder 901 preferably has an inner radius between 175 mm and 300 mm. The radius r1, in particular the radius including the die-cutting elements, is preferably between 190 mm and 350 mm. A circumference of the forme cylinder is preferably 1600 mm±10%.

The at least one forme cylinder 901 has a working surface 909. The working surface 909 preferably extends from the processing tool start 917 to a processing tool end 918. When the processing length BL is subdivided into several sections BL1; BL2; BL3 . . . , the working surface of the at least one forme cylinder 901 can also be subdivided into several sections. Each section then comes in contact with the respective section of the processing lengths BL1; BL2; BL3 during processing. In a cross-sectional view of the forme cylinder 901, several working lengths AL1; AL2; AL3 arise. Additionally, a forme cylinder 901 usually has a region having a gap L, in which no processing takes place. In contrast, the at least one impression cylinder 902 analogously has a counterpressure surface. The counterpressure surface in the case of processing is the surface that is arranged opposite the working surface. The counterpressure surface has a counterpressure length GL in the circumferential direction. The counterpressure length GL preferably corresponds to the processing length BL of the sheet 02. In particular, during the processing step, the counterpressure length BL is at least temporarily in contact with the processing length BL of the sheet 02. If several sections of the processing length BL1; BL2; BL3 . . . are present, several sections GL1; GL2; GL3 can also be assigned to the impression cylinder 902.

So as to correct the processing length BL or individual sections BL1; BL2; BL3, the speed ratio between the forme cylinder 901 and the sheet 02 when passing through the processing mechanism 914 is adapted.

In a first step, the arrival time of the sheet 02 is detected, preferably by means of a sensor 922, and the sheet arrival time is synchronized with a shaping tool start. As an alternative, the arrival time can also be determined via the machine speed. The sensor 922 can then be dispensed with or can only be used for additional monitoring. The sheet 02 then passes through the first section of the processing length BL1, and in the process is in contact with the first section AL1 of the forme cylinder 901 as well as the opposite first section of the impression cylinder 902, and thus with the first section of the counterpressure length GL1. In a preferred embodiment, the speed ratio in this region is adapted by adapting the angular position, and thus varying the rotational speed of the impression cylinder 902. In another embodiment, the rotational speed of the forme cylinder 901 is likewise adapted. In particular, a speed ratio v1/v2; ω1/ω2 of the opposite sections is adapted during a later and/or further cylinder revolution, so that the processing length BL1 is changed in this section.

After the sheet has passed through the section BL1, the speed ratio is adapted in the next section. Thereafter, the sections of the sheet BL2 and the second section AL2 of the forme cylinder 901 are in contact. On the other hand, there is the counterpressure length GL2. In particular, the speed v2; ω2, in particular the surface speed v2 and/or the angular speed ω2, of the impression cylinder GL2 is changed in this section.

The same applies when a third section is present. The speed ratio of the cylinders and/or with respect to the substrate 02 can also be adapted for the third section in that the speeds v1, v2, v3 can be adapted.

In an alternative embodiment, the speed ratios between the sheet 02 and the forme cylinder 901 are adapted by adapting the speed of the suction transport means 700. It is then also possible to bring the processing length BL in each section with an adapted speed in contact with the forme cylinder 901.

The at least one impression cylinder 902 is preferably activated or controlled by means of a correction value for correcting the processing length BL. Preferably, the impression cylinder 902 is controlled in an open loop or a closed loop using a position target value. A drive 907, in particular an electric motor 907, is used for this purpose. In a preferred embodiment, the electric motor 908 is arranged so as to be closed loop position-controlled. For this purpose, a rotary encoder or angular position encoder is preferably arranged so as to be integrated in the drive 907 or in the housing of an electric motor 907; 908. As an alternative or in addition, the rotary encoder can also be arranged outside the housing and, for example, be seated on a cylinder shaft. As an alternative and/or in addition, a speed controller is used. In a preferred embodiment, the operating mode of the electric motors 907; 908 can be changed from a closed loop position-controlled mode of operation to a speed-controlled mode of operation. If a processing length BL is shortened compared to the reference processing length BLref, the surface speed of the impression cylinder 902 is decreased by a decrease in the position target value or a rotational speed. If a processing length BL is lengthened compared to the reference processing length BLref, the surface speed and/or the angular speed w of the impression cylinder 902 is decreased by an increase in the position target value or, in the case of a speed control, in the rotational speed.

The same principle also applies to the individual sections of the processing length BL1; BL2; BL3 . . . . In each section, the speed ratio between a sheet 02 and the forme cylinder 901 can be individually controlled in an open loop or a closed loop. Preferably, an additive position target value is applied to the angular position encoder of the impression cylinder 902 for each section. This additive position target value is applied in the control system by means of the correction value and a stored sequence. The speed ratio is varied in that the position target value of the particular cylinder is adjusted compared to a master axis. In a preferred embodiment, a difference in the angle of rotation Δω compared to an angle of the virtual master axis follows from the position target value. As an alternative or in addition, the position target value can also be adjusted relative to another cylinder, preferably with an electronic master axis. The at least one forme cylinder 901 and/or the at least one impression cylinder 902 are arranged so as to be controlled in a closed loop and/or an open loop with respect to a virtual master axis. The at least one control unit 1201 the angular position of the at least one forme cylinder 901 and the at least one impression cylinder 902 is arranged so as to adjust with respect to the master axis.

An exemplary configuration having a partitioning into three sections n=3 results in a total processing length BL and the processing lengths of the three sections BL1; BL2; BL3. For example, the first section has a processing length BL1, which corresponds to the desired outcome or the target value BL1ref. In the second section, the processing length BL2 does not correspond to the target value BL2ref. After inspection, the section is too long, for example, and has to be adapted by adaptation of the speed ratio. For example, the speed ratio between the sheet 02 and the shaping cylinder 901 then has to be increased. In the preferred embodiment, the impression cylinder 902 is thus accelerated by increasing the deviation of the angle of rotation Δω compared to the electronic and/or virtual master axis. A surface speed v of the impression cylinder 902 is increased in this section BL2, preferably in a constant manner. In the third section, the processing length BL3 does not correspond to the target value BL3ref. After inspection, the section is too short, for example, and has to be adapted by adaptation of the speed ratio. In this case, the deviation of the angle of rotation Δω compared to the virtual master axis is decreased. This results in a reduced speed of the impression cylinder 902. In reality, speed profiles that, for example, have linear transition phases may arise due to inertia of individual components.

In a preferred embodiment, the speed ratios v1/v2; ω1/ω2 behave identically over several consecutive full cylinder revolutions. This means that the adaptation of the speed ratios for adjusting the processing length BL or the sections remains the same over several machine cycles or cylinder revolutions. In particular, the processing length BL is adjusted in each case after the processing outcome has been inspected and is implemented for succeeding sheets 02.

Furthermore, during a cylinder pass or a cycle Z, there is a region in which no sheet is processed. The speed remains constant in this gap L and adapts to the speed of the virtual master axis or of a cylinder related thereto. Particularly advantageously, the cylinder 902 does not have to be reset during the phase since the cylinder 902 has a symmetrical design and in particular does not have a cylinder channel to which a sheet arrival time has to be matched.

In addition, the printing length in the processing machine 01 is adapted. In contrast to the processing length BL of the shaping unit 900, the printing length is preferably corrected over the entire sheet 02. For example, in the case of a shortened actual value of the printing length l2 compared to the target value of the printing length l1, the speed of the forme cylinder 601 is increased, and the cylinder is operated at an increased speed compared to the master axis. Over the revolution or the cycle Z of the forme cylinder 601, a gap arises in the region of the cylinder channel. Due to the changed speed, the phase position with respect to the master axis changes. However, the print image has to be applied with precision in the case of a forme cylinder 601, which is why the sheet arrival time has to match precisely again. Accordingly, the cylinder has to be decelerated and accelerated again in the gap so as to correct the phase position. This is a complex process and has to be repeated during each cycle. In a preferred embodiment, the printing length can also be adapted in sections.

In a further checking step f), the processing outcome is checked after the closed-loop control and/or open-loop control. In particular, this value is fed back as a feedback variable in the control loop. This step, for example, corresponds to a renewed removal of a sheet 02 from the machine 01 and inspection.

The at least one control unit 1201 for controlling in an open loop and/or a closed loop a processing length BL is preferably functionally connected to a further control unit 1203 of at least one application unit 600 of the processing machine 01 which controls in an open loop or a closed loop the printing length l1. In particular, it is then possible to match the correction or the adjustment mechanisms of the processing length BL and of the printing length DL to one another. Information regarding the correction of the printing length l1 can be entered via the input device 1202, in particular the control console 1202, and transmitted to the control unit 1203.

In addition to the processing length BL, the printing length DL is likewise adjusted in the processing machine 01. The printing length DL can also be adjusted in sections having sectional printing lengths DL1; DL2; DL3 . . . . The adjustment takes place analogously to the adjustment of the processing length BL. In particular, the printing length is adjusted by adapting the speed ratio between the forme cylinder 616 and the impression cylinder 617. It is immaterial whether an interposed blanket cylinder, for example as is the case in an offset printing mechanism, is present. The change in the adaptation of the speed ratios thus applies similarly to the adaptation of the printing length as well as to the adaptation of the processing length.

The method of the sectional printing length correction of at least one application mechanism 600 will be described in greater detail hereafter. In a processing machine 01 comprising an application unit 600 and a shaping unit 900, a correction/adjustment in the printing length l2 as well as the processing length BL preferably takes place. The printing length l1 is corrected by changing the speed ratio v1/v3 between a substrate 02 and the at least one forme cylinder 616. The printing length l1 can likewise preferably be corrected in sections. For this purpose, the printing length l1 is subdivided into several sections having printing lengths DL1; DL2; DL3 . . . and corrected by changing the speed ratio v1/v3 in each section. The control units 1201; 1203 are functionally connected and can match the adjustment or correction of the printing length l2 or of the processing length BL to one another. The adjustment or the correction can take place in sections in both instances.

The speed ratio, and thus the printing length l1, is corrected and/or can be corrected by changing the surface speed v1; v2 and/or the angular speed ω1; ω2 of the at least one forme cylinder 616 and/or of the at least one impression cylinder 617. The printing length l2 is preferably corrected by changing the speed of the at least one forme cylinder 616. Preferably, the forme cylinder 616 is utilized for the correction. The at least one forme cylinder 616 comprises a non-printing region 620. The at least one forme cylinder 616 is brought in line with the phase position of a virtual and/or an electronic master axis when the non-printing region 620 is passed through. The printing length l1 is corrected by controlling in an open loop and/or a closed loop the position and/or rotational speed of the at least one forme cylinder 616 and/or of the at least one impression cylinder 617. The speed ratio v1/v3 in each section of the printing length DL1; DL2;

DL3 . . . can be corrected and/or is corrected by changing the surface speed v2 and/or the angular speed ω2 of the at least one impression cylinder 617 in each section. In particular, the speed ratio v1/v2; ω1/ω2 differs several times in the region of the application surface 629 and/or working surface 909 within a full cylinder revolution. In particular, the printing length l2, in the sectional correction of DL1; DL2; DL3, is corrected in the speed ratios equal to the correction of the processing length BL. The at least one forme cylinder 616; 901 comprises with the at least one application forme 628 including at least one application surface 629 and/or at least one shaping tool 915 including at least one working surface 909. The application surface 629 and/or the working surface 909 cover at least a portion of the outer cylindrical surface of the at least one forme cylinder 616; 901. A speed v1; ω1 of the at least one forme cylinder 616; 901 and a speed v2; ω2 of the at least one impression cylinder 617; 902 have a speed ratio v1/v2; ω1/ω2 with respect to one another. The speed ratio v1/v2; ω1/ω2 differs several times in the region of the application surface 629 and/or the working surface 909 within a full cylinder revolution.

The speed ratio is preferably a ratio of the angular speeds ω1/ω2 of the at least one forme cylinder 616; 901 to the at least one impression cylinder 617; 902 and/or the speed ratio is a ratio of the surface speeds v1/v2 of the at least one forme cylinder 616; 901 to the at least one impression cylinder 617; 902.

Preferably, the forme cylinder 616 is preferably adapted in terms of the speed, in particular decelerated and/or accelerated, for adjusting the speed ratio in order to adjust and/or correct the printing length l2, in particular for the sectional correction of the printing length DL1; DL2; DL3 . . . . This adjustment of the speed ratio is then preferably carried out in sections.

A deviation of an actual value l2 from a target value l1 of the printing length l2 is transmitted to a control unit 1201 and/or a control system, and the control unit 1201 and/or control system control in an open loop and/or a closed loop the position and/or rotational speed as a function of the deviation.

The printing cylinders 616 preferably have a radius r3 between 200 mm and 400 mm. More preferably, the radius r3 is 520 mm±10%.

The impression cylinder 617 also has a radius r4, which ranges between 100 and 200 mm. More preferably, the radius r4 is 300 mm±10%.

The actual state of the sections of the printing lengths DL1; DL2; DL3 . . . can be detected by means of at least one inspection device 726; 916 and/or is detected by means of the at least one inspection device 726; 916.

The at least one inspection device 726 detects and/or can detect the actual state of each section of the printing length DL1; DL2; DL3. The data regarding the actual state is transmitted from the inspection device 726 to the control unit. The control unit 1203 is functionally connected for the printing length correction to a control unit 1201 of a processing length correction of a shaping unit 900. As an alternative, the printing length can also be manually determined by remeasurement of the one delivery.

The forme cylinder 616 and/or the impression cylinder 617 are each driven by means of a drive 631; 630 configured as an electric motor 631; 630. The electric motor of the at least one forme cylinder 616 and/or the electric motor of the impression cylinder 617 are activated and/or controlled in a speed-controlled and/or closed-loop angular position-controlled manner by means of a rotary encoder.

When the processing length BL is subdivided into several sections BL1; BL2; BL3 . . . , the application surface 629 of the at least one forme cylinder 616 can also be subdivided into several sections. Each section then comes in contact with the respective section of the processing lengths BL1; BL2; BL3 during processing. In a cross-sectional view of the forme cylinder 616, several working lengths FAL1; FAL2; FAL3 arise. The application surface 629 of the application forme 628 comprises several sections having application lengths FAL1; FAL2; FAL3 . . . for processing sections arranged one behind the other on a substrate 02. Additionally, a forme cylinder 616 usually has a region having a gap L, in which no processing takes place. During the printing length correction, an adjustment of the phase position takes place in the region of the gap L so that the next sheet arrival time matches. In contrast, the at least one impression cylinder 617 analogously has a counterpressure surface. The counterpressure surface in the case of processing is the surface that is arranged opposite the working surface. The counterpressure surface has a counterpressure length GL in the circumferential direction. The counterpressure length GL preferably corresponds to the processing length BL of the sheet 02. In particular, during the processing step, the counterpressure length BL is at least temporarily in contact with the processing length BL of the sheet 02. If several sections of the processing length BL1; BL2; BL3 . . . are present, several sections GL1; GL2; GL3 can also be assigned to the impression cylinder 902. The at least one forme cylinder 901; 616 and the at least one impression cylinder 902; 617 preferably have a first speed ratio v1/v2; ω1/ω2 when a section of the working surface 909 passes through the processing point 910 and/or when the application surface 629 passes through. When another section of the working surface 909 passes through the processing point 910 and/or when the application surface 629 passes through, the at least one forme cylinder 901 and the at least one impression cylinder 902 preferably have a second different speed ratio v1/v2; ω1/ω2. The speed ratios can be adapted and/or are adapted in the number of sections FAL1, FAL2; FAL3 . . . ; AL1; AL2; AL3 . . . within a full cylinder revolution. The at least one forme cylinder 901; 616 and the at least one impression cylinder 902; 617 have a different speed ratio v1/v2; ω1/ω2 when each section of the working surface 909 passes through the processing point 910 and/or when the application surface 629 passes through. The speed ratio v1/v2; ω1/ω2 can be adjusted in each section as a function of a correction value for correcting the processing length BL and/or for correcting the printing length DL. The at least one control unit 1201; 1203, for correcting the processing length BL and/or the printing length l2, the speed ratio v1/v2; ω1/ω2 of the cylinders 901; 902 as a function of a deviation of an actual state of a processing length BL and/or a printing length DL from a target state of a processing length BLref and/or a printing length DL is arranged so as to transfer from a first speed ratio v1/v2; ω1/ω2 to a second speed ratio v1/v2; ω1/ω2. Thereafter, the speed profiles v1/v2; ω1/ω2 behave identically over several consecutive cylinder revolutions. When a deviation of a processing length BL from a target value BLref and/or of a printing length l2 from a target value l1 exists, the cylinders 901; 902; 616; 617 are arranged so as to be transferred by means of a correction value from a first speed ratio v1/v2; ω1/ω2 to a second speed ratio v1/v2; ω1/ω2. The at least one forme cylinder 901; 616 is arranged so as to be functionally connected to the at least one drive 907; 631. The at least one drive 907; 631 of the at least one forme cylinder 901; 616 is configured as a speed-controlled and/or closed-loop angular position controlled electric motor 907; 631. The at least one impression cylinder 902; 617 is arranged so as to be functionally connected to a further drive 908; 630. The at least one drive 908; 630 of the at least one forme cylinder 901; 631 is configured as a speed-controlled and/or closed-loop angular position controlled electric motor 908; 630.

The substrate 02 is moved at a transport speed v3 through the application unit 600 and/or the shaping unit 900, with a ratio existing between the speed v1; ω1 of the at least one forme cylinder 616 and the transport speed v3 of the substrate 02. The printing length l2 and/or the processing length BL of the substrate 02 are adjusted by a change in the speed ratio v1/v3; ω1/v3 between the forme cylinder 616; 901 and the substrate 02. The speed ratio between the at least one forme cylinder 616; 901 and the substrate 02 is changed several times within a full cylinder revolution in a region of an application surface 629 and/or the working surface 909 for a sectional adjustment of the printing length DL1; DL2; DL3 . . . and/or the processing length BL1; BL2; BL3 . . . . In the event of a deviation of a processing length BL; BL1; BL2; BL3 from a reference processing length BLref; BL1ref; BL2ref; BL3ref and/or in the event of a deviation of a printing length DL; DL1; DL2; DL3 from a reference printing length DLref; DL1ref; DL2ref; DL3ref, the speed ratio between the substrate 02 and the forme cylinder 616; 902 is changed from a first speed ratio v1/v3; ω1/v3 in the region of the application surface 629 and/or in the region of the working surface 909 within a first cylinder revolution to a second different speed ratio v1/v3; ω1/v3 within another cylinder revolution. The speed ratio between the at least one forme cylinder 901; 616 and the substrate 02 is maintained over several successive cylinder revolutions. The speed ratio between the at least one forme cylinder 616; 901 and the substrate 02 is changed several times within a full cylinder revolution. The speed ratio between the forme cylinder 901; 616 and the substrate 02 is adapted by changing the speed ratio v1/v3; ω1/v3 between the at least one forme cylinder 901; 616 and the at least one impression cylinder 902; 617. The substrate 02 comprises several sections having processing lengths BL1; BL2; BL3 . . . and/or printing lengths DL1; DL2; DL3 . . . . The speed ratio between the forme cylinder 901; 616 and the substrate 02 is changed and/or can be changed in each section when each section of the substrate 02 passes through a processing point 910 and/or printing nip 621. In a flexographic printing unit 600, the speed ratio is adapted directly in the printing nip 621. In an offset printing unit, the speed ratio is indirectly adjusted and transferred via the blanket cylinder. The speed ratio v1/v2; ω1/ω2 of the at least one forme cylinder 901; 616 to the at least one impression cylinder 902; 617 preferably differs at least once, preferably several times, within a full cylinder revolution when the working surface 909 and/or the application surface 629 pass through. The speed ratio can, on the one hand, be the ratio of the angular speeds ω1/ω2 of the at least one forme cylinder 901; 616 to the at least one impression cylinder 902; 617 and, on the other hand, the speed ratio is a ratio of the surface speeds v1/v2 of the at least one forme cylinder 901; 616 to the at least one impression cylinder 902; 617. The speed ratios can be adapted and/or are adapted in the number of sections of the substrate 02. The at least one forme cylinder 901; 616 and the at least one impression cylinder 902; 617 preferably have a first speed ratio when a section of the substrate 02 passes through the processing point 910 and/or printing nip 621. The at least one forme cylinder 901; 616 and the at least one impression cylinder 902; 617 have a second different speed ratio when another section passes through. The at least one forme cylinder 901; 616 and the at least one impression cylinder 902; 617 preferably have a different speed ratio when each section of the substrate 02 passes through. The speed ratio can preferably be adjusted and/or is adjusted in each section as a function of a correction value for correcting the processing length and/or printing length. The speed ratios v1/v2; ω1/ω2 preferably behave identically over several successive cylinder revolutions.

When a deviation of a processing length BL and/or of the printing length l2 from a target value BLref; l1 exists, the cylinders 901; 902; 616; 617 are preferably transferred from a first speed ratio to a second speed ratio by means of a correction value. The speed ratios are corrected from one cylinder revolution to another cylinder revolution by means of the correction value. The actual state of the processing length BL and/or of the printing length l2 can be detected and/or is detected by means of at least one inspection device 916; 716.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A processing machine (01) for processing a substrate (02) comprising at least one shaping unit (900), the at least one shaping unit (900) comprising at least one forme cylinder (901) and at least one impression cylinder (902), a processing point (910) for processing a substrate (02) being located between the at least one forme cylinder (901) and the at least one impression cylinder (902), the processing machine (01) comprising at least one control unit (1201) for correcting a processing length (BL) which controls in an open loop and/or a closed loop a speed (v1; v2; ω1; ω2) of the at least one forme cylinder (901) and/or of the at least one impression cylinder (902), the speed (v1; ω1) of the at least one forme cylinder (901) and the speed (v2; ω2) of the at least one impression cylinder (902) having a speed ratio (v1/v2; ω1/ω2) with respect to one another, and the speed ratio (v1/v2; ω1/ω2) being changeable and/or changed at the processing point (910) by means of the control unit (1201) as a function of the processing length (BL) of a substrate (02), characterized in that the speed ratio (v1/v2; ω1/ω2) for correcting the processing length (BL) differs at least once within a full cylinder revolution.

2. The processing machine according to claim 1, characterized in that the speed ratio (v1/v2; ω1/ω2) differs at least once within a full cylinder revolution in the region of a working surface (909) of a shaping tool (915).

3. The processing machine according to claim 2, characterized in that the working surface (909) of the at least one shaping tool (915) comprises several sections for processing multiple-ups (1101) of the one substrate (02) which are arranged one behind the other.

4. The processing machine according to claim 1, characterized in that the at least one forme cylinder (901; 616) and the at least one impression cylinder (902; 617) have a first speed ratio (v1/v2; ω1/ω2) when one of the plurality of sections of the working surface (909) passes through the processing point (910), and the at least one forme cylinder (901) and the at least one impression cylinder (902) have a second speed ratio (v1/v2; ω1/ω2) that differs from the first when another section of the working surface (909) passes through the processing point (910) and/or that the number of the speed ratios (v1/v2; ω1/ω2) can be adapted and/or is adapted to the number of sections within a full cylinder revolution.

5. The processing machine according to claim 1, characterized in that the at least one forme cylinder (901) and the at least one impression cylinder (902), at a first processing length (BL), during a cylinder revolution have a first speed ratio (v1/v2; ω1/ω2), and the at least one forme cylinder (901) and the at least one impression cylinder (902), at a second different processing length (BL) of a substrate (02), have a second different speed ratio (v1/v2; ω1/ω2) and/or that the at least one forme cylinder (901) and the at least one impression cylinder (902) during a first revolution have a first speed ratio (v1/v2; ω1/ω2), and the at least one forme cylinder (901) and the at least one impression cylinder (902) during another revolution have a second different speed ratio (v1/v2; ω1/ω2).

6. The processing machine according to claim 1, characterized in that the at least one shaping unit (900) is configured as a die-cutting unit (900) and/or that the at least one control unit (1202) is arranged so as to be functionally connected to at least one inspection device (916) and/or that the processing machine (01) comprises at least one application unit (600), which comprises a device for correcting the printing length, and/or that the at least one control unit (1202), for controlling in an open loop and/or a closed loop a processing length (BL), is arranged so as to be functionally connected to a further control unit (1203) of at least one application unit (600) of the processing machine (01) which controls in an open loop or a closed loop a printing length (l1).

7. The processing machine according to claim 1, characterized in that the at least one forme cylinder (901) and the at least one impression cylinder (902) have a different speed ratio (v1/v2; ω1/ω2) when each section of the working surface (909) passes through the processing point (910) and/or that the speed ratio (v1/v2; ω1/ω2) in each section can be adjusted as a function of a correction value for correcting a processing length (BL) and/or that the at least one control unit (1202) is configured so as to correct a processing length (BL) of a substrate (02) in sections (BL1; BL2; BL3 . . . ) and/or that the speed ratios (v1/v2; ω1/ω2) behave identically over several successive cylinder revolutions.

8. The processing machine according to claim 1, characterized in that the at least one control unit (1202), for correcting the processing length (BL), is arranged so as to transfer the speed ratio (v1/v2; ω1/ω2) of the cylinders (901; 902) from a first speed ratio (v1/v2; ω1/ω2) to a second speed ratio (v1/v2; ω1/ω2), as a function of a deviation of an actual state of a processing length (BL) from a target state of a processing length (BLref) and/or that, when a deviation of a processing length (BL) from a target value (BLref) is present, the cylinders (901; 902) are arranged so as to be transferred from a first speed ratio (v1/v2; ω1/ω2) to a second speed ratio (v1/v2; ω1/ω2) by means of a correction value.

9. The processing machine according to claim 1, characterized in that the at least one control unit (1202) is arranged so as to control in an open loop and/or a closed loop at least the at least one impression cylinder (902), and that the speed ratio (v1/v2; ω1/ω2) differs several times as a result of acceleration and/or deceleration of the at least one impression cylinder (902).

10. A method for adjusting a processing length (BL) of a substrate (02) by means of a shaping unit (900) of a processing machine (01), the at least one shaping unit (900) comprising at least one forme cylinder (901), the at least one forme cylinder (901), during processing, having a speed (v1; ω1) when a processing point (910) is passed through, a substrate (02) being moved at a transport speed (v3) in the processing point (910), the speed (v1; ω1) of the at least one forme cylinder (901) having a ratio with respect to the transport speed (v3) of the substrate (02), and the processing length (BL) of the substrate (02) being adjusted by means of a control unit (1201) by changing the speed ratio (v1/v3; ω1/v3) between the forme cylinder (901) and the substrate (02) at the processing point (910), characterized in that the speed ratio (v1/v3; ω1/v3) between the at least one forme cylinder (901) and the substrate (02) is changed at least once within a full cylinder revolution when a working surface (909) passes through the processing point (910).

11. The method according to claim 10, characterized in that the speed ratio (v1/v3; ω1/v3) between the at least one forme cylinder (901) and the substrate (02) is changed several times within a full cylinder revolution when the working surface (909) passes through the processing point (910) and/or that the speed ratio (v1/v3; ω1/v3) between the at least one forme cylinder (901) and the substrate (02) is maintained over several successive cylinder revolutions and/or that the substrate (02) comprises a plurality of sections having processing lengths (BL1; BL2; BL3 . . . ), and that the speed ratio (v1/v3; ω1/v3) between the forme cylinder (901) and the substrate (02) can be changed and/or is changed in every section when each section passes through the processing point (910).

12. The method according to claim 10, characterized in that the at least one shaping unit (900), at least in addition to the at least one forme cylinder (901), comprises at least one impression cylinder (902).

13. The method according to claim 12, characterized in that the speed ratio (v1/v3; ω1/v3) between the forme cylinder (901) and the substrate (02), and thus the processing length (BL), is changed by changing the speed ratio (v1/v2; ω1/ω2) of the at least one forme cylinder (901) to the at least one impression cylinder (902).

14. The method according to claim 13, characterized in that the speed ratio (v1/v2; ω1/ω2) of the at least one forme cylinder (901) to the at least one impression cylinder (902) differs several times within a full cylinder revolution when the working surface (909) passes through the processing point (910).

15. The method according to claim 10, characterized in that the working surface (909) of the shaping tool (915) comprises a plurality of sections having working lengths (AL1; AL2; AL3 . . . ) for processing multiple-ups (1101) on a substrate (02) which are located one behind the other, that the at least one forme cylinder (901) and the at least one impression cylinder (902) have a first speed ratio (v1/v2; ω1/ω2) when a section of the working surface (909) passes through the processing point (910), and the at least one forme cylinder (901) and the at least one impression cylinder (902) have a second different speed ratio (v1/v2; ω1/ω2) when another section of the working surface (909) passes through the processing point (910) and/or that the speed ratios (v1/v2; ω1/ω2) can be adapted and/or are adapted in the number of sections (AL1; AL2; AL3 . . . ) within a full cylinder revolution.

* * * * *